(12) United States Patent
Qian et al.

(10) Patent No.: US 11,465,361 B2
(45) Date of Patent: Oct. 11, 2022

(54) SYSTEMS, METHODS, AND MEDIA FOR CONTROLLING SUPPORT STRUCTURES AND BUILD ORIENTATION IN MANUFACTURING

(71) Applicant: Wisconsin Alumni Research Foundation, Madison, WI (US)

(72) Inventors: Xiaoping Qian, Madison, WI (US); Cunfu Wang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 242 days.

(21) Appl. No.: 16/832,244

(22) Filed: Mar. 27, 2020

(65) Prior Publication Data
US 2021/0299962 A1 Sep. 30, 2021

(51) Int. Cl.
*B29C 64/393* (2017.01)
*B33Y 30/00* (2015.01)
(Continued)

(52) U.S. Cl.
CPC ............ *B29C 64/393* (2017.08); *B33Y 30/00* (2014.12); *B33Y 50/02* (2014.12);
(Continued)

(58) Field of Classification Search
CPC ....... B29C 64/393; B33Y 30/00; B33Y 50/02; G01B 19/40932; G05B 2219/35012; G05B 2219/35261
See application file for complete search history.

(56) References Cited

U.S. PATENT DOCUMENTS

| 9,395,466 B1 | 7/2016 | Mallet et al. |
| 10,525,628 B2 | 1/2020 | Qian |

(Continued)

FOREIGN PATENT DOCUMENTS

WO 2018233867 A1 12/2017

OTHER PUBLICATIONS

Allen, S. et al. "On the computation of part orientation using support structures in layered manufacturing." 1994 International Solid Freeform Fabrication Symposium. 1994.
(Continued)

*Primary Examiner* — Yung-Sheng M Tsui
*Assistant Examiner* — Melody Tsui
(74) *Attorney, Agent, or Firm* — Quarles & Brady, LLP

(57) ABSTRACT

In accordance with some embodiments, systems, methods, and media for controlling support structures and build orientation are provided. In some embodiments, a method for additive manufacturing a part using a three dimensional (3D) printing system, the 3D printing system including a print head and a build plate is provided, the method comprising: receiving a plurality of physical constraints associated with the part; optimizing a build orientation of the part to identify an optimized build orientation b* for the part with respect to a design domain defined by the physical constraints based on the plurality of physical constraints, and a plurality of design constraints using at least one variable associated with build orientation as an optimization variable, the plurality of design constraints comprising: an initial build orientation $b^o$; and a critical surface slope angle and generating a part model based on the optimized build orientation b*.

20 Claims, 32 Drawing Sheets boundary of design domain

(51) Int. Cl.
   *G05B 19/4093*   (2006.01)
   *B33Y 50/02*     (2015.01)
(52) U.S. Cl.
   CPC .............. *G05B 19/40932* (2013.01); *G05B 2219/35012* (2013.01); *G05B 2219/35261* (2013.01)

(56) References Cited

U.S. PATENT DOCUMENTS

| | | | |
|---|---|---|---|
| 2010/0086721 | A1 | 4/2010 | Batchelder |
| 2014/0277669 | A1 | 9/2014 | Nardi et al. |
| 2015/0066178 | A1 | 3/2015 | Stava |
| 2015/0142153 | A1 | 5/2015 | Chun et al. |
| 2015/0151493 | A1 | 6/2015 | Schmidt |
| 2015/0269282 | A1 | 9/2015 | Nelaturi |
| 2017/0176975 | A1 | 6/2017 | Pedersen |
| 2017/0312986 | A1* | 11/2017 | Qian .................. G06F 7/00 |
| 2017/0372480 | A1 | 12/2017 | Anand |
| 2019/0001657 | A1 | 1/2019 | Matusik et al. |

OTHER PUBLICATIONS

Bhate, D. The Additive Manufacturing Software Conundrum. Blog Post dated Jun. 15, 2016. Available at https://www.padtinc.com/blog/the-additive-manufacturing-software-conundrum/.

Bourdin, B. (2001). Filters in topology optimization. International journal for numerical methods in engineering, 50(9), 2143-2158.

Brackett, D., et al. "Topology optimization for additive manufacturing." Proceedings of the solid freeform fabrication symposium, Austin, TX. vol. 1. 2011, pp. 348-362.

Bruns, T. E., et al. (2001). Topology optimization of non-linear elastic structures and compliant mechanisms. Computer methods in applied mechanics and engineering, 190(26-27), 3443-3459.

Cheng, L., et al. (2019). Part-scale build orientation optimization for minimizing residual stress and support volume for metal additive manufacturing: Theory and experimental validation. Computer-Aided Design, 113, 1-23.

Das, P., et al. (2017). Selection of build orientation for optimal support structures and minimum part errors in additive manufacturing. Computer-Aided Design and Applications, 14(sup1), 1-13.

Driessen, A. M. "Overhang constraint in topology optimisation for additive manufacturing: a density gradient based approach." (Sep. 2, 2016), Department of Precision and Microsystems Engineering.

Gaynor, A. T., et al. "Topology optimization for additive manufacturing: considering maximum overhang constraint." 15th AIAA/ISSMO multidisciplinary analysis and optimization conference. Jun. 16-20, 2014, (AIAA 2014-2036), 8 pages.

Guest, J. K., et al. (2011). Eliminating beta-continuation from heaviside projection and density filter algorithms. Structural and Multidisciplinary Optimization, 44(4), 443-453.

Guo, X. et al. Self-supporting structure design in additive manufacturing through explicit topology optimization. Computer Methods in Applied Mechanics and Engineering, 323:27-63, 2017.

Langelaar, M. (2018). Combined optimization of part topology, support structure layout and build orientation for additive manufacturing. Structural and Multidisciplinary Optimization, 57(5), 1985-2004.

Leary, M., et al. (2014). Optimal topology for additive manufacture: A method for enabling additive manufacture of support-free optimal structures. Materials & Design, 63, 678-690.

Paul, R., et al. (2015). Optimization of layered manufacturing process for reducing form errors with minimal support structures. Journal of Manufacturing Systems, 36, 231-243.

Qian, X. (2017). Undercut and overhang angle control in topology optimization: a density gradient based integral approach. International Journal for Numerical Methods in Engineering, 111 (3), 247-272.

Qian, X., et al. (2019). Boundary Slope Control in Topology Optimization for Additive Manufacturing: For Self-Support and Surface Roughness. Journal of Manufacturing Science and Engineering, 141, 091001-1.

Sigmund, O. (2007). Morphology-based black and white filters for topology optimization. Structural and Multidisciplinary Optimization, 33(4-5), 401-424.

Sigmund, O., et al. (2013). Topology optimization approaches. Structural and Multidisciplinary Optimization, 48(6), 1031-1055.

Zhou, M., et al. (1991). The COC algorithm, Part II: Topological, geometrical and generalized shape optimization. Computer methods in applied mechanics and engineering, 89(1-3), 309-336.

* cited by examiner

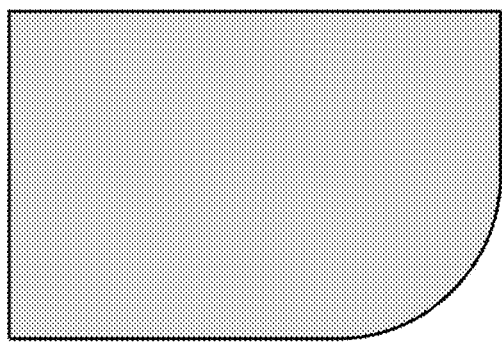
FIG. 1A
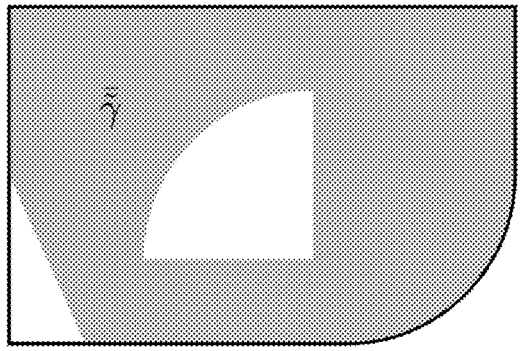
FIG. 1B
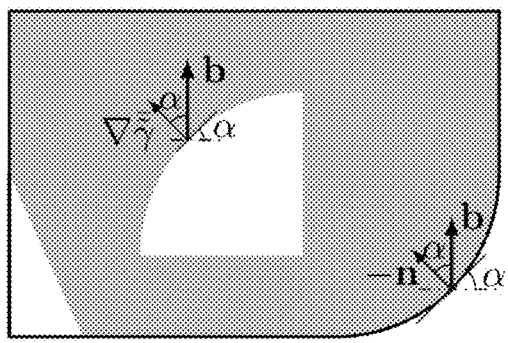
FIG. 1C1
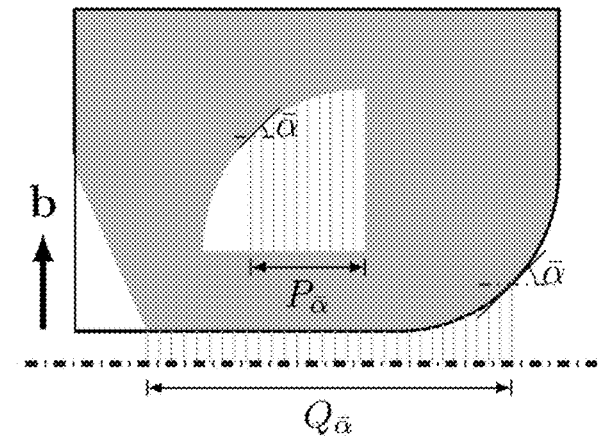
FIG. 1C2
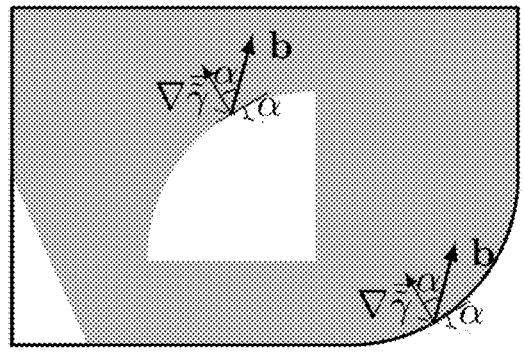
FIG. 1D1
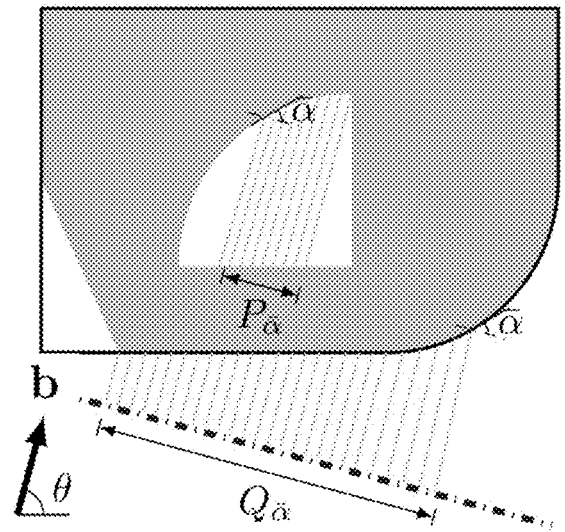
FIG. 1D2

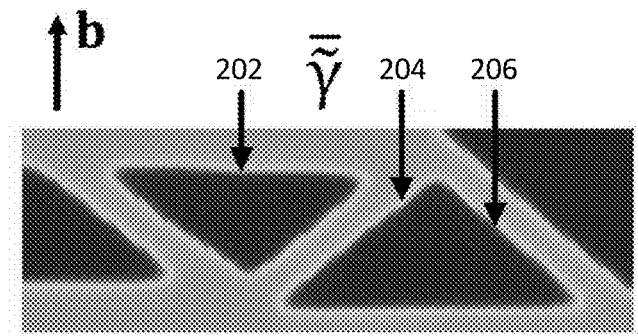
FIG. 2A1
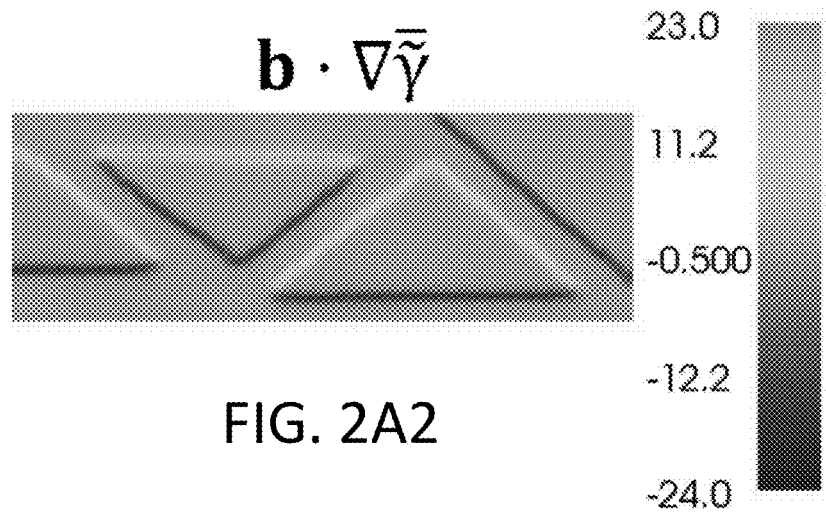
FIG. 2A2
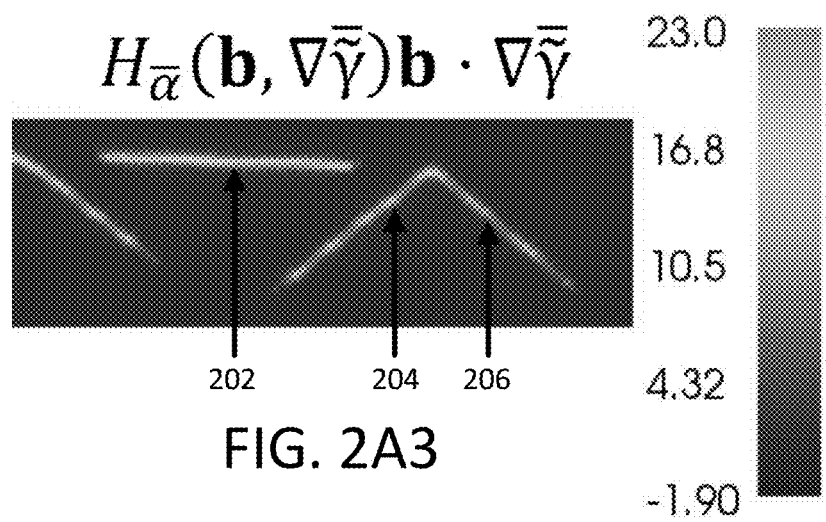
FIG. 2A3

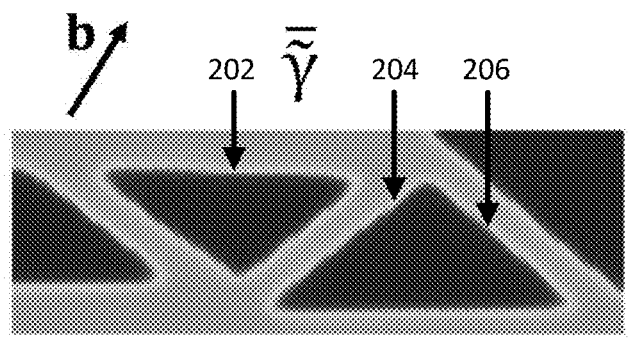
FIG. 2B1
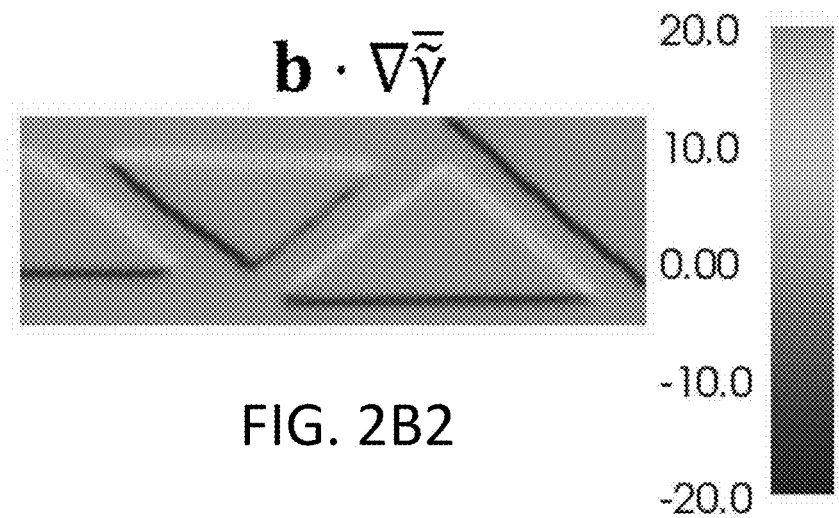
FIG. 2B2
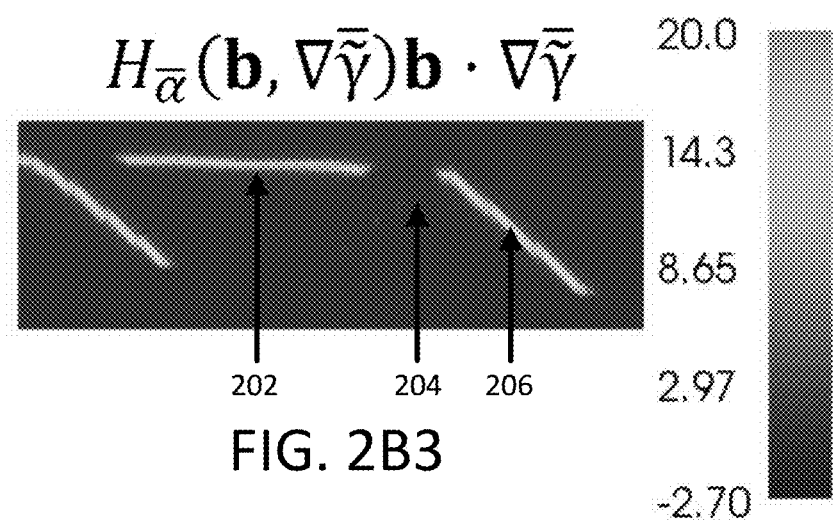
FIG. 2B3

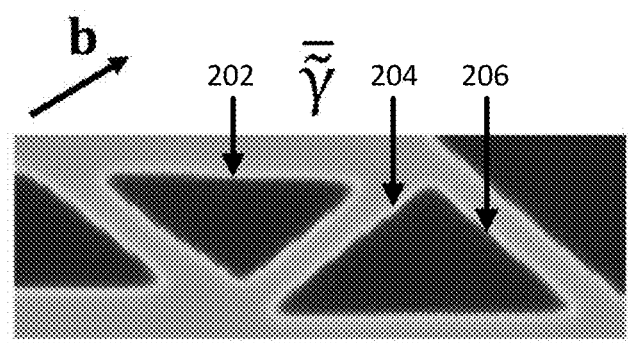
FIG. 2C1
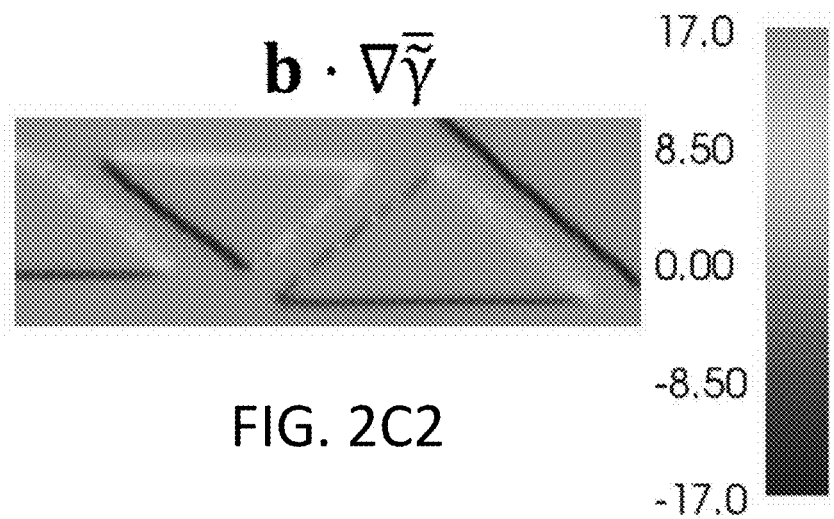
FIG. 2C2
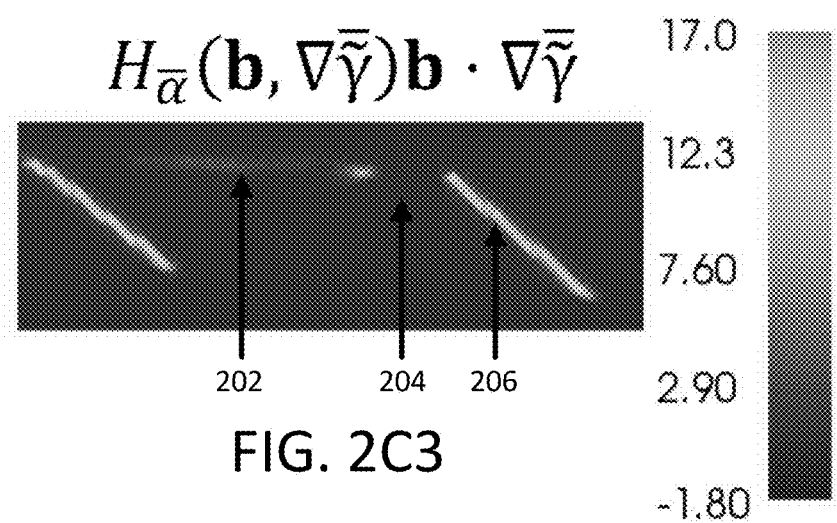
FIG. 2C3

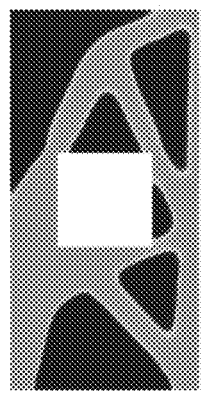
FIG. 3A
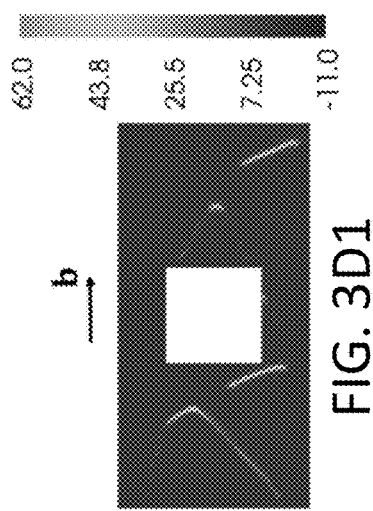
FIG. 3D1
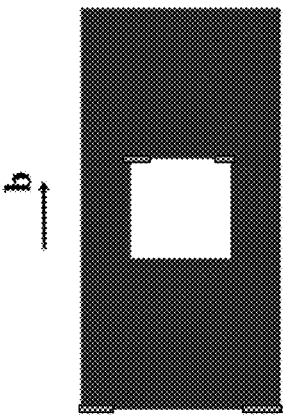
FIG. 3D2
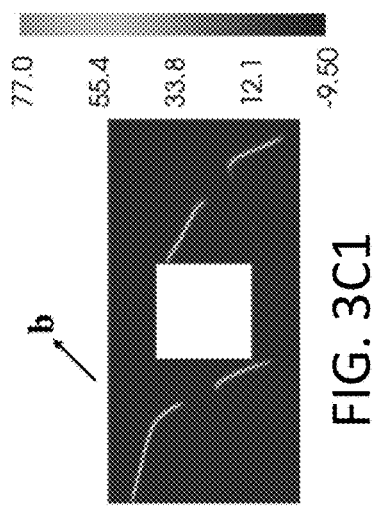
FIG. 3C1
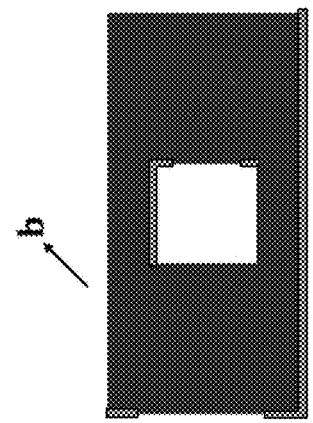
FIG. 3C2
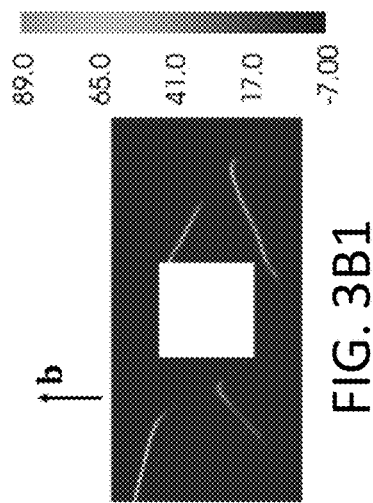
FIG. 3B1
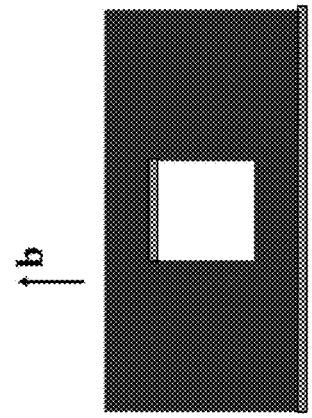
FIG. 3B2

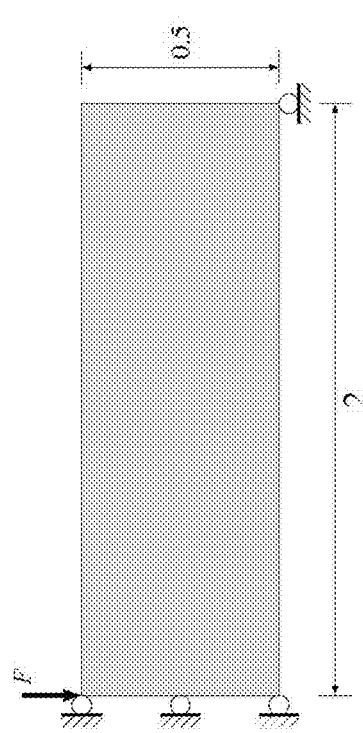
FIG. 9A
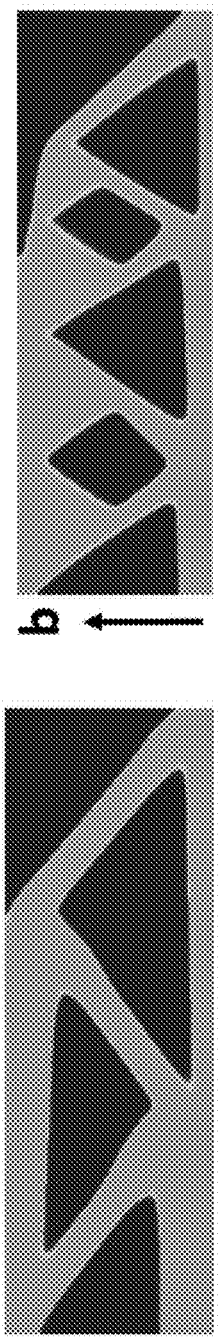
FIG. 9B1
FIG. 9B2
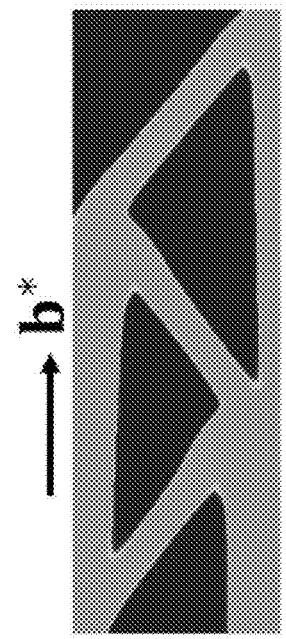
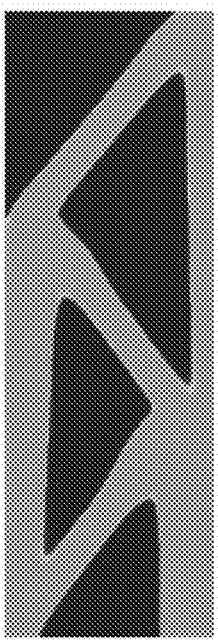
FIG. 9B3
FIG. 9B4
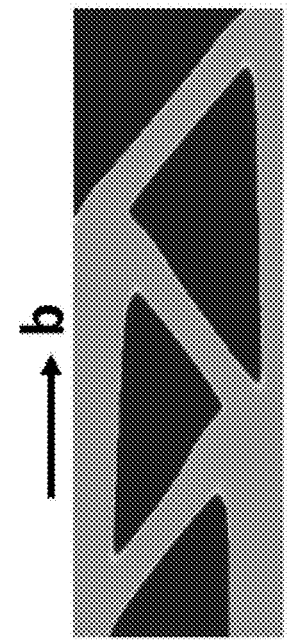
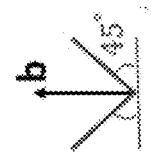
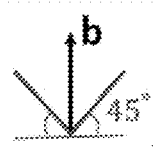

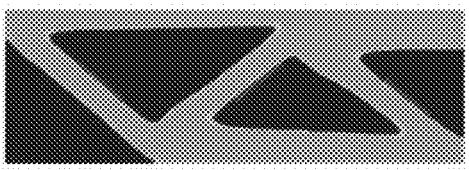
FIG. 9C4
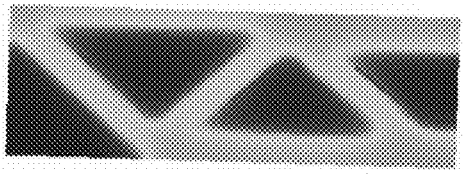
FIG. 9C3
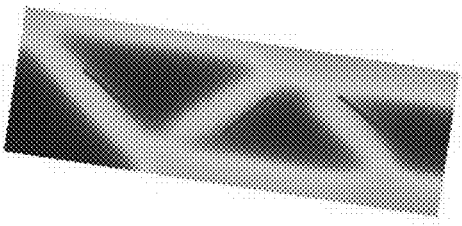
FIG. 9C2
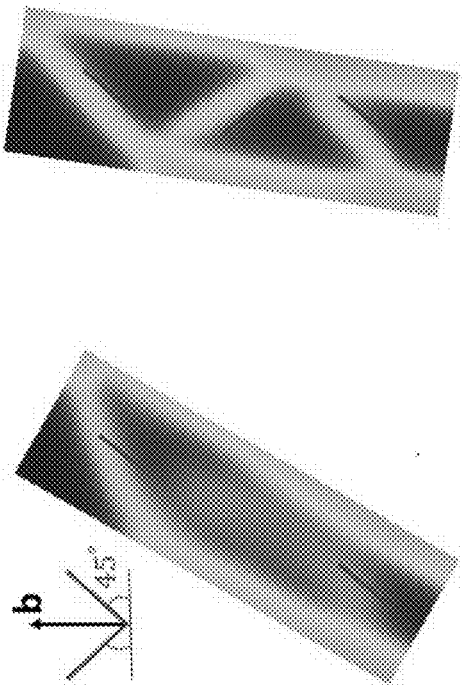
FIG. 9C1
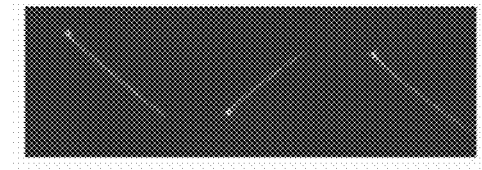
FIG. 9D4
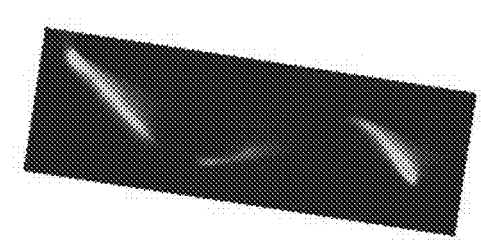
FIG. 9D3
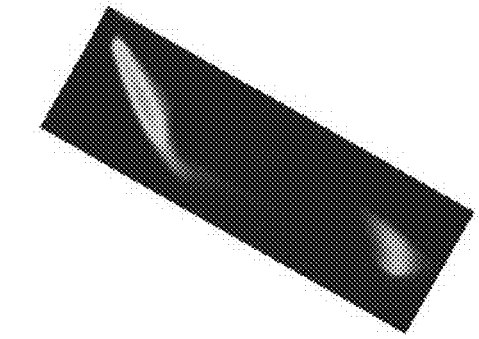
FIG. 9D2
FIG. 9D1

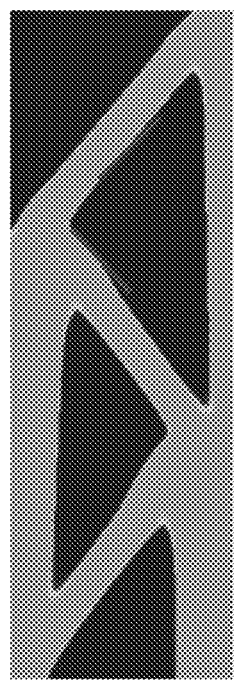
FIG. 9F1
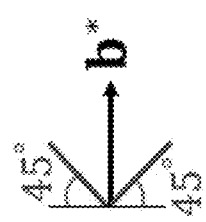
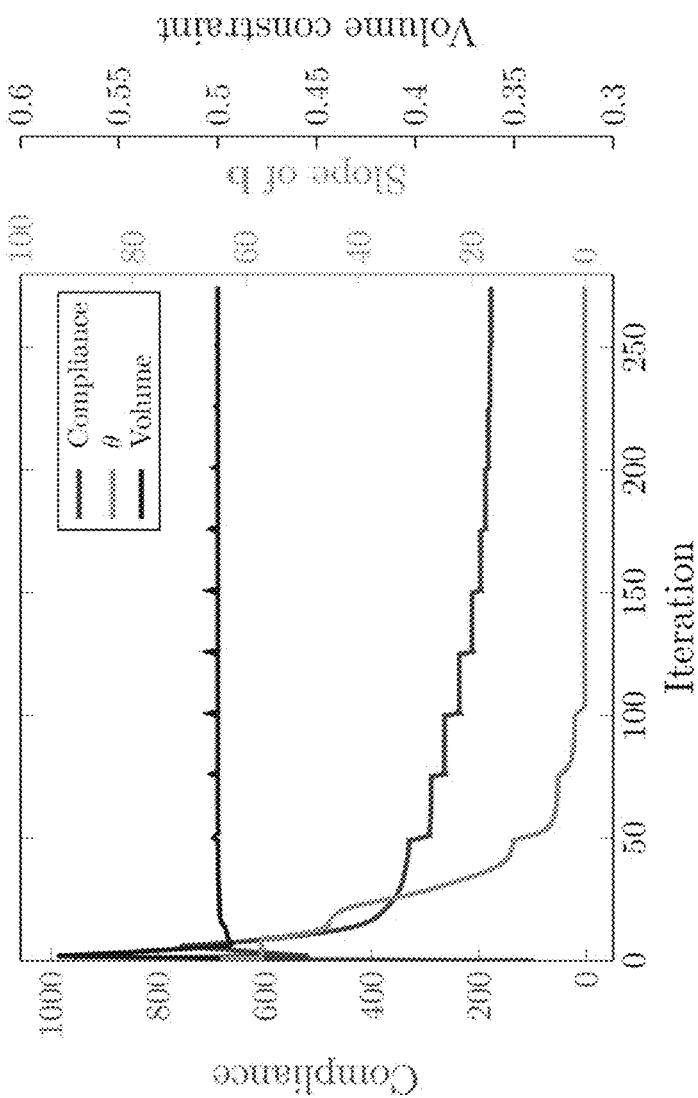
FIG. 9G1

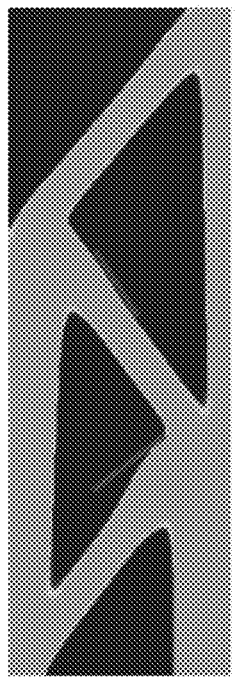
FIG. 9F2
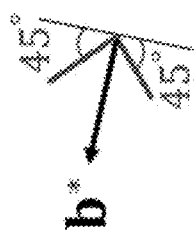
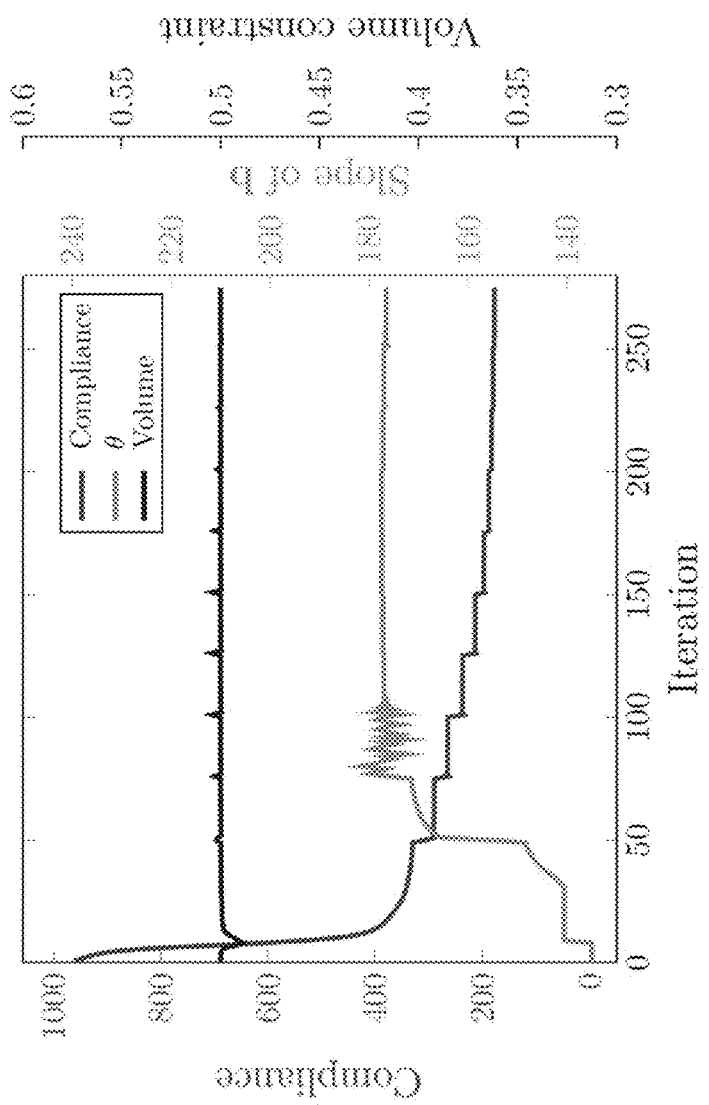
FIG. 9G2

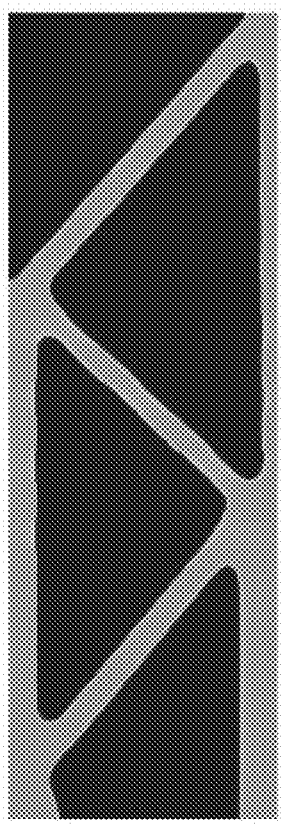
FIG. 9H1
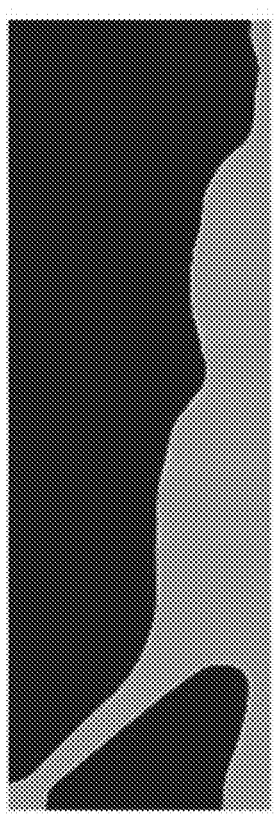
FIG. 9H2
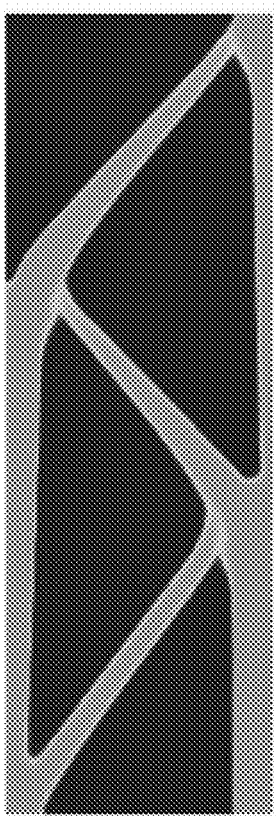
FIG. 9H3

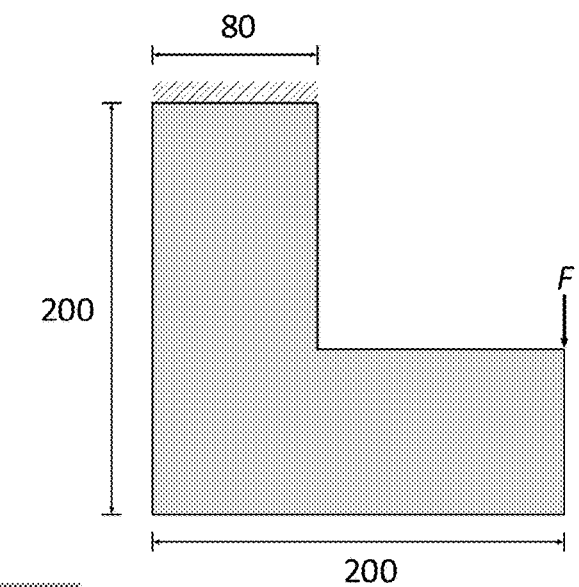
FIG. 10A
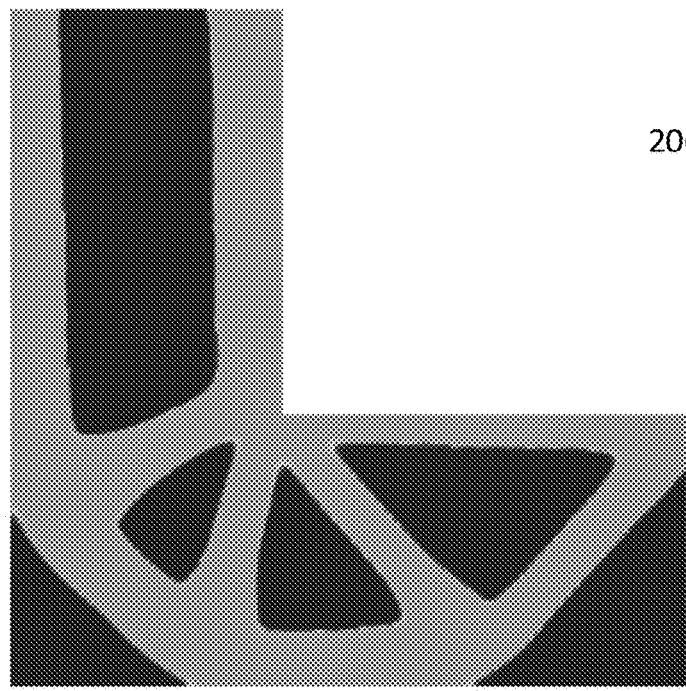
FIG. 10B1
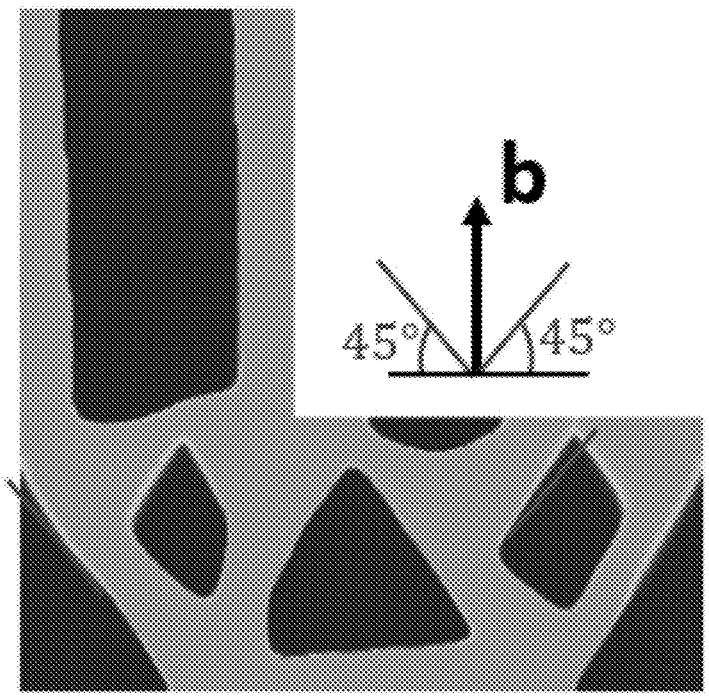
FIG. 10B2

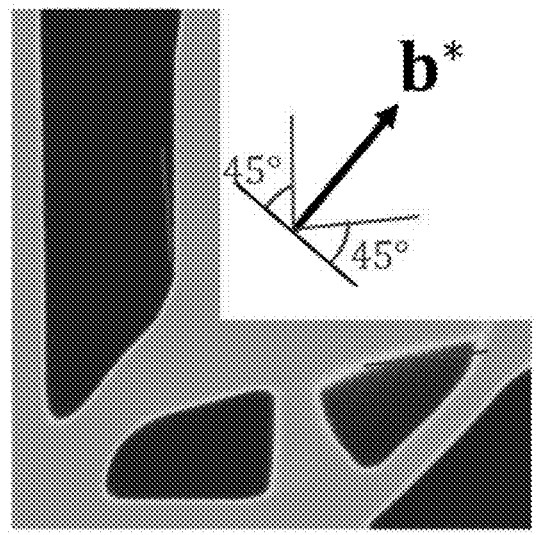
FIG. 10C1
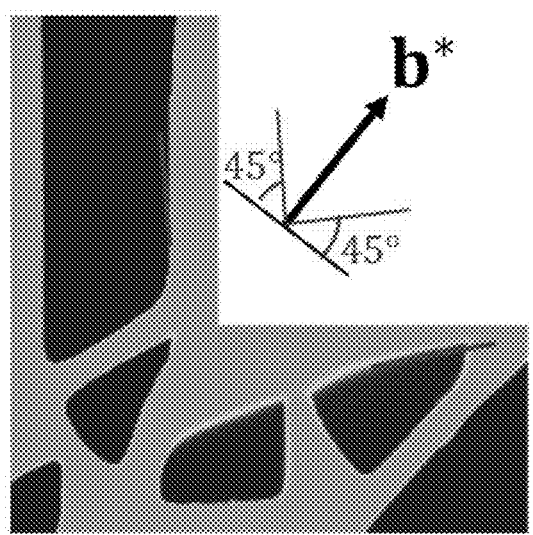
FIG. 10C2
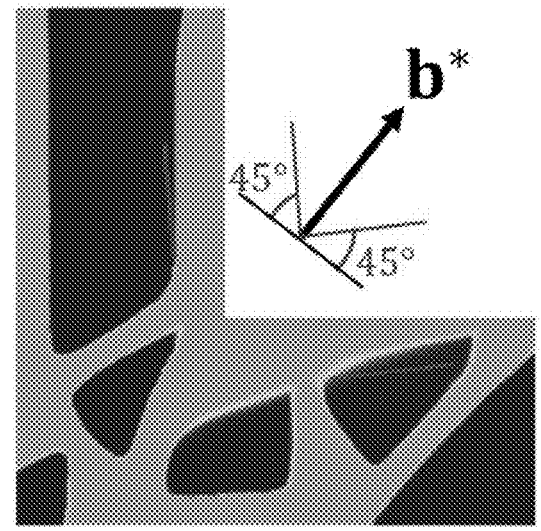
FIG. 10C3

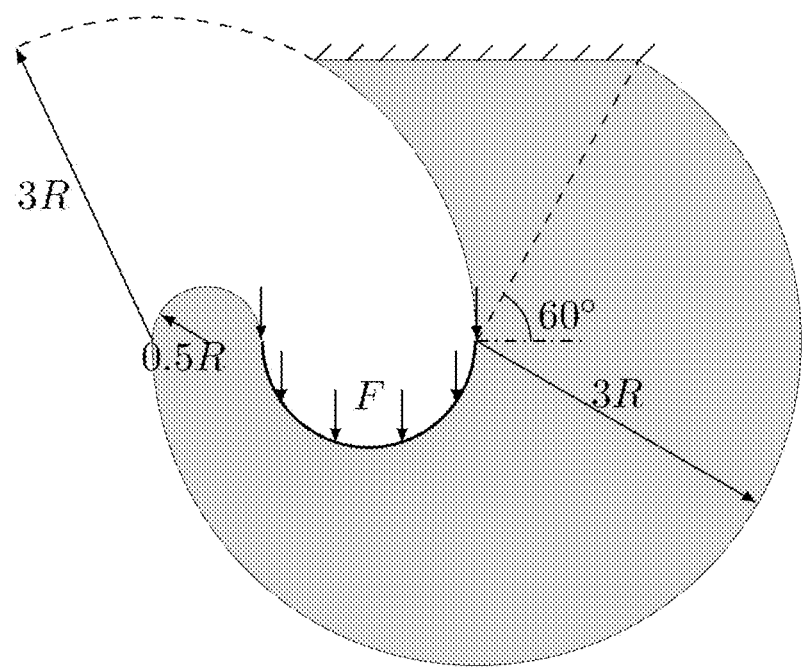
FIG. 11A
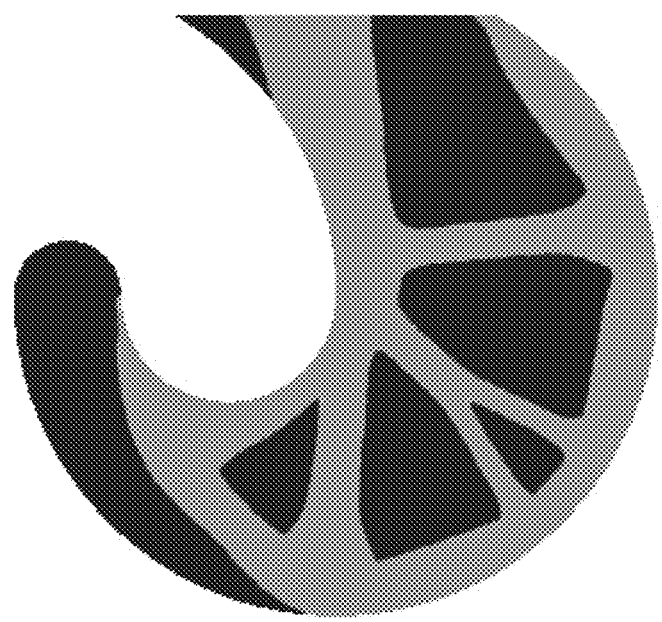
FIG. 11B1

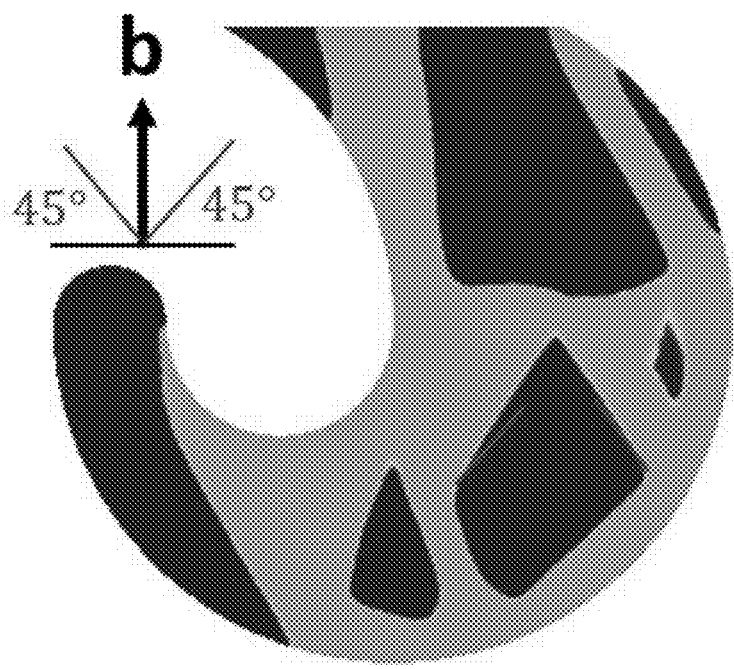
FIG. 11B2
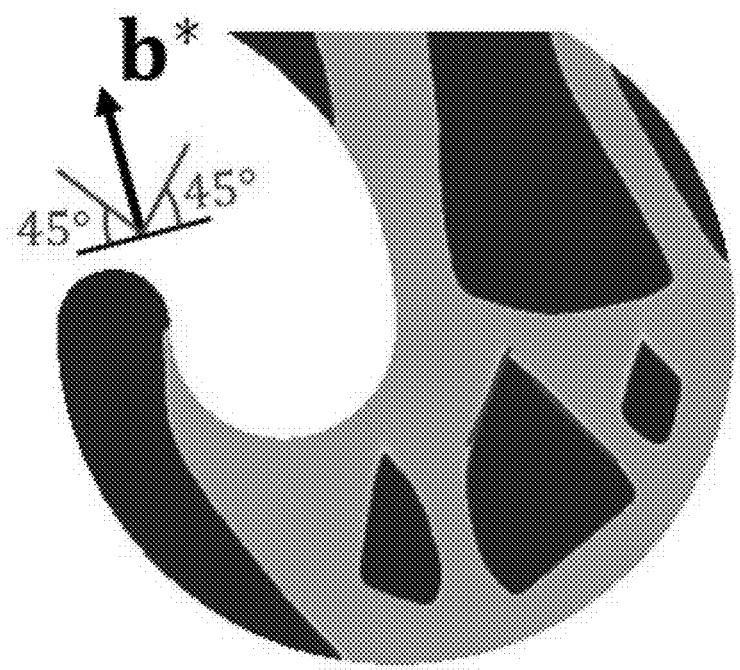
FIG. 11C

Iter. 0
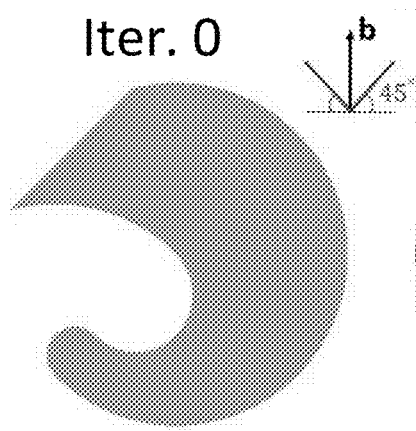
FIG. 11D1
Iter. 50
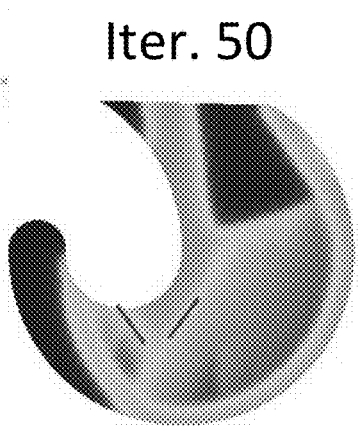
FIG. 11D2
Iter. 100
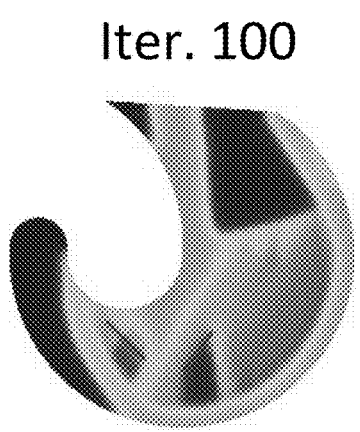
FIG. 11D3
Iter. 150
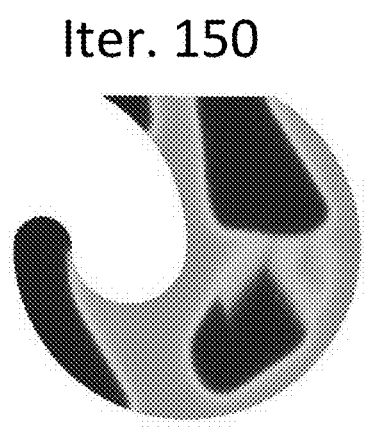
FIG. 11D4
Iter. 200
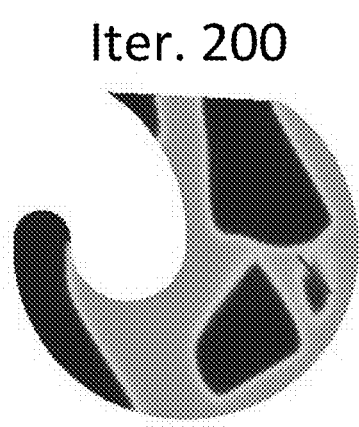
FIG. 11D5
Iter. 250
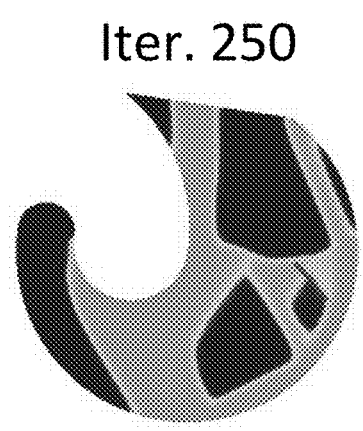
FIG. 11D6
Iter. 275
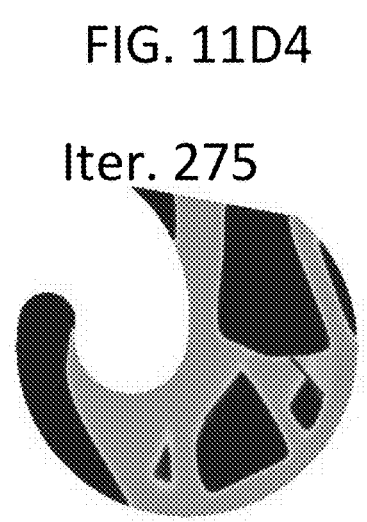
FIG. 11D7
Iter. 300
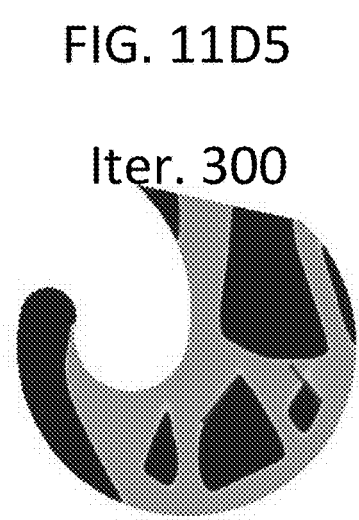
FIG. 11D8
Iter. 350
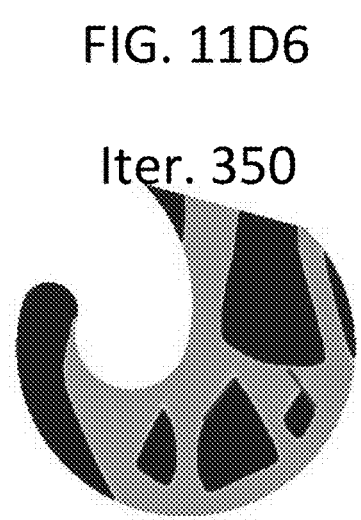
FIG. 11D9

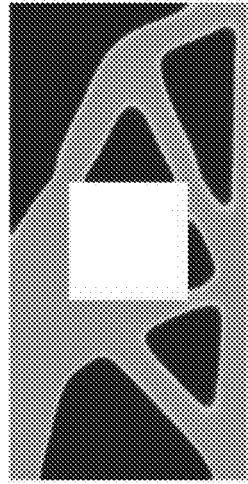
FIG. 12A
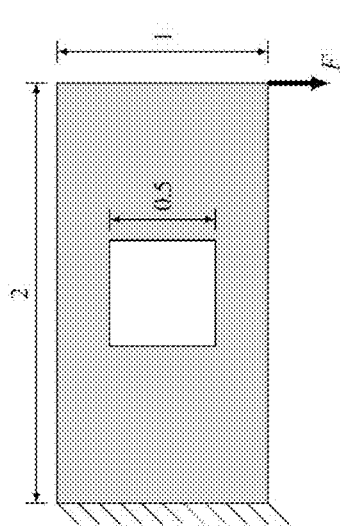
FIG. 12B
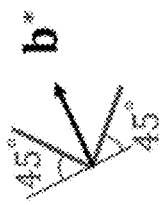 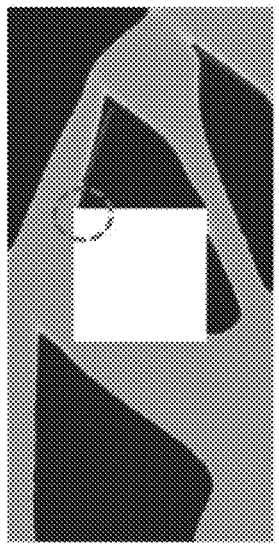
FIG. 12C1
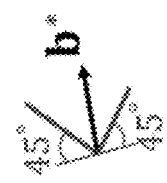 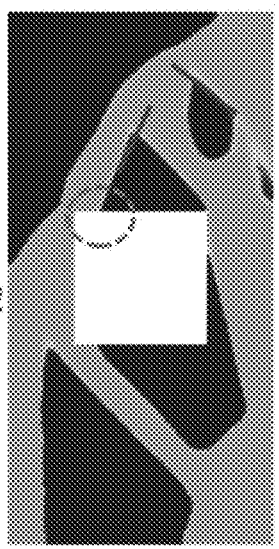
FIG. 12C2
 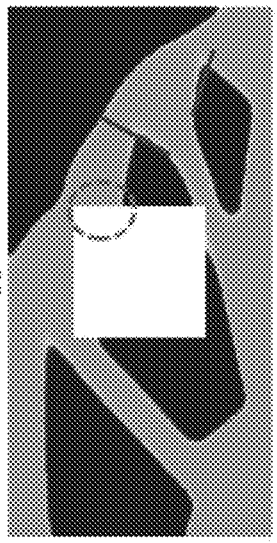
FIG. 12C3

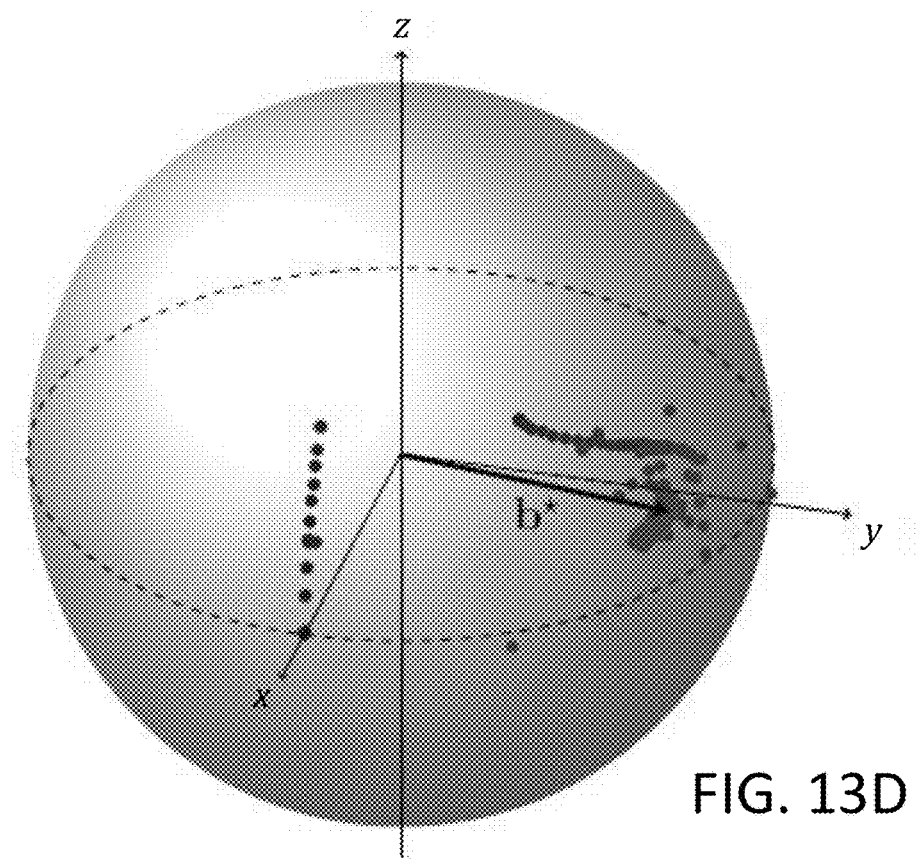
FIG. 13D
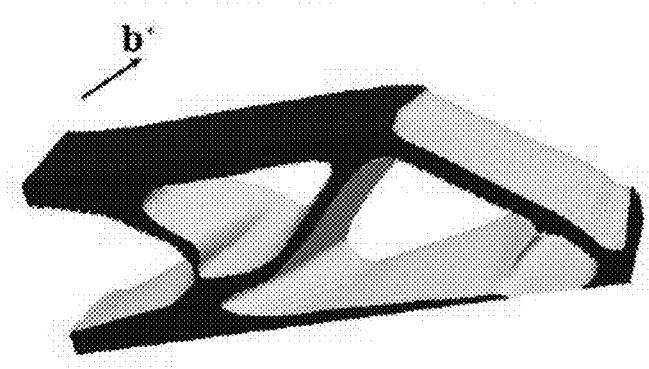
FIG. 13E1
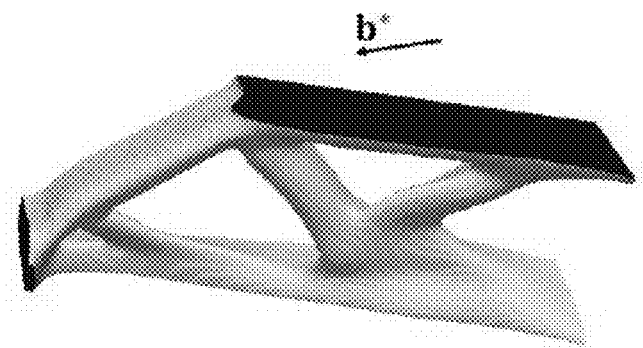
FIG. 13E2

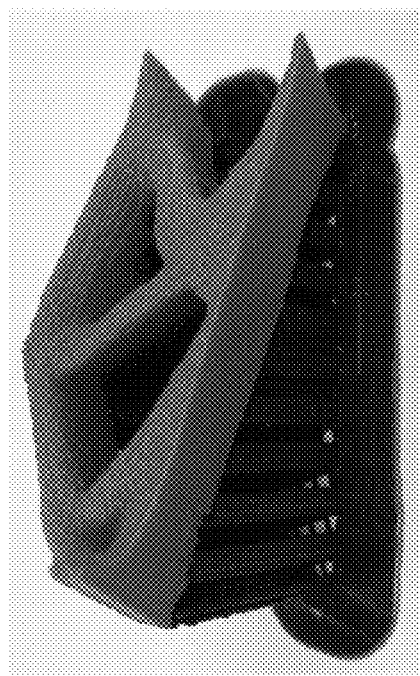
FIG. 13G
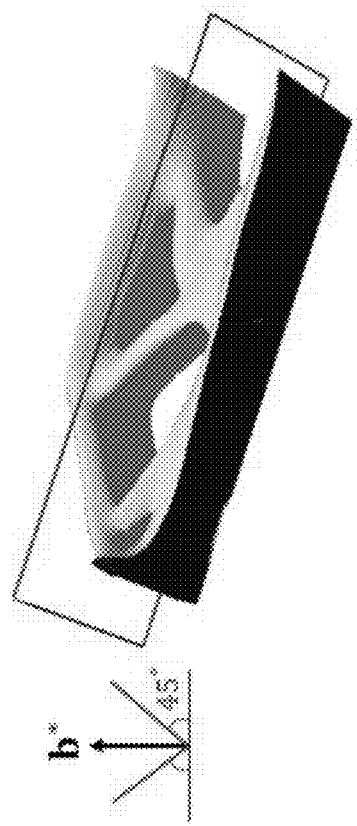
FIG. 13F1
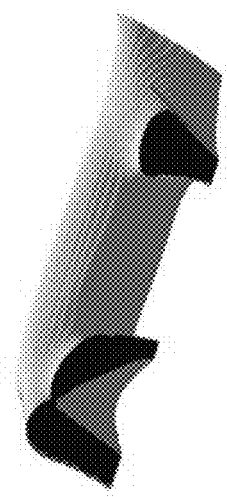
FIG. 13F4
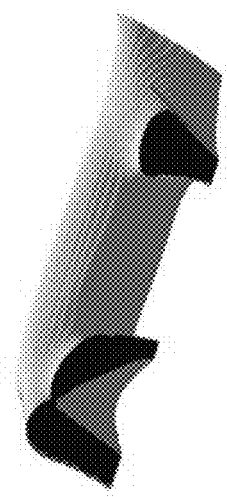
FIG. 13F3
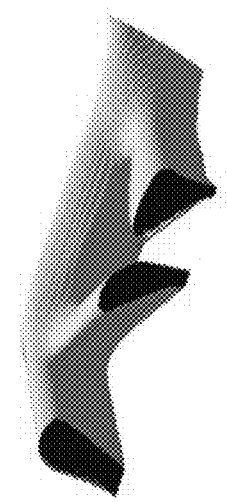
FIG. 13F2

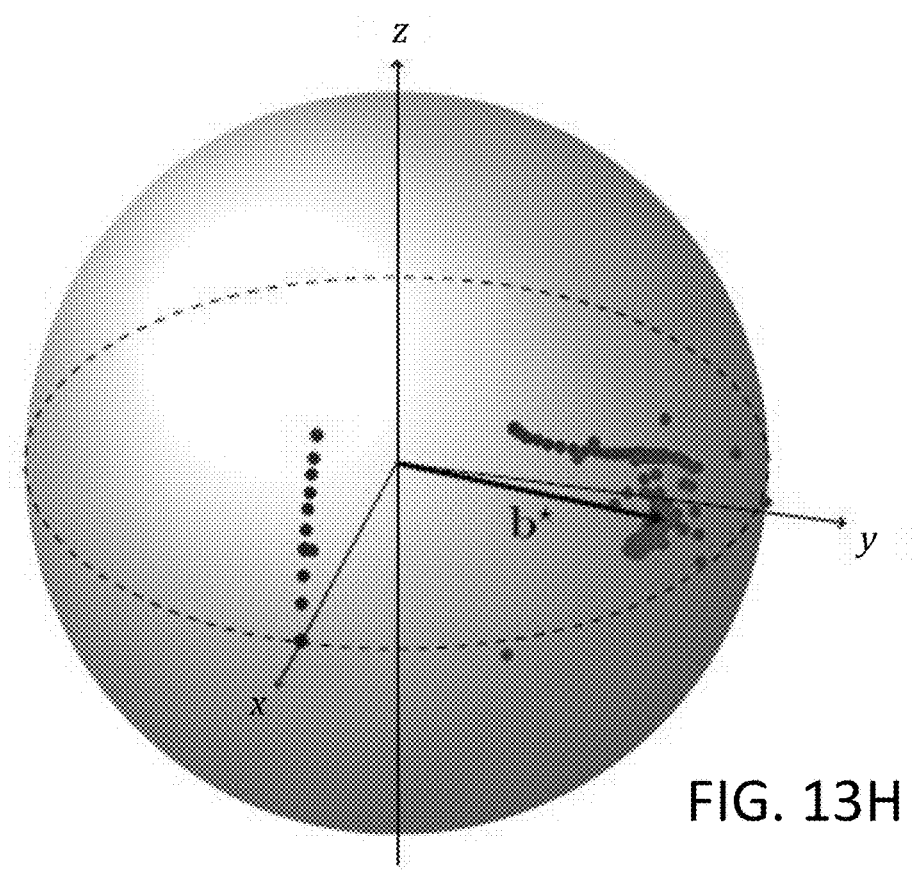
FIG. 13H
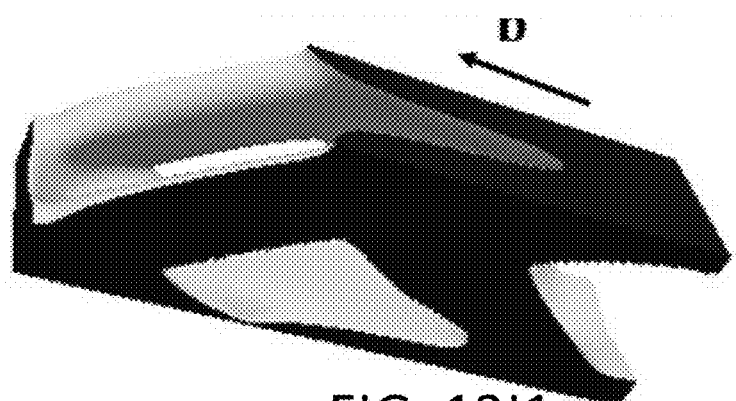
FIG. 13I1
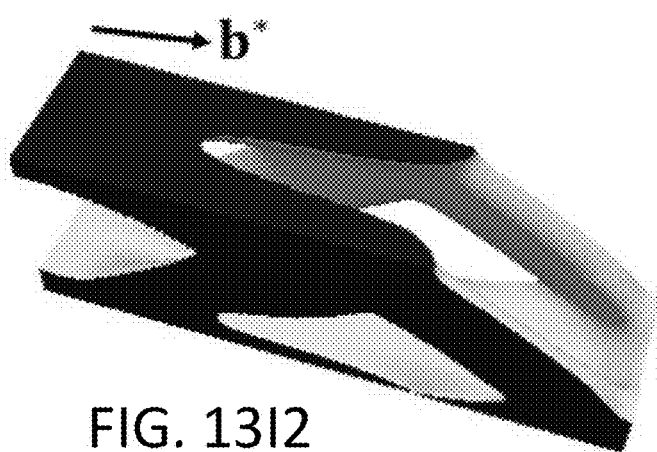
FIG. 13I2

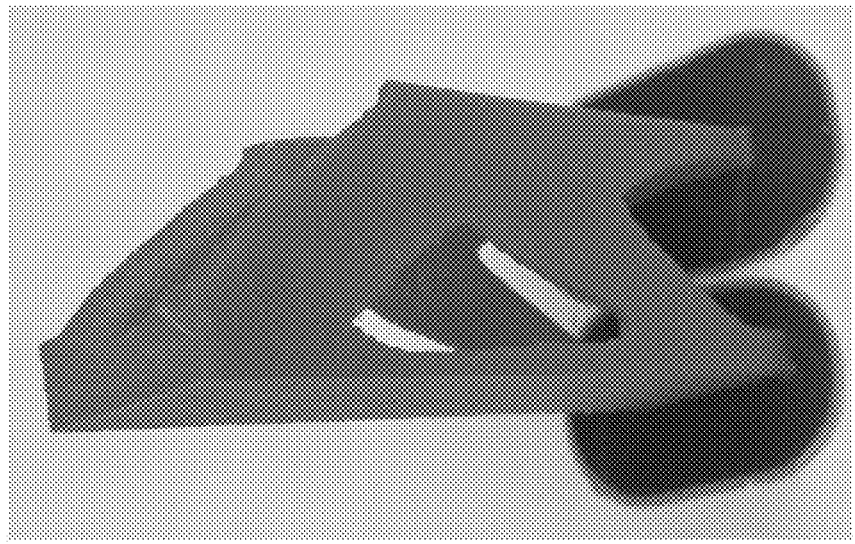
FIG. 13K
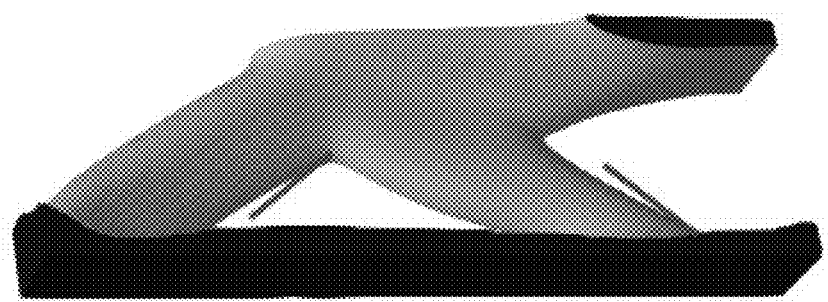
FIG. 13J2
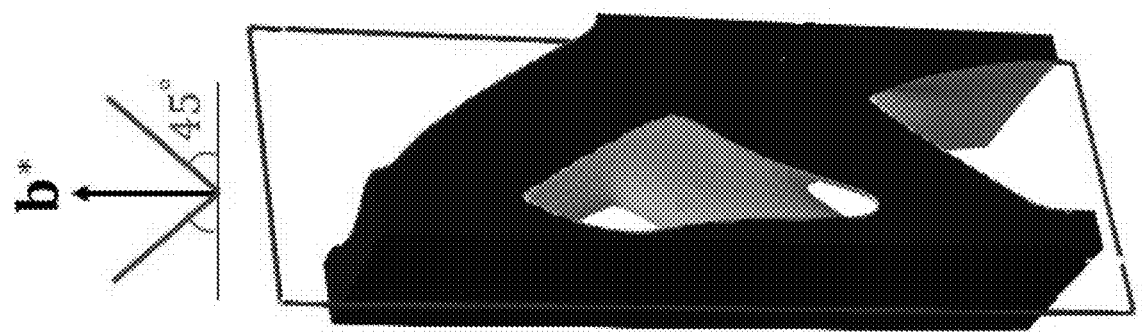
FIG. 13J1

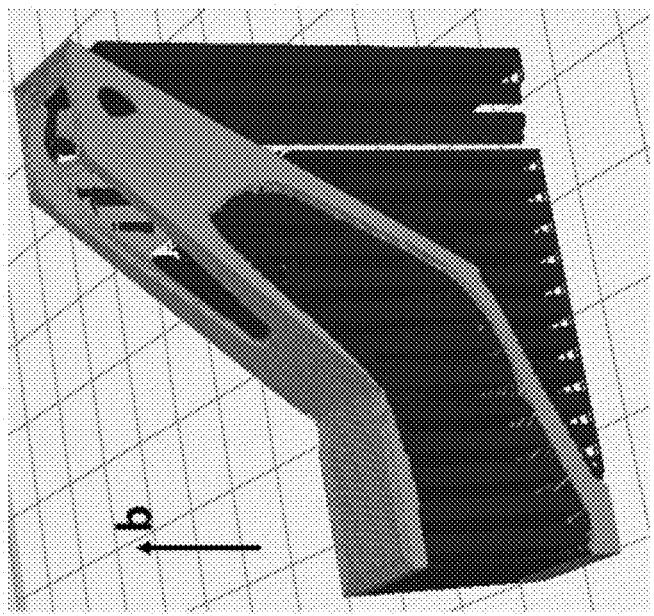
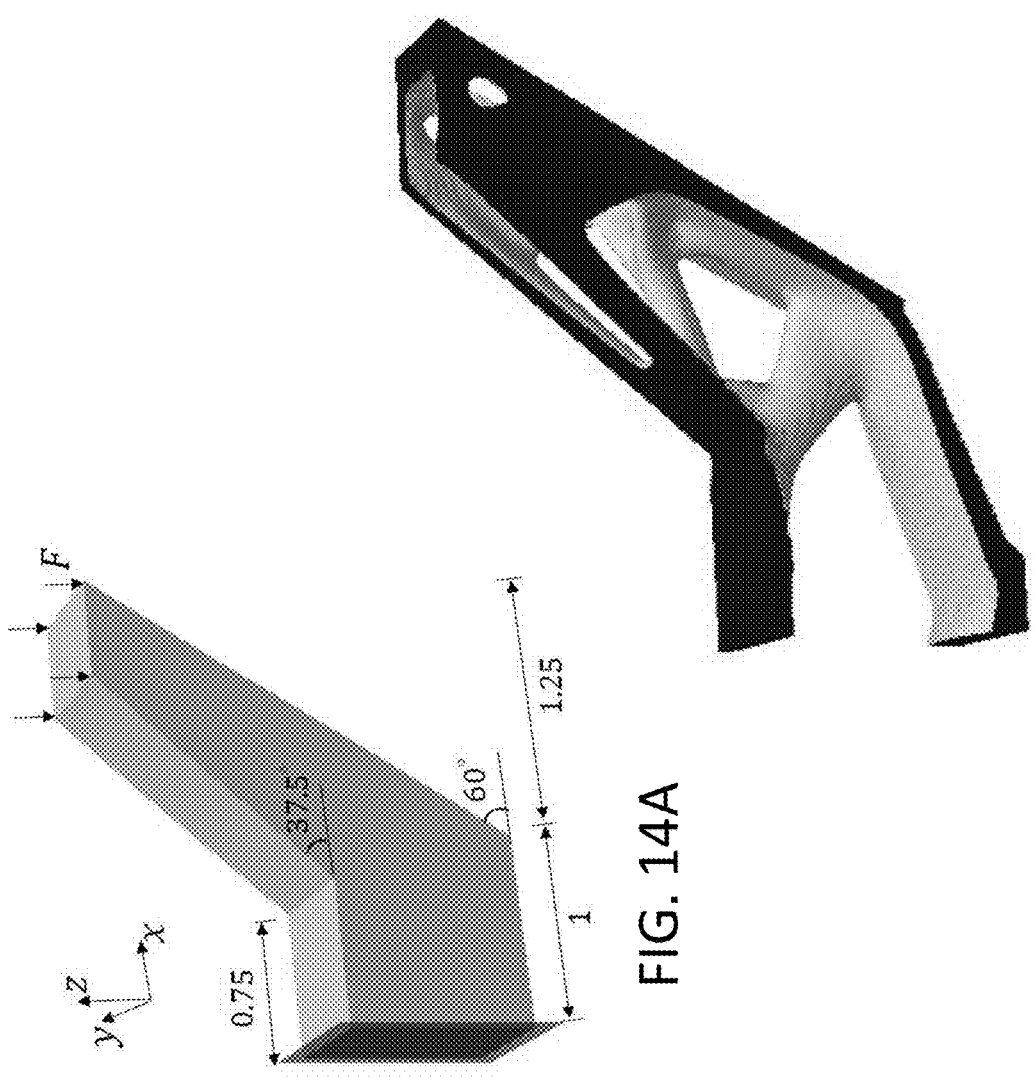
FIG. 14C
FIG. 14B
FIG. 14A

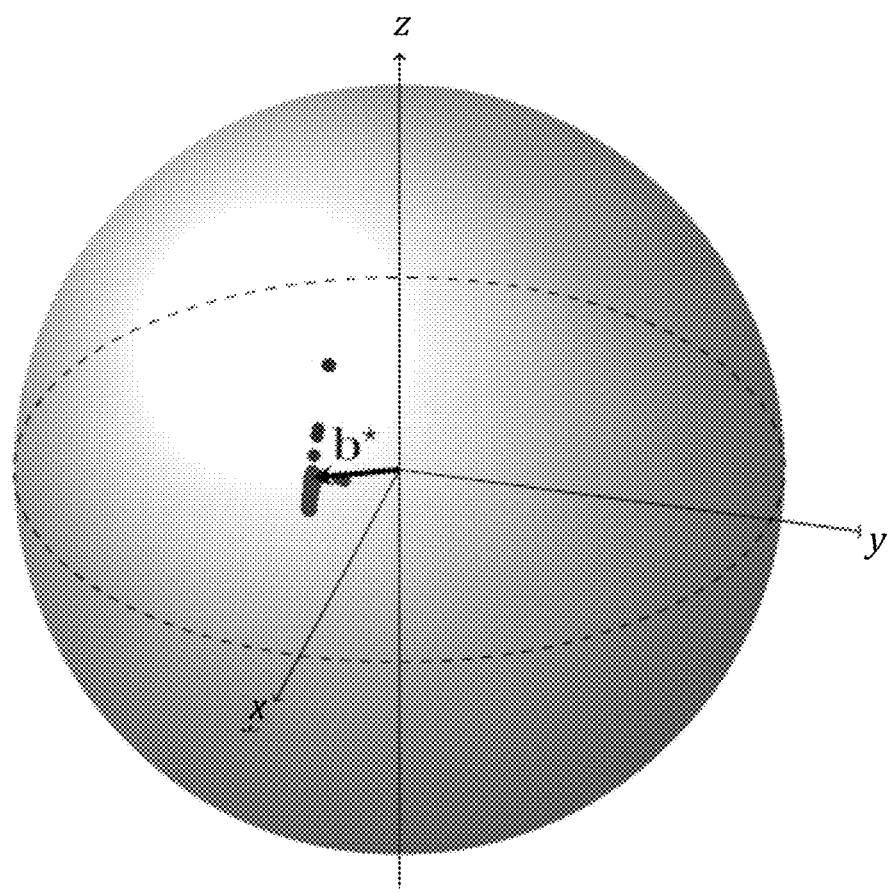
FIG. 14D
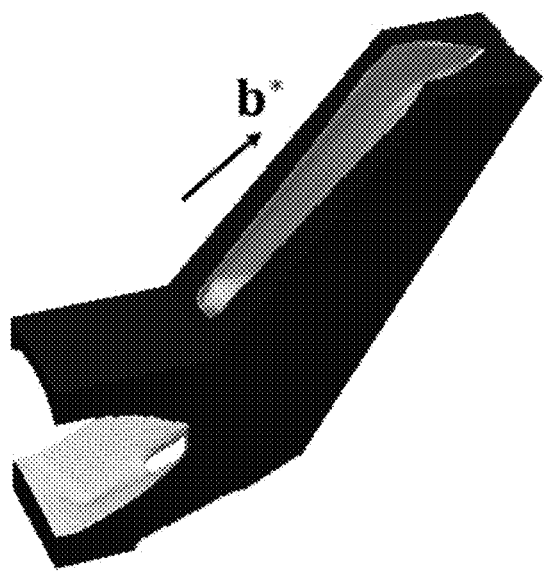
FIG. 14E1
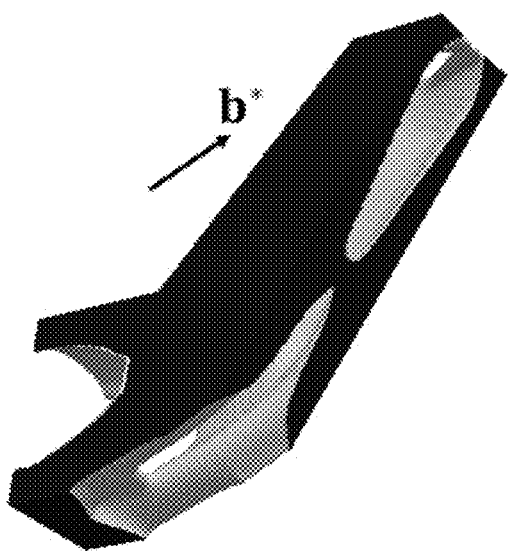
FIG. 14E2

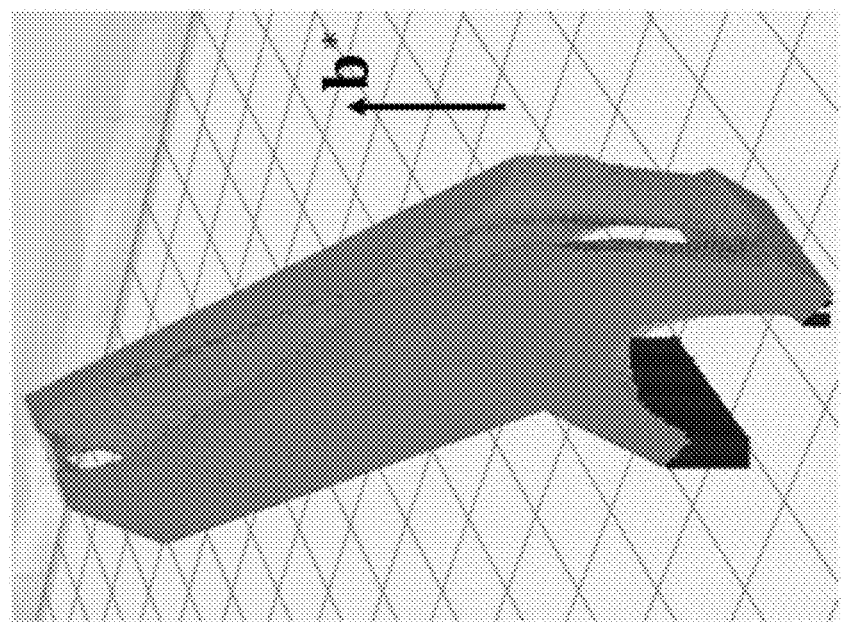
FIG. 14G
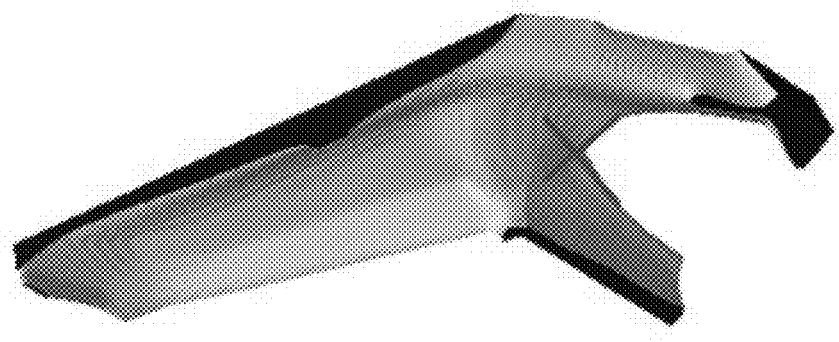
FIG. 14F2
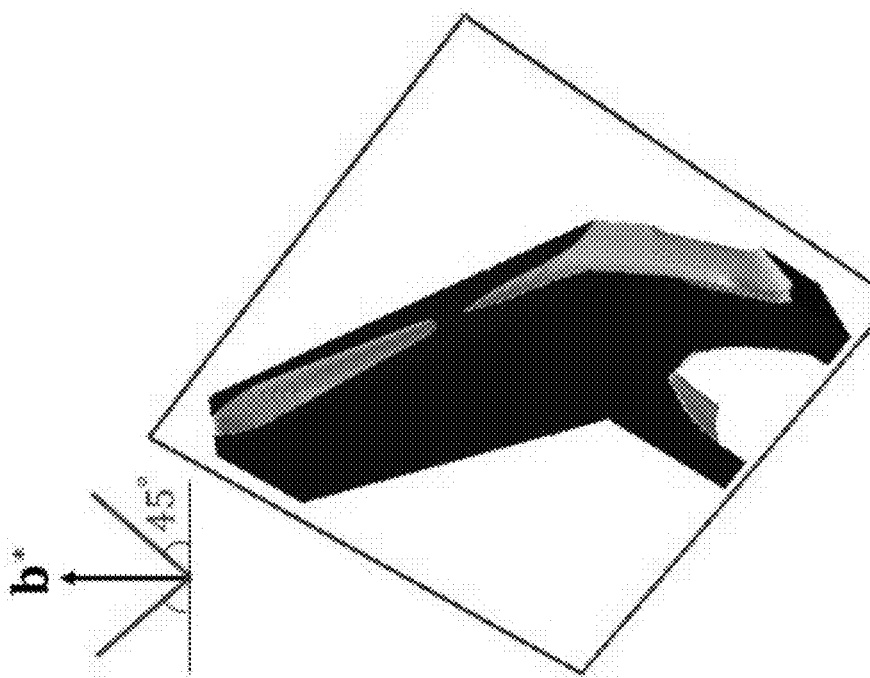
FIG. 14F1

SYSTEMS, METHODS, AND MEDIA FOR CONTROLLING SUPPORT STRUCTURES AND BUILD ORIENTATION IN MANUFACTURING

STATEMENT REGARDING FEDERALLY SPONSORED RESEARCH

This invention was made with government support under 1561917 awarded by the National Science Foundation and under N00014-18-1-2685 awarded by the NAVY/ONR. The government has certain rights in the invention.

CROSS-REFERENCES TO RELATED APPLICATIONS

N/A

BACKGROUND

Additive manufacturing techniques deposit successive layers of material on a build plate to fabricate parts, and consequently are not as limited by geometrical complexity of the design as traditional manufacturing techniques. The ability of additive manufacturing can be further leveraged using topology optimization techniques to design parts, which can freely distribute materials within a given design domain to satisfy a particular set of constraints which can produce better performing parts than traditionally designed parts (e.g., comparable performance with less material, better performance with less material, etc.). However, while combining topology optimization and additive manufacturing can facilitate the design and fabrication of parts that are light weight, with enhanced performance, and are arbitrarily geometrically complex, for certain parts or portions of parts that are downfacing (e.g., areas with shape undercuts), sacrificial support structures must be used to hold subsequent layers. Without such support structures, parts with downfacing areas (e.g., due to large overhang volume) may collapse under the influence of gravity during the additive manufacturing process and/or may not form properly (e.g., because there is no underlying substrate on which to add the material).

Therefore, while arbitrarily complex parts can be designed and fabricated, the addition of support structures and the necessity of removing those support structures can mitigate some of the advantages of using additive manufacturing techniques, especially in combination with topology optimization techniques that often produce very complex shapes with large areas of overhang. For example, removing support structures can be tedious and laborious for some additive manufacturing processes, and can lead to deterioration of surface quality where the support structure(s) meet the manufactured part. In a more particular example, support structures can account for approximately 6% to 42% of the total material used to manufacture a part, and can account for up to approximately 64% of the manufacturing time. Additionally, removal of the support structures requires additional time for every part manufactured. Thus, the fabrication of support structures can lead to waste of materials, build time, and energy.

While techniques have been developed to attempt to reduce or minimize the amount of overhang within the design domain, Accordingly, new systems, methods, and media for controlling support structures and build orientation in manufacturing are desirable.

SUMMARY

In accordance with some embodiments of the disclosed subject matter, systems, methods, and media for controlling support structures and build orientation in manufacturing are provided.

In accordance with some embodiments of the disclosed subject matter, a method for additive manufacturing a part using a three dimensional (3D) printing system, the 3D printing system including a print head and a build plate is provided, the method comprising: receiving a plurality of physical constraints associated with the part; optimizing a build orientation of the part to identify an optimized build orientation b* for the part with respect to a design domain defined by the physical constraints based on the plurality of physical constraints, and a plurality of design constraints using at least one variable associated with build orientation as an optimization variable, the plurality of design constraints comprising: an initial build orientation $b^0$; and a critical surface slope angle $\bar{\alpha}$; and generating a part model based on the optimized build orientation b*.

In some embodiments, the method further comprises causing the part to be manufactured at the optimized build orientation b* by instructing the print head to deposit material additively to manufacture the part, wherein the manufactured part is a physical representation of the part model.

In some embodiments, optimizing the build orientation controls an amount of support structure required to manufacture the generated part model.

In some embodiments, the plurality of design constraints further comprises an undercut perimeter constraint $\bar{P}_\alpha$ that constrains a projected undercut perimeter within the design domain of the part to be less than or equal to a non-zero allowable projected undercut perimeter, the projected undercut perimeter corresponding to a perimeter quantity of a surface of the part with undercut projected along a build orientation within the design domain.

In some embodiments, optimizing the build orientation comprises: identifying locations along the surface of the part that are within the design domain having a slope $\alpha$ with respect to the build orientation that is less than the critical surface slope angle $\bar{\alpha}$; and calculating the projected undercut perimeter based on the identified locations within the design domain.

In some embodiments, identifying any locations along the surface of the part having a slope $\alpha$ with respect to the build orientation that is less than the critical surface slope angle $\bar{\alpha}$ comprises generating a Heaviside projection of a density gradient representing a current iteration of the part with respect to a build orientation of the current iteration; and calculating the projected undercut perimeter based on the identified locations comprises integrating the Heaviside projection of the density gradient over the design domain.

In some embodiments, the plurality of design constraints further comprises an external support area constraint $\bar{Q}_\alpha$ that constrains a projected boundary undercut perimeter at the boundary of a design domain to be less than or equal to a non-zero allowable projected undercut perimeter, the projected boundary undercut perimeter corresponding to a perimeter quantity of a surface of the part with undercut projected along a build orientation at the boundary of the design domain.

In some embodiments, optimizing the build orientation comprises: identifying locations along the surface of the part that are at the boundary of the design domain having a slope $\alpha$ with respect to the build orientation that is less than the critical surface slope angle $\bar{\alpha}$; and calculating the projected boundary undercut perimeter based on the identified locations at the boundary.

In some embodiments, identifying locations along the surface of the part that are at the boundary of the design domain having a slope $\alpha$ with respect to the build orientation that is less than the critical surface slope angle $\bar{\alpha}$ comprises generating a Heaviside projection of a density field representing a current iteration of the part with respect to a build orientation of the current iteration; and calculating the projected boundary undercut perimeter based on the identified locations comprises integrating the Heaviside projection of the density field over a portion of the boundary of the design domain facing the build plate.

In some embodiments, the method further comprises: optimizing a topology of the part to identify a density field $\underline{\gamma}$ representing an optimized topology for the part based on the plurality of physical constraints, and at least a subset of the plurality of design constraints using at least one variable associated with density as an optimization variable to optimize compliance of the part, the subset of the plurality of design constraints comprising: an allowed volume fraction is $V_f$; the critical surface slope angle $\bar{\alpha}$; an undercut perimeter constraint $\bar{P}_{\bar{\alpha}}$; and generating the part model is based on the optimized build orientation b*, and the density field representing the optimized topology.

In some embodiments, the at least one variable associated with build orientation comprises $\Theta$, wherein for 2D parts $\Theta$ corresponds to an angle $\theta$ with respect to an axis of the design domain, and build orientation is defined as b=(cos $\theta$, sin $\theta$) $0\leq\theta\leq2\pi$; and for 3D parts $\Theta$ corresponds to angles $\phi$ with respect to a first axis of the design domain, and $\psi$ with respect to a second axis of the design domain, and build orientation is defined as b=(sin $\phi$ cos $\psi$, sin $\phi$ sin $\psi$, cos $\phi$) $0\leq\phi\leq\pi$, $0\leq\psi\leq\pi$.

In some embodiments, a non-transitory computer readable medium containing computer executable instructions that, when executed by a processor, cause the processor to perform a method for additive manufacturing a part using a three dimensional (3D) printing system, the 3D printing system including a print head and a build plate is provided, the method comprising: receiving a plurality of physical constraints associated with the part; optimizing a build orientation of the part to identify an optimized build orientation b* for the part with respect to a design domain defined by the physical constraints based on the plurality of physical constraints, and a plurality of design constraints using at least one variable associated with build orientation as an optimization variable, the plurality of design constraints comprising: an initial build orientation $b^0$; and a critical surface slope angle $\bar{\alpha}$; and generating a part model based on the optimized build orientation b*.

In some embodiments, a system for additive manufacturing a part is provided, the system comprising: a print head; a build plate, a memory; and at least one hardware processor that is programmed to: receive a plurality of physical constraints associated with the part; optimize a build orientation of the part to identify an optimized build orientation b* for the part with respect to a design domain defined by the physical constraints based on the plurality of physical constraints, and a plurality of design constraints using at least one variable associated with build orientation as an optimization variable, the plurality of design constraints comprising: an initial build orientation $b^0$; a critical surface slope angle $\bar{\alpha}$; and generate a part model based on the optimized build orientation b*; and cause the part model to be stored in the memory.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various objects, features, and advantages of the disclosed subject matter can be more fully appreciated with reference to the following detailed description of the disclosed subject matter when considered in connection with the following drawings, in which like reference numerals identify like elements.

FIG. 1A shows an example of a design of a part that can be fabricated using additive manufacturing techniques.

FIG. 1B shows an example of an optimized design of the part shown in FIG. 1A given various constraints.

FIG. 1C1 shows an example of the optimized design of FIG. 1B with vectors illustrating a first build orientation b and a definition of a slope $\alpha$ with respect to the build orientation.

FIG. 1C2 shows an example of the optimized design of FIG. 1B with projected internal and external undercut perimeters $P_{\bar{\alpha}}$ and $Q_{\bar{\alpha}}$ based on a critical surface slope c with respect to the build orientation.

FIG. 1D1 shows an example of the optimized design of FIG. 1B with vectors illustrating a second build orientation b and a definition of a slope $\alpha$ with respect to the build orientation.

FIG. 1D2 shows an example of the optimized design of FIG. 1B with projected internal and external undercut perimeters $P_{\bar{\alpha}}$ and $Q_{\bar{\alpha}}$ based on a critical surface slope $\bar{\alpha}$ with respect to the build orientation, and an illustration showing the build orientation forming an angle $\theta$ with respect to the coordinates of the part.

FIG. 2A1 shows an example of an optimized design of a part without any undercut perimeter constraints applied and with an initial build orientation b.

FIG. 2A2 shows an example of a directional gradient of density for the design of FIG. 2A1.

FIG. 2A3 shows an example of a result of applying a Heaviside function to the directional gradient of density shown in FIG. 2A2 indicating areas of non-self-supporting internal boundaries.

FIG. 2B1 shows an example of the design of the part in FIG. 2A1 without any undercut perimeter constraints applied and with another build orientation b.

FIG. 2B2 shows an example of a directional gradient of density for the design of FIG. 2B1.

FIG. 2B3 shows an example of a result of applying a Heaviside function to the directional gradient of density shown in FIG. 2B2 indicating areas of non-self-supporting internal boundaries.

FIG. 2C1 shows an example of the design of the part in FIG. 2A1 without any undercut perimeter constraints applied and with yet another build orientation b.

FIG. 2C2 shows an example of a directional gradient of density for the design of FIG. 2C1.

FIG. 2C3 shows an example of a result of applying a Heaviside function to the directional gradient of density shown in FIG. 2C2 indicating areas of non-self-supporting internal boundaries.

FIG. 3A shows an example of an optimized design of a part without any undercut perimeter constraints applied.

FIG. 3B1 shows an example of a result of applying a Heaviside function to a directional gradient of density a directional gradient of density for the design of FIG. 3A for a first build orientation b indicating areas of non-self-supporting internal boundaries.

FIG. 3B2 shows an example highlighting areas of the external boundary requiring support structures based on the first build orientation b.

FIG. 3C1 shows an example of a result of applying a Heaviside function to a directional gradient of density a directional gradient of density for the design of FIG. 3A for a second build orientation b indicating areas of non-self-supporting internal boundaries.

FIG. 3C2 shows an example highlighting areas of the external boundary requiring support structures based on the second build orientation b.

FIG. 3D1 shows an example of a result of applying a Heaviside function to a directional gradient of density a directional gradient of density for the design of FIG. 3A for a third build orientation b indicating areas of non-self-supporting internal boundaries.

FIG. 3D2 shows an example highlighting areas of the external boundary requiring support structures based on the third build orientation b.

FIG. 9A shows an example of a design specification for a two dimensional MBB beam.

FIG. 9B1 shows an example of an optimized design based on the specification shown in FIG. 9A without any surface slope constraints.

FIG. 9B2 shows an example of an optimized design based on the specification shown in FIG. 9A with a surface slope constraint of 45° and a prescribed first build orientation.

FIG. 9B3 shows an example of an optimized design based on the specification shown in FIG. 9A with a surface slope constraint of 45° and a prescribed second build orientation.

FIG. 9B4 shows an example of an optimized design based on the specification shown in FIG. 9A with a surface slope constraint of 45° and an initial build orientation of 45°, and using build orientation as an optimization variable using mechanisms described herein for controlling support structures and build orientation in manufacturing in accordance with some embodiments of the disclosed subject matter.

FIGS. 9C1 to 9C4 show intermediate designs for the design shown in FIG. 9B4 at various iterations while using build orientation as an optimization variable using mechanisms described herein for controlling support structures and build orientation in manufacturing in accordance with some embodiments of the disclosed subject matter.

FIGS. 9D1 to 9D4 show Heaviside projections for the intermediate designs shown in FIGS. 9C1 to 9C4 indicating areas of non-self-supporting internal boundaries.

FIG. 9F1 shows an example of an optimized design based on the specification shown in FIG. 9A with a surface slope constraint of 45° and an initial build orientation of 90°, using build orientation as an optimization variable using mechanisms described herein for controlling support structures and build orientation in manufacturing in accordance with some embodiments of the disclosed subject matter.

FIG. 9G1 shows a graph of convergence history of various variables for intermediate designs for the design shown in FIG. 9F1 at various iterations.

FIG. 9F2 shows an example of an optimized design based on the specification shown in FIG. 9A with a surface slope constraint of 45° and an initial build orientation of 135°, using build orientation as an optimization variable using mechanisms described herein for controlling support structures and build orientation in manufacturing in accordance with some embodiments of the disclosed subject matter.

FIG. 9G2 shows a graph of convergence history of various variables for intermediate designs for the design shown in FIG. 9F2 at various iterations.

FIG. 9H1 shows an example of an optimized design based on the specification shown in FIG. 9A with a relatively small volume fraction constraint $V_f=0.3$, and without any surface slope constraints.

FIG. 9H2 shows an example of an optimized design based on the specification shown in FIG. 9A with a relatively small volume fraction constraint $V_f=0.3$, with a surface slope constraint of 45°, and a prescribed first build orientation.

FIG. 9H3 shows an example of an optimized design based on the specification shown in FIG. 9A with a relatively small volume fraction constraint $V_f=0.3$, with a surface slope constraint of 45°, and using build orientation as an optimization variable using mechanisms described herein for controlling support structures and build orientation in manufacturing in accordance with some embodiments of the disclosed subject matter.

FIG. 10A shows an example of a design specification for a two dimensional L-shaped beam.

FIG. 10B1 shows an example of an optimized design based on the specification shown in FIG. 10A without any surface slope constraints.

FIG. 10B2 shows an example of an optimized design based on the specification shown in FIG. 10A with a surface slope constraint of 45° and a prescribed first build orientation.

FIG. 10C1 shows an example of an optimized design based on the specification shown in FIG. 10A with a surface slope constraint of 45° and an initial build orientation of 0°, using build orientation as an optimization variable using mechanisms described herein for controlling support structures and build orientation in manufacturing in accordance with some embodiments of the disclosed subject matter.

FIG. 10C2 shows an example of an optimized design based on the specification shown in FIG. 10A with a surface slope constraint of 45° and an initial build orientation of 45°, using build orientation as an optimization variable using mechanisms described herein for controlling support structures and build orientation in manufacturing in accordance with some embodiments of the disclosed subject matter.

FIG. 10C3 shows an example of an optimized design based on the specification shown in FIG. 10A with a surface slope constraint of 45° and an initial build orientation of 90°, using build orientation as an optimization variable using mechanisms described herein for controlling support structures and build orientation in manufacturing in accordance with some embodiments of the disclosed subject matter.

FIG. 11A shows an example of a design specification for a two dimensional hook.

FIG. 11B1 shows an example of an optimized design based on the specification shown in FIG. 11A without any surface slope constraints.

FIG. 11B2 shows an example of an optimized design based on the specification shown in FIG. 11A with a surface slope constraint of 45° and a prescribed first build orientation.

FIG. 11C shows an example of an optimized design based on the specification shown in FIG. 11A with a surface slope constraint of 45° and an initial build orientation of 45°, using build orientation as an optimization variable using mechanisms described herein for controlling support structures and build orientation in manufacturing in accordance with some embodiments of the disclosed subject matter.

FIGS. 11D1 to 11D9 show intermediate designs for the design shown in FIG. 11C at various iterations while using build orientation as an optimization variable using mechanisms described herein for controlling support structures and build orientation in manufacturing in accordance with some embodiments of the disclosed subject matter.

FIG. 12A shows an example of a design specification for a two dimensional cantilever beam with an internal cutout.

FIG. 12B shows an example of an optimized design based on the specification shown in FIG. 12A without any surface slope constraints.

FIG. 12C1 shows an example of an optimized design based on the specification shown in FIG. 12A with a surface slope constraint of 45° applied only on internal boundaries and an initial build orientation of 45°, using build orientation as an optimization variable using mechanisms described herein for controlling support structures and build orientation in manufacturing in accordance with some embodiments of the disclosed subject matter.

FIG. 12C2 shows an example of an optimized design based on the specification shown in FIG. 12A with a surface slope constraint of 45° applied to both internal boundaries and external boundaries with an upper bound of $\overline{Q_\alpha}=0.1$, and an initial build orientation of 45°, using build orientation as an optimization variable using mechanisms described herein for controlling support structures and build orientation in manufacturing in accordance with some embodiments of the disclosed subject matter.

FIG. 12C3 shows an example of an optimized design based on the specification shown in FIG. 12A with a surface slope constraint of 45° applied to both internal boundaries and external boundaries with an upper bound of $\overline{Q_\alpha}=0.025$, and an initial build orientation of 45°, using build orientation as an optimization variable using mechanisms described herein for controlling support structures and build orientation in manufacturing in accordance with some embodiments of the disclosed subject matter.

FIG. 13D shows an example of an evolution of build orientation during an optimization of a design based on the specification shown in FIG. 13A with a surface slope constraint of 45° applied only on internal boundaries, and an initial build orientation of (0°, 90°), using build orientation as an optimization variable using mechanisms described herein for controlling support structures and build orientation in manufacturing in accordance with some embodiments of the disclosed subject matter.

FIGS. 13E1 and 13E2 show different views of a final optimized design based on the specification shown in FIG. 13A and the constraints described above in connection with FIG. 13D.

FIG. 13F1 shows the final optimized design of FIGS. 13E1 and 13E2 rotated such that build orientation is aligned with the normal of the build plate.

FIG. 13F2 to 13F4 show cutaways at various z values of the part shown in FIG. 13F1.

FIG. 13G shows an example of the optimized part of FIG. 13F1 printed with support structures.

FIG. 13H shows an example of an evolution of build orientation during an optimization of a design based on the specification shown in FIG. 13A with a surface slope constraint of 45° applied to both internal boundaries and external boundaries with an upper bound of $\overline{Q_\alpha}=0.05$, and an initial build orientation of (0°, 90°), using build orientation as an optimization variable using mechanisms described herein for controlling support structures and build orientation in manufacturing in accordance with some embodiments of the disclosed subject matter.

FIGS. 13I1 and 13I2 show different views of a final optimized design based on the specification shown in FIG. 13A and the constraints described above in connection with FIG. 13H.

FIG. 13J1 shows the final optimized design of FIGS. 13I1 and 13I2 rotated such that build orientation is aligned with the normal of the build plate.

FIG. 13J2 shows a cutaway at a y value of the part shown in FIG. 13J1.

FIG. 13K shows an example of the optimized part of FIG. 13J1 printed with support structures.

FIG. 14A shows an example of a design specification for a three dimensional antenna bracket.

FIG. 14B shows an example of an optimized design based on the specification shown in FIG. 14A without any surface slope constraints.

FIG. 14C shows an example of the optimized part of FIG. 14B printed with support structures.

FIG. 14D shows an example of an evolution of build orientation during an optimization of a design based on the specification shown in FIG. 14A with a surface slope constraint of 45° applied only on internal boundaries, and an initial build orientation of (45°, 0°), using build orientation as an optimization variable using mechanisms described herein for controlling support structures and build orientation in manufacturing in accordance with some embodiments of the disclosed subject matter.

FIGS. 14E1 and 14E2 show different views of a final optimized design based on the specification shown in FIG. 14A and the constraints described above in connection with FIG. 14D.

FIG. 14F1 shows the final optimized design of FIGS. 14E1 and 14E2 rotated such that build orientation is aligned with the normal of the build plate.

FIG. 14F2 shows a cutaway at a y value of the part shown in FIG. 14F1.

FIG. 14G shows an example of the optimized part of FIG. 14F1 visualized as a simulation of the printed part with support structures.

DETAILED DESCRIPTION

Figure 4B:
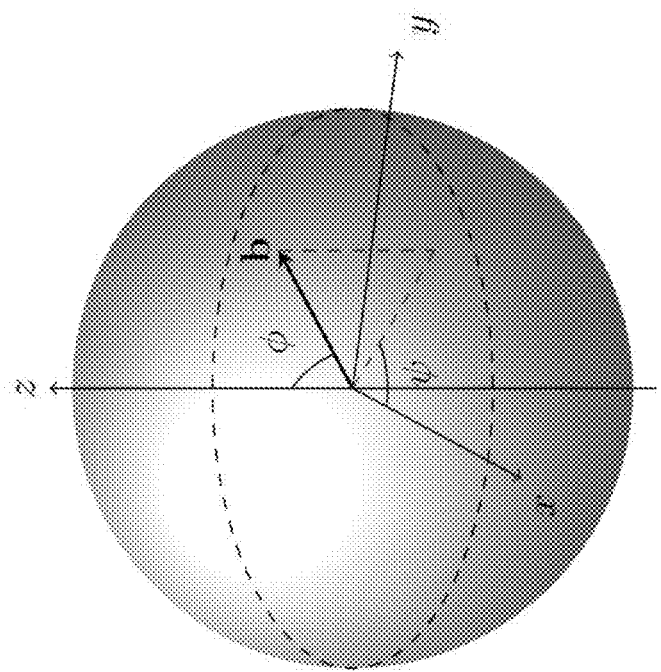
FIG. 4B shows an example of a scheme for representing build orientation with respect to part geometry in three dimensions using angles ψ φ and in accordance with some embodiments of the disclosed subject matter.

In accordance with some embodiments of the disclosed subject matter, mechanisms described herein can optimize the build orientation and/or the topological layout of a part to reduce or eliminate support structures within the design domain and/or outside of the design domain (e.g., between the build plate and the design domain) required to fabricate the part using additive manufacturing techniques.

In some embodiments, mechanisms described herein can utilize a constraint on a lower bound of the surface slope of the optimized design, e.g., such that $\alpha < \bar{\alpha}$, where $\bar{\alpha}$ is the smallest slope of at which a surface can be fabricated by additive processes without an underlying support structure. Additionally, in some embodiments, mechanisms described herein can simultaneously optimize with respect to build orientation to select a build orientation that reduces the total support structure required (e.g., within the structure of the part and/or outside the structure of the part).

In some embodiments, mechanisms described herein can apply a density gradient-based constraint to control a surface slop within the design domain, and a density-based constraint to control a surface slope of the design domain boundary. Since the density gradient vanishes on the boundary of design domain, a density gradient-based formulation cannot be used to control or eliminate supports outside of the design domain, but can be used to control the surface slope of solid/void interfaces inside the design domain and thereby reduce or eliminate internal supports.

In some embodiments, mechanisms described herein can simultaneously optimize build orientation and topology of a part (e.g., using techniques based on three-field simplified isotropic material with penalization (SIMP)). As described below, formulations for controlling the surface slope are differentiable to both the build orientation and the density field.

In general, topology optimization can include design techniques that generate an optimized topology and shape under one or more physical constraints. Topology optimization often generates parts of complex shapes that are difficult or impossible to create using conventional manufacturing techniques, but that can be readily created using additive manufacturing techniques.

FIG. 1A shows an example of a design of a part that can be fabricated using additive manufacturing techniques, and FIG. 1B shows an example of an optimized design of the part given various constraints. Note that FIG. 1B is a simplified example of an optimized part for illustrating concepts described herein. As described below in connection with FIGS. 9A to 14G, topology optimized parts often take on much more complex shapes. As shown in FIG. 1B, the optimized part includes les material, which was achieved by removing one corner, and creating a void within the interior of the part. As shown in FIG. 1B, the part is represented using physical density $\tilde{\bar{\gamma}}$ which can be obtained from an optimization variable γ using density filtering, and Heaviside filtering.

FIG. 1C1 show an example of the optimized design of FIG. 1B with vectors illustrating a first build orientation b and a definition of a slope α with respect to the build orientation, and FIG. 1C2 shows projected internal and external undercut perimeters $P_{\bar{\alpha}}$ and $Q_{\bar{\alpha}}$ based on a critical surface slope $\bar{\alpha}$ with respect to the build orientation. As shown in FIG. 1C2, where the angle between a surface and the build orientation b is less than the critical surface slope $\bar{\alpha}$ (e.g., less than 45°), a support structure may be required to insure that the surface forms properly.

FIG. 1D1 shows an example of the optimized design of FIG. 1B with vectors illustrating a second build orientation b and a definition of a slope α with respect to the build orientation, and FIG. 1D2 shows projected internal and external undercut perimeters $P_{\bar{\alpha}}$ and $Q_{\bar{\alpha}}$ based on critical surface slope $\bar{\alpha}$ with respect to the build orientation, and an illustration showing the build orientation forming an angle θ with respect to the coordinates of the part. As shown in FIG. 1D2, as the build orientation b changes with respect to the geometry of the part, the amount of the surface having an angle less than the critical surface slope $\bar{\alpha}$ changes. The internal undercut perimeter $P_{\bar{\alpha}}$ (e.g., the amount of surface within the design domain that has a surface slope less than the critical surface slope $\bar{\alpha}$) is reduced in comparison to the first build orientation in FIG. 1C2, as is the external undercut perimeter $Q_{\bar{\alpha}}$ (e.g., the amount of surface at the interface of the design domain that has a surface slope less than the critical surface slope $\bar{\alpha}$). Note that in the example of FIGS. 1C2 and 1D2, only the build orientation is changed, but as described below In some embodiments, a length or area of a part having a surface slope less than the critical surface slope $\bar{\alpha}$ is sometimes referred to using various terms, such as downfacing area or support area, and during the design process can be referred to as a projected undercut perimeter (PUP), which can be generally proportional to the amount of support structures needed (e.g., as PUP increases, the number of support structures generally increases, although the volume of material represented by the support structures may not be directly proportional to PUP). As described below, PUP is generally computable and differentiable for both boundaries that are inside of the design volume and for boundaries of the design volume itself without explicit knowledge of the boundary. As shown in FIGS. 1C2 and 1D2, an interior PUP can correspond with a perimeter length $P_{\bar{\alpha}}$ of a boundary with undercut within the design domain, projected along the build orientation b, while an exterior PUP can correspond with a perimeter length $Q_{\bar{\alpha}}$ of a boundary with undercut at the boundary of the design domain, projected along the build orientation b. In some embodiments, PUP can represent a projected undercut length for 2D designs, and a projected undercut area for 3D designs. As PUP becomes smaller, undercut volume generally becomes asymptotically smaller until there is no undercut.

As shown in FIGS. 1C1 and 1D1, the surface slope α can be represented by the directional gradient from the build orientation b and the density gradient $\nabla \tilde{\bar{\gamma}}$. Accordingly, any constraint on α can be transformed to operations on $\nabla \tilde{\bar{\gamma}}$. To impose constraints on the local field $\nabla \tilde{\bar{\gamma}}$, a Heaviside Projection-based Aggregation (HPA) formulation can be applied, as described in more detail below (e.g., in connection with EQS. (5) to (9)). For example, an HPA-based value $P_{\bar{\alpha}}$ can indicate PUP for a given surface slope limit $\bar{\alpha}$. In such examples, a single global constraint on $P_{\overline{\alpha}}$ can be used to efficiently control the surface slope of solid/void interfaces inside the design domain. For example, in FIGS. 1C2 and 1D2, $P_{\overline{\alpha}}$ is illustrated for different build orientations b. As described below, $P_{\overline{\alpha}}$ can be calculated by integrating a Heaviside-projected density gradient $H_{\overline{\alpha}}(b, \nabla\tilde{\tilde{\gamma}})b\cdot\nabla\tilde{\tilde{\gamma}}$, which is differentiable to the build orientation b.

As shown in FIGS. 1C1 and 1D1, the surface slope α can be characterized by the build orientation b and the boundary normal n. In a density-based topology optimization, the optimized design $\tilde{\tilde{\gamma}}$ generally is forced to have a clear solid/void interface, and the boundary normal n of the solid/void interface can be approximated using the density gradient as $\nabla\tilde{\tilde{\gamma}}/\|\nabla\tilde{\tilde{\gamma}}\|_2$. Accordingly, for internal solid/void interface, the surface slope α can be related to the surface normal and build orientation using the relationship:

$$\cos(\alpha) = b \cdot n \approx b \cdot \left(\frac{\nabla\tilde{\tilde{\gamma}}}{\|\nabla\tilde{\tilde{\gamma}}\|_2}\right), \quad (1)$$

where b is a unit vector and $\|\cdot\|_2$ denotes the Euclidean norm. For the external boundary of the design domain, the boundary normal n is explicitly available (e.g., based on the dimensions of the design domain and the orientation of the design with respect to the build plate). Accordingly, the surface slope can be represented using the relationship:

$$\cos(\alpha) = -b \cdot n, \quad (2)$$

As described above, in additive manufacturing processes, overhanging surfaces of small slope (i.e., slope less than a critical slope $\overline{\alpha}$) will likely collapse if there are no support structures. Therefore, for self-support, the lower bound of the surface slope can be constrained explicitly constrained such that $\alpha \geq \overline{\alpha}$. Considering EQS. (1) and (2), in order to control the surface slope of internal solid/void interfaces in order to eliminate internal supports, a constraint can be applied at points within the design domain in accordance with the following relationship:

$$b \cdot \left(\frac{\nabla\tilde{\tilde{\gamma}}}{\|\nabla\tilde{\tilde{\gamma}}\|_2}\right) \leq \cos(\overline{\alpha}), \quad (3)$$

Similarly, in order to control the surface slope of the external boundary in order to eliminate external supports, a constraint can be applied at points at the boundary of the design domain in accordance with the following relationship:

$$-b \cdot n \leq \cos(\overline{\alpha}), \quad (4)$$

FIG. 2A1 shows an example of an optimized design of a part without any undercut perimeter constraints applied and with an initial build orientation b, FIG. 2A2 shows a directional gradient of density for the design, and FIG. 2A3 shows an example of a result of applying a Heaviside function to the directional gradient of density shown in FIG. 2A2 indicating areas of non-self-supporting internal boundaries (e.g., downfacing areas).

FIG. 2B1 shows an example of the design of the part in FIG. 2A1 without any undercut perimeter constraints applied and with another build orientation b, FIG. 2B2 shows a directional gradient of density for the design, and FIG. 2B3 shows an example of a result of applying a Heaviside function to the directional gradient of density shown in FIG. 2B2 indicating areas of non-self-supporting internal boundaries.

FIG. 2C1 shows an example of the design of the part in FIG. 2A1 without any undercut perimeter constraints applied and with yet another build orientation b, FIG. 2C2 shows a directional gradient of density for the design, and FIG. 2C3 shows an example of a result of applying a Heaviside function to the directional gradient of density shown in FIG. 2C2 indicating areas of non-self-supporting internal boundaries.

As shown in FIG. 2A1, with a build orientation of b=(0, 1) (e.g., "up" in FIG. 2A1), multiple surfaces 202, 204, and 206 have a slope that is relatively small with respect to the build orientation, and therefore are unlikely to be self-supporting. As shown in FIGS. 2A2, 2B2, and 2C2, the directional gradient of density, $b \cdot \nabla\tilde{\tilde{\gamma}}$, generally varies smoothly and differentially with respect to the build orientation b. As shown in FIGS. 2A3, 2B3, and 2C3, the integrand $H_{\overline{\alpha}}(b, \nabla\tilde{\tilde{\gamma}})b\cdot\nabla\tilde{\tilde{\gamma}}$ highlights support areas at the solid/void interfaces that need support structures for the given build orientation b. FIG. 2 also illustrates that when the build orientation changes from b=(0, 1) in FIGS. 2A1 to 2A3 to $$b = \left(\frac{\sqrt{3}}{2}, \frac{1}{2}\right)$$

in FIGS. 2C1 to 2C3, the non-self-supporting surfaces 202 and 204 gradually become self-supported or insignificant compared to other overhanging surfaces, as illustrated by the value of the indicated by the values of the integrand $H_{\overline{\alpha}}(b, \nabla\tilde{\tilde{\gamma}})b\cdot\nabla\tilde{\tilde{\gamma}}$ in FIGS. 2A3, 2B3, and 2C3. Accordingly, the example shown in FIGS. 2A1 to 2C3 supports using the projected density gradient to form a differential constraint to use in optimizing build orientation b.

However, as described above, because the density gradient vanishes at the border of the design domain, a directional gradient-based constraint can only control the interior solid/void interface to eliminate internal supports. As described above in connection with EQ. (4), a density-based constraint can also be applied in order to control the surface slope of an external boundary in order to eliminate external supports while optimizing for build orientation b. Although external supports can be more easily removed than internal supports, mechanisms described herein for reducing external supports can facilitate balancing between material savings of external supports and desired performance. Additionally, removing external supports may still cause blemishes in the exterior of the part and/or may require additional labor to remove without damaging the part. In conventional design techniques, adjusting the amount of external supports is generally not considered because the external build orientation is prescribed. For example, a 2D rectangle or 3D box is generally used as the design domain with the build orientation b prescribed to align with an axis of the design domain such that a partial boundary of the design domain contacts the build plate. However, as build orientation evolves during an optimization in which build orientation is permitted to change as an optimization parameter, the orientation of the design domain changes with respect to the build plate, which leads to different amounts of external supports being required. For the boundary of the design domain, the normal of the boundary and the build orientation can be used to represent the surface slope. Then a density based HPI can be used to predict the projected perimeter of non-self-supporting external boundary $Q_{\bar{\alpha}}$. Similarly, external supports can be suppressed by constraining an upper bound of $Q_{\bar{\alpha}}$. As described above, because the relationship used to define $Q_{\bar{\alpha}}$ is differentiable, build orientation can be optimized to reduce external supports based on $Q_{\bar{\alpha}}$.

In general, the surface slope constraints described above in connection with EQS. (3) and (4) are locally defined at every material point inside the design domain and on the boundary, respectively. However, using local constraints such as these can often make convergence of the optimization algorithm difficult, and can increase the computational cost of optimizing the design and/or build orientation. In some embodiments, Heaviside projection based aggregation (HPA) techniques can be used to increase the efficiency of the optimization. For example, the local constraints described above in connection with EQS. (3) and (4) can be projected using a Heaviside function to nonnegative numbers and integrated over the domain, then the integral can be constrained by a small positive number to eliminate violations of the local constraints. Using one or more HPA techniques, two single global constraints can be used to efficiently control local surface slope of the internal solid/void interface and the external boundary. In some embodiments, a smoothed Heaviside function can be used to implement one or more HPA techniques, such as a smoothed Heaviside function that can be represented by the following relationship:

$$H(\xi) = \frac{1}{1+e^{-2\beta\xi}}, \quad (5)$$

where parameter $\beta$ controls the transition sharpness of the function near $\xi=0$. In some embodiments, $\beta$ can be set to any suitable value. For example, $\beta$ can be set to 10, which was derived empirically.

In some embodiments, mechanisms described herein can use a constraint parameter $\bar{P}_{\bar{\alpha}}$ to control an HPA of the local constraints described above in connection with EQ. (3) on surface slope of the internal solid/void interface, which can be represented using the relationship:

$$P_{\bar{\alpha}} \equiv \frac{\int_\Omega H_{\bar{\alpha}}(b, \nabla\tilde{\gamma})b \cdot \nabla\tilde{\gamma}d\Omega}{\bar{A}} \leq \bar{P}_{\bar{\alpha}}, \quad (6)$$

where $\bar{A}$ is the projected area of the design domain on the build plate, $\Omega$, can represent the design domain. In EQ. (6) above, and elsewhere, $\bar{A}$ can represent the characteristic length of area of the design domain, which can be assumed to be independent of the build direction. For example, $\bar{A}$ can be set to the length of one edge of the design domain for 2D cases, and an area of one surface for 3D cases. Normalizing the aggregation using $\bar{A}$ can reduce the dependence of $P_{\bar{\alpha}}$ on the dimension of the design domain. $H_{\bar{\alpha}}(b, \nabla\tilde{\gamma})$ can represent the following:

$$H_{\bar{\alpha}}(b, \nabla\tilde{\gamma}) \equiv H\left(b \cdot \frac{\nabla\tilde{\gamma}}{\|\nabla\tilde{\gamma}\|_2} - \cos(\bar{\alpha})\right), \quad (7)$$

Physically, $P_{\bar{\alpha}}$ can represent the projected perimeter of the non-self-supporting solid/void interface inside the design domain. The integrand $H_{\bar{\alpha}}(b, \nabla\tilde{\gamma})b \cdot \tilde{\gamma}$ in EQ. (6) is positive on the solid/void interface where $\alpha<\bar{\alpha}$, and vanishes elsewhere. Integrating over the design domain and constraining the integral with a small positive value of $\bar{P}_{\bar{\alpha}}$ can push the design in a direction in which non-self-supporting solid/void interface is reduced.

In some embodiments, mechanisms described herein can use a constraint parameter $\bar{Q}_{\bar{\alpha}}$ to control an HPA of the local constraints in EQ. (4) on surface slope of the external boundary, which can be represented using the relationship:

$$Q_{\bar{\alpha}} \equiv \frac{\int_\Gamma -H_{\bar{\alpha}}(b, -n)b \cdot n\tilde{\gamma}d\Gamma}{\bar{A}} \leq \bar{Q}_{\bar{\alpha}}, \quad (8)$$

where $\Gamma$ can represent the border line or surface of the design domain, and $H_{\bar{\alpha}}(b, -n)$ can represent the following:

$$H_{\bar{\alpha}}(b,-n) \equiv H(-b \cdot n - \cos(\bar{\alpha})). \quad (9)$$

Physically, $Q_{\bar{\alpha}}$ can represent the projected perimeter of the non-self-supporting external boundary. Similar to the integrand described above in connection with EQ. (6), the integrand $H_{\bar{\alpha}}(b, -n)$ approaches one for the boundary where $\alpha<\bar{\alpha}$, and zero elsewhere, and $b \cdot n$ projects the length to the build plate. The density field $\tilde{\gamma}$ in EQ. (8) allows the integral $Q_{\bar{\alpha}}$ to measure the non-self-supporting external boundary where solid material exists, and ignore area where no material exists. For example, as shown in FIGS. 1C2 and 1D2, at locations along the boundary of the design domain where there is no solid material (e.g., the lower left corner of the design domain), the density field $\tilde{\gamma}$ causes the area to be ignored in the calculation of $Q_{\bar{\alpha}}$. Accordingly, such areas can be accounted for as an area needing support (e.g., accounted for under the constraint $\bar{P}_{\bar{\alpha}}$) and/or can be addressed using one or more additional constraints (e.g., a side zone constraint described in Qian, "Undercut and overhang angle control in topology optimization: A density gradient based integral approach," International Journal for Numerical Methods in Engineering, 111(3):247-272, 2017, which is hereby incorporated by reference herein in its entirety).

In some embodiments, external supports can be accounted for by increasing the size of the design domain, and padding void elements (e.g., with an enforced density of 0) around an optimization domain that is co-extensive with the original design domain. In such embodiments, the constraint described above in connection with EQ. (6) can account for both internal and external supports (which in this case are counted as internal supports). However, in such embodiments, there may be a tradeoff, as specificity of control over internal supports and external supports may be lost when combined under a single constraint, and the single constraint may provide less flexibility to a designer that would prefer to minimize either internal supports or external supports, or maintain both below particular thresholds.

FIG. 3A shows an example of an optimized design of a part without any undercut perimeter constraints applied. The part in FIG. 3A is a cantilever beam with an internal cutout. FIGS. 3B1, 3C1, and 3D1 show example of results of applying a Heaviside function to a directional gradient of density for the design of FIG. 3A for various build orientations b indicating areas of non-self-supporting internal boundaries, and FIGS. 3B2, 3C2, and 3D2 show examples highlighting areas of the external boundary requiring support structures based on the various build orientation b.

The results shown in FIGS. 3B1 to 3D2 illustrate predictions of the non-self-supporting solid/void interface and the external domain boundary based on EQS. (6) and (8) through the design of the beam shown in FIG. 3A. The lower bound of the surface slope was set as $\bar{\alpha}=45°$. For the various build orientations, the integrand $H_{\bar{\alpha}}(b, \nabla\bar{\tilde{\gamma}})b\cdot\nabla\bar{\tilde{\gamma}}$ in EQ. (6) is visualized in FIGS. 3B1, 3C1, and 3D1, and the integrand $-H_{\bar{\alpha}}(b, -n)b\cdot n\bar{\tilde{\gamma}}$ in EQ. (8) is visualized in FIGS. 3B2, 3C2, and 3D2.

It can be observed in FIGS. 3B1 to 3D1 that $H_{\bar{\alpha}}(b, \nabla\bar{\tilde{\gamma}})b\cdot\nabla\bar{\tilde{\gamma}}$ is only positive on the non-self-supporting solid/void interface where the slope is below the critical slope angle $\bar{\alpha}=45°$, and it vanishes elsewhere inside the design domain and also on the overhanging boundary of cutouts. While supports are clearly required at overhanging boundary of cutouts, the density gradient is unable to indicate that such supports are required because of the absence of continuity in the density gradient field at the boundary formed by the cutout. However, as shown in FIGS. 3B2 to 3D2, the second integrand $-H_{\bar{\alpha}}(b, -n)b\cdot n\bar{\tilde{\gamma}}$ indicates the non-self-supporting boundary of design domain. These two indicators can successfully represent the overhanging boundary and/or undercut as the build orientation b changes, which can facilitate optimization of build orientation b to control the integral of these two indicator functions (e.g., the projected undercut perimeters).

Figure 4A:
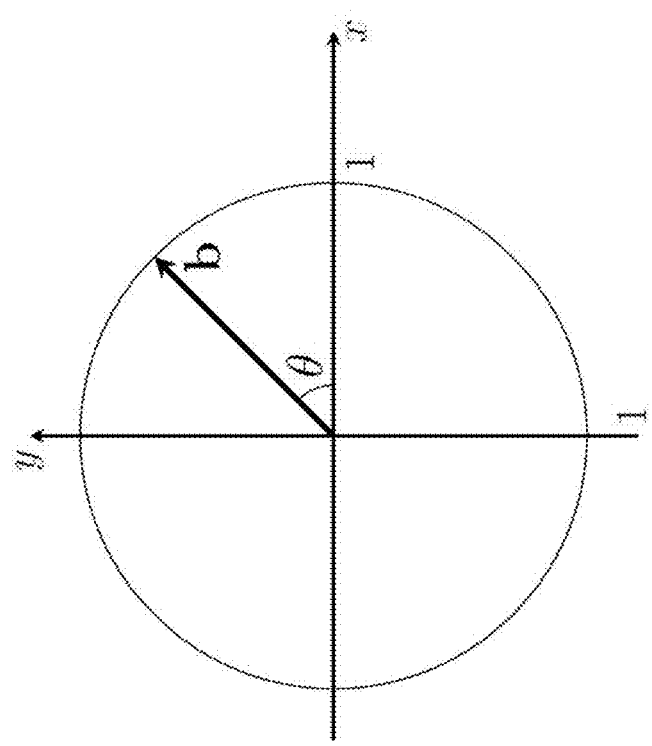
FIG. 4A shows an example of a scheme for representing build orientation with respect to part geometry in two dimensions using an angle θ in accordance with some embodiments of the disclosed subject matter.

FIGS. 4A and 4B show examples schemes for representing build orientation with respect to part geometry in two dimensions using an angle θ or three dimensions using angles and φ in accordance with some embodiments of the disclosed subject matter.

As both surface slope constraints in EQS. (6) and (8) are differentiable with the build orientation b and the physical density $\bar{\tilde{\gamma}}$, which can facilitate optimization of the build orientation and topological layout simultaneously through gradient-based optimization algorithms. In some embodiments, the physical density can be parameterized on nodes of linear triangular or tetrahedral meshes, and the build orientation b can be represented based on its slope angle(s) with respect to the geometry of the design domain. For example, as shown in FIG. 4A, build orientation b can be represented in two dimensions (i.e., in 2D) using the following relationship:

$$b=(\cos\theta,\sin\theta)0\leq\theta\leq 2\pi. \quad (10)$$

Extending into three dimensions (i.e., in 3D), build orientation b can be represented using the following relationship:

$$b=(\sin\phi\cos\psi, \sin\phi\sin\psi, \cos\phi) 0\leq\phi\leq\pi, 0\leq\psi\leq 2\pi. \quad (11)$$

In some embodiments, for the optimization of build orientation, variables θ or ψ, φ can be taken as optimization variables. The sensitivity of the constraint described above in connection with EQ. (6) on internal supports with respect to density $\bar{\tilde{\gamma}}$ is described in Qian, "Undercut and overhang angle control in topology optimization: A density gradient based integral approach," which has been incorporated by reference herein.

In the following, the notation $X'^{,\Theta}$ is used to represent the partial derivative with respect to a variable (e.g., x), in place of the conventional notation $$\frac{\partial x}{\partial \Theta},$$

and $\Theta$ is used to represent variables θ or ψ, φ associated with the build orientation, representing θ in the 2D case, and ψ, φ in the 3D case, respectively. Accordingly, using the preceding notation, the partial derivative of the integral in EQ. (6) with respect to the optimization variables θ or ψ, φ can be represented using the relationship:

$$P'^{,\Theta}_{\bar{\alpha}} = \frac{\int_{\Omega} H'^{,\Theta}_{\bar{\alpha}}(b,\nabla\bar{\tilde{\gamma}})b\cdot\nabla\bar{\tilde{\gamma}}d\Omega}{\bar{A}} + \frac{\int_{\Omega} H_{\bar{\alpha}}(b,\nabla\bar{\tilde{\gamma}})b'^{,\Theta}\cdot\nabla\bar{\tilde{\gamma}}d\Omega}{\bar{A}}, \quad (12)$$

where $$H'^{,\Theta}_{\bar{\alpha}}(b,\nabla\bar{\tilde{\gamma}}) = H'\left(b\cdot\frac{\nabla\bar{\tilde{\gamma}}}{\|\nabla\bar{\tilde{\gamma}}\|_2} - \cos(\bar{\alpha})\right)b'^{,\Theta}\cdot\frac{\nabla\bar{\tilde{\gamma}}}{\|\nabla\bar{\tilde{\gamma}}\|_2}, \quad (13)$$

$$H'(x) = -\frac{1}{(1+e^{-2\beta x})^2}(-2\beta)e^{-2\beta x}, \quad (14)$$

where x represents the expression within the parentheses following H' in EQ. (13), and $$b'^{,\Theta} = \begin{cases} (-\sin\theta, \cos\theta) & \text{if } \Theta = \theta \text{ in 2D case} \\ (\cos\phi\cos\psi, \cos\phi\sin\psi, -\sin\phi) & \text{if } \Theta = \phi \text{ in 3D case}. \\ (-\sin\phi\sin\psi, \sin\phi\cos\psi, 0) & \text{if } \Theta = \psi \text{ in 3D case} \end{cases} \quad (15)$$

Accordingly, EQS. (12) and (13) are adjusted based on whether the design is a 2D design or a 3D design.

Using the preceding notation to denote partial derivative with respect to build orientation, the partial derivative of the integral in EQ. (8) with respect to the physical design $\bar{\tilde{\gamma}}$ can be represented using the relationship:

$$Q'^{,\bar{\tilde{\gamma}}}_{\bar{\alpha}} = \frac{\int_{\Gamma} -H_{\bar{\alpha}}(b,-n)b\cdot n\delta\bar{\tilde{\gamma}}d\Gamma}{\bar{A}}, \quad (16)$$

where $\delta\bar{\tilde{\gamma}}$ represents the variation of the physical density $\bar{\tilde{\gamma}}$. The derivative of $Q_{\bar{\alpha}}$ with respect to the optimization variables related to the build orientation b (e.g., θ or ψ, φ) can be represented using the relationship:

$$Q'^{,\Theta}_{\bar{\alpha}} = \frac{\int_{\Gamma} -H'^{,\Theta}_{\bar{\alpha}}(b,-n)b\cdot n\delta\bar{\tilde{\gamma}}d\Gamma}{\bar{A}} + \frac{\int_{\Gamma} -H_{\bar{\alpha}}(b,-n)b'^{,\Theta}\cdot n\delta\bar{\tilde{\gamma}}d\Gamma}{\bar{A}}, \quad (17)$$

where $$H'^{,\Theta}_{\bar{\alpha}}(b,-n) = -H'(-b\cdot n - \cos(\bar{\alpha}))b'^{,\Theta}\cdot n, \quad (18)$$

where $b'^{,\Theta}$ can be represented using EQ. (15).

In some embodiments, mechanisms described herein can use one or more topology optimization techniques to find an optimal build orientation and/or density distribution over the design domain to minimize a prescribed objective function, where γ can represent a density related optimization variable, and the physical density $\bar{\tilde{\gamma}}$ can be derived from γ using Helmholtz filtering (e.g., as described in Lazarov et al., "Filters in topology optimization based on Helmholtz-type differential equations," International Journal for Numerical Methods in Engineering, 86(6):765-781, 2011, which is hereby incorporated by reference herein in its entirety) and the Heaviside projection (e.g., as described in Guest et al., "Achieving minimum length scale in topology optimization using nodal design variables and projection functions," International journal for numerical methods in engineering, 61(2):238-254, 2004, and Xu, et al., "Volume preserving nonlinear density filter based on Heaviside functions," Structural and Multidisciplinary Optimization, 41(4):495-505, 2010, each of which is hereby incorporated by reference herein in its entirety). Additionally, Θ can represent optimization variables associated with the build orientation. For example, as described above in connection with EQ. (15), Θ can represent θ for optimizations in two dimensions, and can represent ψ, φ for optimizations in three dimensions. In some embodiments, mechanisms described herein can use techniques for optimizing for build orientation and/or topology in various applications, such as in applications to linear elasticity problems for compliance minimization under a volume constraint. In such an example, the optimization can be formulated using the following relationships:

$$\min_{\gamma,\Theta} C = \int_{\Gamma_t} tud\Gamma, \quad (19a)$$

$$\text{such that } a(u, \tilde{u}) = l(\tilde{u}), \forall \tilde{u} \in V_0 \quad (19b)$$

$$\frac{\int_\Omega \bar{\bar{\gamma}} d\Omega}{V} \leq V_f \quad (19c)$$

$$P_{\bar{\alpha}} \equiv \frac{\int_\Omega H_{\bar{\alpha}}(b, \nabla\bar{\bar{\gamma}}) b \cdot \nabla\bar{\bar{\gamma}} d\Omega}{\overline{A}} \leq \overline{P}_{\bar{\alpha}}, \quad (19d)$$

$$Q_{\bar{\alpha}} \equiv \frac{\int_\Omega -H_{\bar{\alpha}}(b, -n) b \cdot n\bar{\bar{\gamma}} d\Gamma}{\overline{A}} \leq \overline{Q}_{\bar{\alpha}}, \quad (19e)$$

In this formulation, EQ. (19a) can represents structural compliance C which represents the traction loads over a fixed traction boundary $\Gamma_t$ (and is the inverse of stiffness, such that lower compliance generally corresponds to higher stiffness), t represents the traction loads over the fixed traction boundary $\Gamma_t$, and U represents the displacement field, and EQ. (19b) can represent a weak form of the state equations for linear elasticity, and u and ũ are the displacement field and its test function, respectively. A volume constraint can be represented by EQ. (19c) in which $V_f$ represents a prescribed limit of volume fraction. EQS. (19d) and (19e) can represent the directional gradient based surface slope constraint for internal supports control, and the density based surface slope constraint for external supports control described above in connection with EQS. (6) and (8).

In some embodiments, Helmholtz filtering and Heaviside filtering (e.g., as described in Xu, et al), can be used to control feature size and achieve black-and-white solutions, respectively. Additionally, in some embodiments, to remove gray densities that are sometimes caused when surface slope constraints are imposed, a RAMP scheme (e.g., as described in Stolpe et al., "An alternative interpolation scheme for minimum compliance topology optimization," Structural and Multidisciplinary Optimization, 22(2):116-124, 2001, which is hereby incorporated by reference herein in its entirety) can be used to interpolate material properties of intermediate densities. In some such embodiments, the Young's modulus E can be represented using the relationship:

$$E(\tilde{\bar{\gamma}}) = E_{min} + \frac{(E_0 - E_{min})\tilde{\bar{\gamma}}}{1 + R_E(1-\tilde{\bar{\gamma}})}, \quad (20)$$

where $E_0$ is the Young's modulus of the solid material, $E_{min}=10^{-9}E_0$ is a small number to avoid singularity in finite element analysis, and $R_E$ is a penalization factor, which was set to 8 in implementation described below in connection with examples of FIGS. 9A to 14G.

In some embodiments, a method of moving asymptotes (MMA) (e.g., as described in Svanberg, "The method of moving asymptotes—a new method for structural optimization," International Journal for Numerical Methods in Engineering, 24(2):359-373, 1987, which is hereby incorporated by reference herein in its entirety) can be applied to solve the optimization described by the set of relationships in EQS. (19a) to (19e).

In some embodiments, given a finalized design (e.g., an optimized design, a manual design), the formulation described above in connection with EQS. (19a) to (19e) can be adapted to determine an optimized build orientation for minimum support area. For example, rather than optimizing for both density and build orientation, an optimization can be performed using only build orientation as an optimization variable. In such an example, the optimization can be formulated using the following relationships:

$$\min_{\Theta} \mathcal{J} = \frac{P_{\bar{\alpha}}}{P_{\bar{\alpha}}^0} + w_{ext}\frac{Q_{\bar{\alpha}}}{Q_{\bar{\alpha}}^0}, \quad (21a)$$

$$\text{such that } \Theta_{min} \leq \Theta \leq \Theta_{max}, \quad (21b)$$

where $\Theta_{min}$ and $\Theta_{max}$ are the lower bound and the upper bound of Θ, respectively, which are described above in connection with EQS. (10) and (11) for 2D and 3D cases. Additionally, $P_{\bar{\alpha}}^0$, and $Q_{\bar{\alpha}}^0$ are the initial values of $P_{\bar{\alpha}}$ and $Q_{\bar{\alpha}}$ for the initial build orientation $b^0$ (which can also be referred to as $\Theta^0$), while $w_{ext}$ is a weight to control the contribution of the external supports in the objective function.

Figure 5:
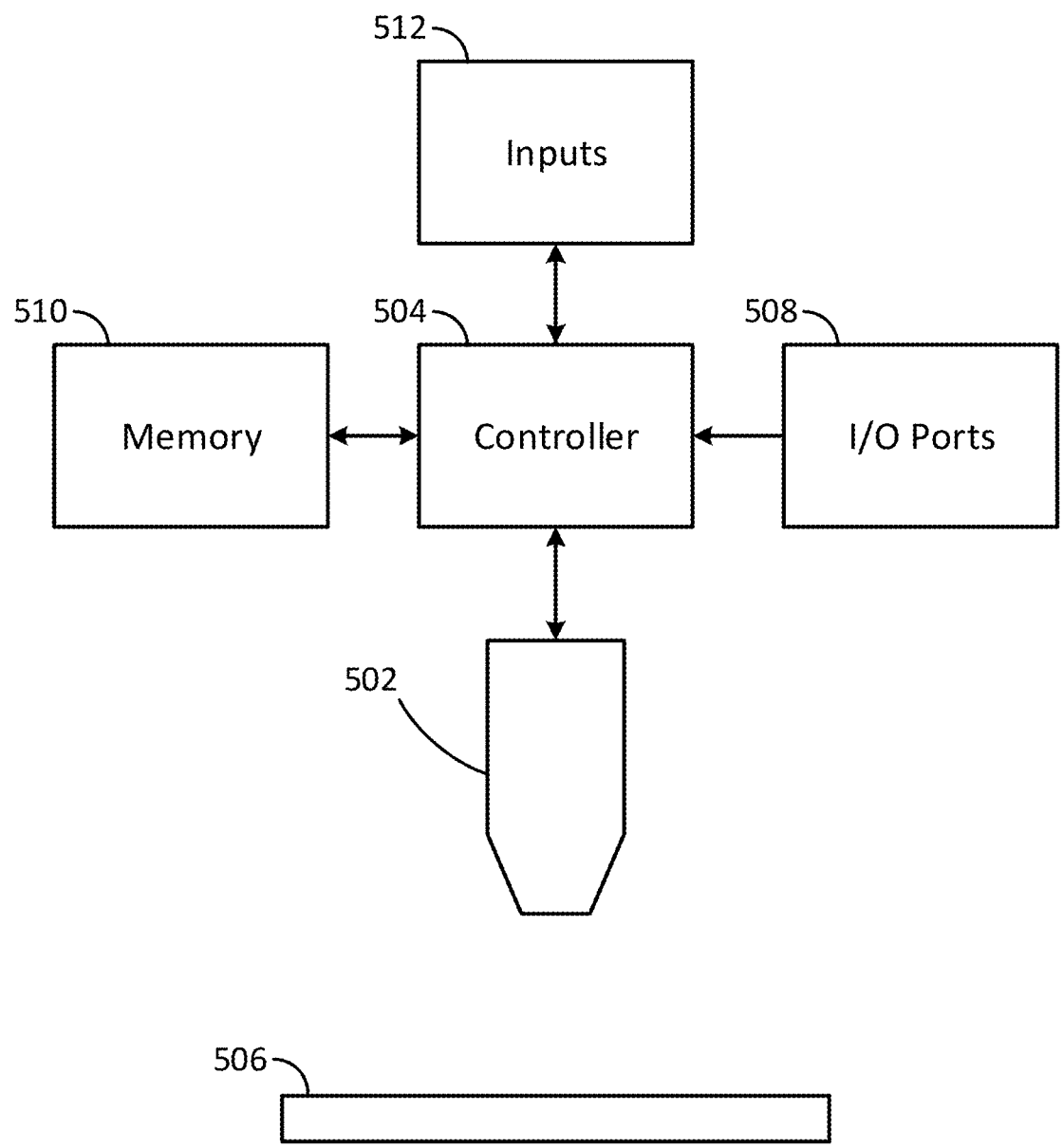
FIG. 5 shows an example of an additive manufacturing system that can be used in connection with mechanisms for controlling support structures and build orientation in manufacturing in accordance with some embodiments of the disclosed subject matter.

FIG. 5 shows an example 500 of an additive manufacturing system that can be used in connection with mechanisms for controlling support structures and build orientation in manufacturing in accordance with some embodiments of the disclosed subject matter. In some embodiments, system 500 can include a print head 502 in communication with a controller 504, and a mounting surface 506 (sometimes referred to as a build plate). In some embodiments, controller 504 can be any suitable hardware processor or combination of processors, such as a central processing unit (CPU), a graphics processing unit (GPU), a microcontroller (MCU), a field programmable gate array (FPGA), an application-specific integrated circuit (ASIC), etc.

In some embodiments, print head 502 can be configured to deposit material at particular locations at or above mounting surface 506 to manufacture a part by successively adding new material to existing material. In some embodiments, print head 502 can be mechanically coupled to a mechanical linkage (not shown) configured to position print head 502 at any suitable location in a 3-D coordinate system above mounting surface 506. Positioning of print head 502 can be controlled by controller 504.

In some embodiments, print head 502 can be configured to deposit material on mounting surface 506 to produce a part based on specifications for the part provided to controller 504. Additionally or alternatively, in some embodiments, print head 502 can be configured to deposit additional material on an existing part mounted to mounting surface 506.

In some embodiments, print head 502 can be configured to manufacture parts using any suitable material or combination of materials, such as one or more polymers, one or more metals, glass, sand, wax, paper, and/or any other suitable material known.

In some embodiments, controller 506 can be in communication with I/O ports 508 and memory 510. In some embodiments, I/O ports 508 can include hardware, firmware and/or software that can be used to establish a wireless connection, such as a Wi-Fi connection, a Bluetooth connection, a cellular connection, etc., and/or a wired connection using any suitable port and/or communication standard (e.g., USB, RS-232, Ethernet, etc.). In some embodiments, memory 510 can include RAM, ROM, EEPROM, one or more flash drives, one or more hard disks, one or more solid state drives, one or more optical drives, etc. In some embodiments, memory 510 can have encoded thereon a computer program for controlling operation of controller 504, and/or can store specifications for one or more parts to be manufactured by additive manufacturing system 500. For example, specifications for one or more parts can be received via I/O ports 508 (e.g., from a computing device), and controller 504 can store the specifications for one or more parts in memory 510. In such an example, controller 504 can receive an instruction to manufacturer a part from a specification stored in memory 510, and in response can recall the specifications for the part from memory 510, and use the computer program stored in memory 510 (and/or other programming, such as firmware) to manufacture the designated part. Additionally or alternatively, in some embodiments, controller 504 can receive instructions directly from an external device (e.g., an external computing device) to cause controller 504 to manufacture a part (e.g., not based on a specification stored in memory 510). In some embodiments, additive manufacturing system 500 can include inputs 512, which can include any suitable input devices and/or sensors that can be used to receive user input, such as a keyboard, a mouse, a touchscreen, a microphone, etc., for controlling one or more aspects of operation of additive manufacturing system 500.

Figure 6:
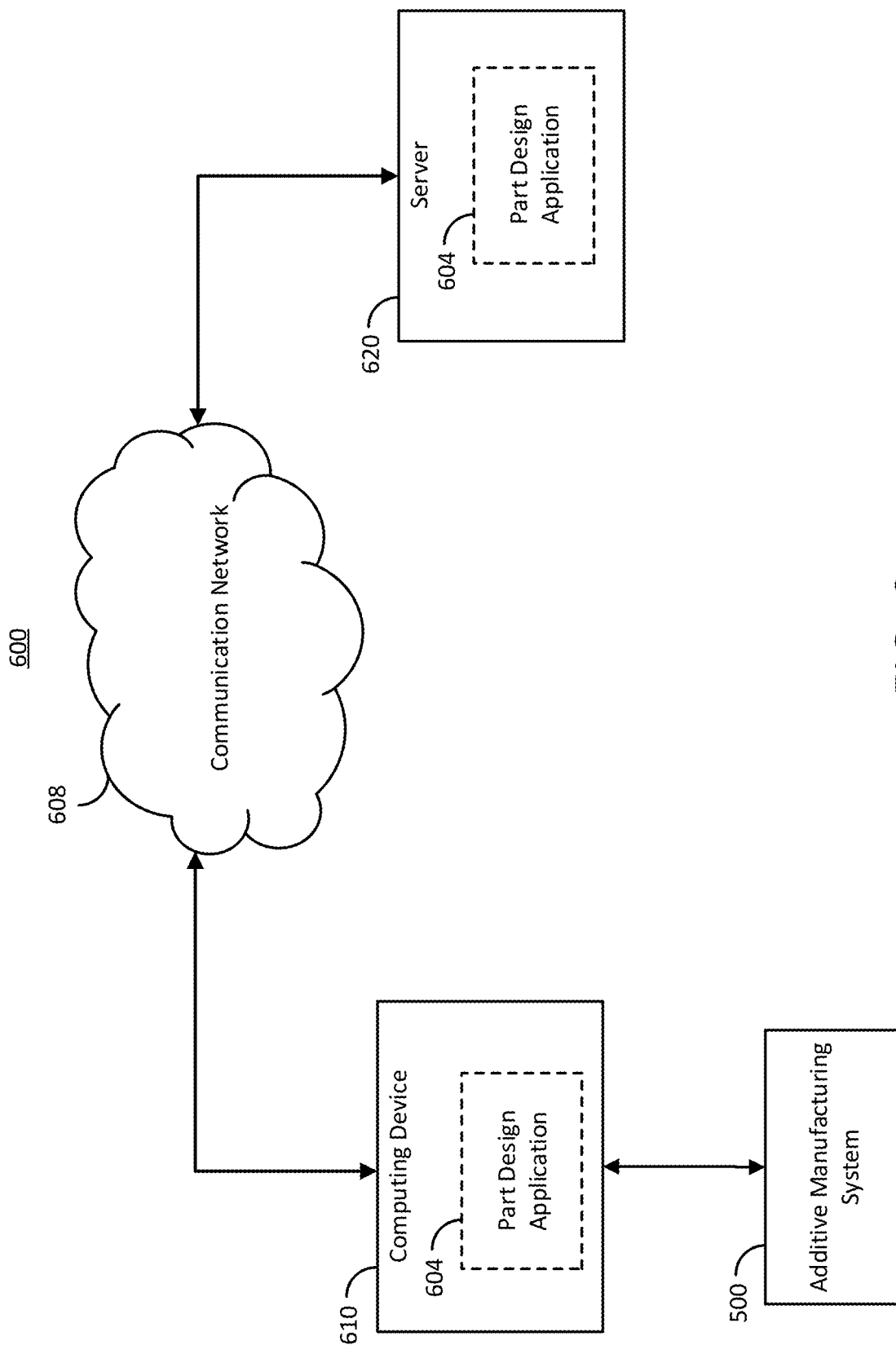
FIG. 6 shows an example of a system controlling support structures and build orientation in manufacturing in accordance with some embodiments of the disclosed subject matter.

FIG. 6 shows an example 600 of a system controlling support structures and build orientation in manufacturing in accordance with some embodiments of the disclosed subject matter. As shown in FIG. 6, a computing device 610 can be coupled to additive manufacturing system 500 to provide specifications and/or instructions to system 500. In some embodiments, computing device 610 can execute at least a portion of a part design application 604 that can be used to manually and/or automatically design one or more parts that satisfy one or more specified criteria.

Additionally or alternatively, in some embodiments, computing device 610 can communicate information about a part being designed with a server 620 over a communication network 608, which can execute at least a portion of part design application 604 to manually and/or automatically design one or more parts that satisfy one or more specified criteria. In such embodiments, server 620 can return information to computing device 610 (and/or any other suitable computing device) indicative of an output of part design application 604. For example, computing device 610 can provide frontend functionality such as by presenting a user interface, and receiving input, and server 620 can provide backend functionality such as by executing an application to generate an optimized design, generate a simulation of the optimized design for presentation to a user (e.g., via computing device 610), adjust one or more portions of the design in response to feedback from computing device 610, convert the optimized design and/to adjusted design to a CAD model or other data structure suitable for use by additive manufacturing system 500 to manufacture a part designed via part design application 604.

In some embodiments, computing device 610 and/or server 620 can be any suitable computing device or combination of devices, such as a desktop computer, a laptop computer, a smartphone, a tablet computer, a wearable computer, a server computer, a virtual machine being executed by a physical computing device, etc. As described below in connection with FIGS. 7 and 8, in some embodiments, part design application 604 can receive one or more physical constraints of a part to be manufactured, receive one or more internal and/or external support constraints, and generate an optimized part based on one or more optimization variables.

In some embodiments, communication network 608 can be any suitable communication network or combination of communication networks. For example, communication network 608 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, WiMAX, 5G NR, etc.), a wired network, etc. In some embodiments, communication network 608 can be a local area network, a wide area network, a public network (e.g., the Internet), a private or semi-private network (e.g., a corporate or university intranet), any other suitable type of network, or any suitable combination of networks. Communications links shown in FIG. 6 can each be any suitable communications link or combination of communications links, such as wired links, fiber optic links, Wi-Fi links, Bluetooth links, cellular links, etc.

Figure 7:
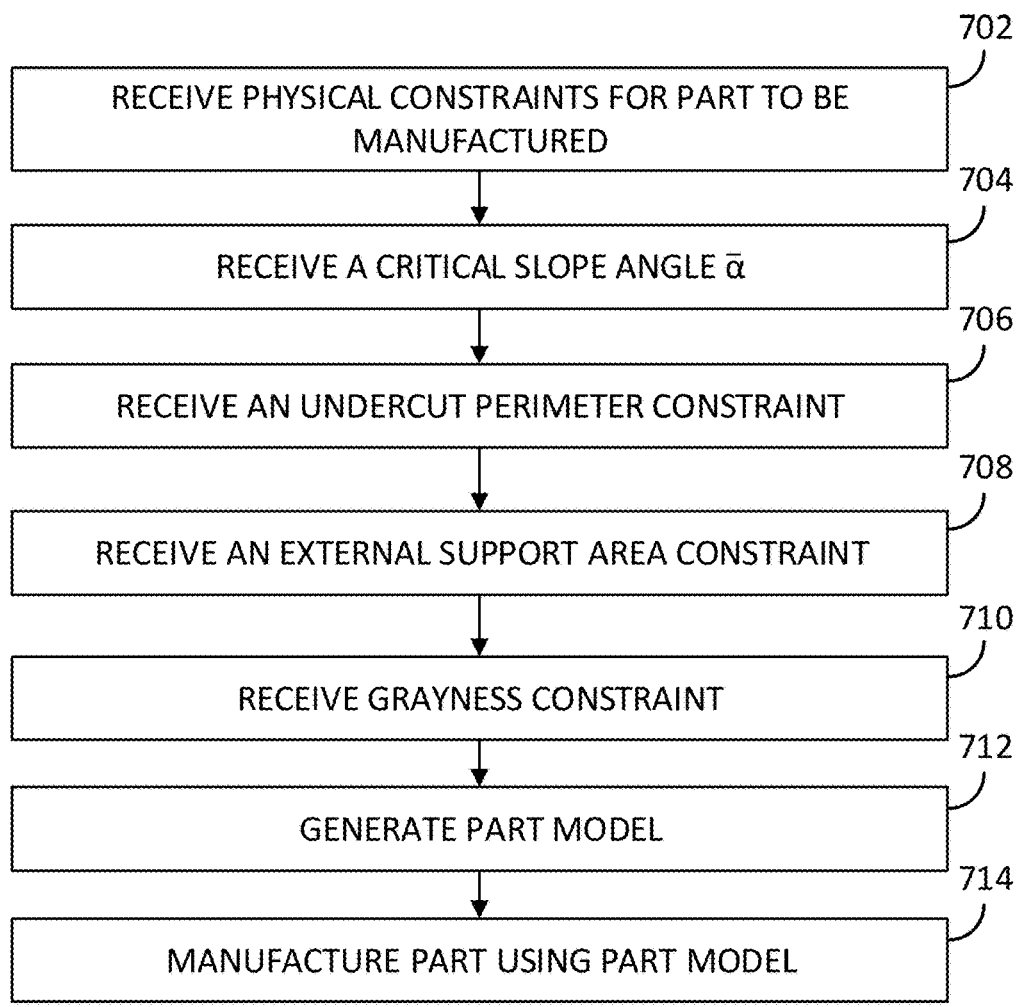
FIG. 7 shows an example of a process that can be used to design and manufacture a part based on internal and/or external overhang constraints in accordance with some embodiments of the disclosed subject matter.

FIG. 7 shows an example of a process that can be used to design and manufacture a part based on internal and/or external overhang constraints in accordance with some embodiments of the disclosed subject matter. At step 702, process 700 can receive physical constraints for a desired part to be manufactured. In some embodiments, physical constraints can be provided from any suitable source. For example, in some embodiments, process 700 can receive physical constraints via input provided to controller 504 (e.g., inputs 512). As another example, process 700 can receive physical constraints via provided from an external source (e.g., computing device 610, server 620) via I/O ports 508. Additionally or alternatively, in some embodiments, process 700 can receive the physical constraints from a memory (e.g., memory 510, or an external memory connected via I/O ports 508), which can accessed by a processor executing at least a portion of process 700.

At 704, process 700 can receive a critical slope constraint $\overline{\alpha}$ indicating a slope angle to be used in optimizing a build orientation and/or topology, which can correspond to a slope with respect to the build plate below which support material is generally required. In some embodiments, the critical slope constraint can be received from any suitable source and/or in any suitable format. For example, in some embodiments, the critical slope constraint can be received by additive manufacturing device 500 (e.g., via inputs 512). As another example, the critical slope constraint can be received by part design application 604 (e.g., via inputs of computing device 610 and/or server 620). In some embodiments, the critical slope constraint can be provided in any suitable format, such as a value in degrees (e.g., 45°), a value in radians (e.g., π/4), and/or using any other suitable units.

At 706, process 700 can receive an undercut perimeter constraint $\overline{P_\alpha}$. In some embodiments, the perimeter undercut constraint can be received from any suitable source and/or in any suitable format. For example, in some embodiments, the constraint can be received by additive manufacturing device 500 (e.g., via inputs 512). As another example, the constraint can be received by part design application 604 (e.g., via inputs of computing device 610 and/or server 620). In some embodiments, the undercut perimeter constraint can be provided in any suitable format, such as a value in a range [0, 1] indicating a proportion of the perimeter that is permitted to have a slope below a critical angle α. In some embodiments, the value can be expressed as a fraction of the total length (for 2D designs) or area (for 3D designs) of the design domain in a direction normal to the build plate (i.e., $\overline{A}$).

At 708, process 700 can receive an external support area constraint $\overline{Q_\alpha}$. In some embodiments, the external support area constraint can be received from any suitable source and/or in any suitable format. For example, in some embodiments, the external support area constraint can be received by additive manufacturing device 500 (e.g., via inputs 512). As another example, the external support area constraint can be received by part design application 604 (e.g., via inputs of computing device 610 and/or server 620). In some embodiments, the external support area constraint can be provided in any suitable format, such as a value in a range [0,1] indicating a proportion of the design domain border that is exposed to the build plate that is permitted to have a slope below a critical angle α. In some embodiments, the value can be expressed as a fraction of the total length (for 2D designs) or area (for 3D designs) of the design domain border that is exposed to the build plate.

At 710, process 700 can receive a grayness constraint. In some embodiments, the grayness constraint can be received from any suitable source and/or in any suitable format. For example, in some embodiments, the grayness constraint can be received by additive manufacturing device 500 (e.g., via inputs 512). As another example, the grayness constraint can be received by part design application 604 (e.g., via inputs of computing device 610 and/or server 620). In some embodiments, the grayness constraint can be provided in any suitable format, such as a value in a range [0,1], which can be used to control density values that are allowed in an optimized solution. The grayness constraint can be used, for example, as described in Qian, "Undercut and overhang angle control in topology optimization: A density gradient based integral approach," which has been incorporated by reference herein.

In some embodiments, one or more of 704 to 710 can be omitted. For example, default (e.g., predetermined) values of one or more of the constraints can be used if a particular value of the constraint is not provided. For example, a critical slope angle c can be predetermined (e.g., based on the additive manufacturing technique or techniques being used).

At 712, process 700 can generate a model of the part based on the constraints received at 702 to 710 and/or predetermined values of constraints if one or more of 702 to 710 is omitted. As described above in connection with FIGS. 2A1 to 4B, process 700 can optimize the topology and/or build orientation of the part based on the constraints and one or more optimization variables. For example, process 700 can generate the model of the part using the optimization formulation described above in connection with EQS. (19a) to (19e).

Additionally or alternatively, in some embodiments, process 700 can generate the model of the part using EQS. (6) and (8) (e.g., in a formulation other than the optimization formulation described above in connection with EQS. (19a) to (19e)), and/or using EQS. (3) and (4) (e.g., in a formulation other than the optimization formulation described above in connection with EQS. (19a) to (19e)).

In some embodiments, any suitable device can generate the model of the part at 712, including optimizing the topology of the part. For example, in some embodiments, controller 504 of additive manufacturing system 500 can generate the model of the part at 712. As another example, in some embodiments, part design application 604 (e.g., executed by computing device 610 and/or server 620) can generate the model of the part at 712, and provide the model to additive manufacturing system 500 via I/O ports 508.

In some embodiments, the build orientation can be associated with the generated model (e.g., as a value), which can be used to control an orientation in which the part is built from the model. Additionally or alternatively, in some embodiments, the coordinates of the model can be transformed such that the build orientation aligns with a particular axis of the model that is used as a reference point by an additive manufacturing system during the additive manufacturing process.

In some embodiments, process 700 can use any suitable initial build orientation $b^0$ to begin the optimization. For example, process 700 can use a predetermined initial build orientation $b^0$, such as (1,0). As another example, process 700 can prompt a user to provide an initial build orientation. As yet another example, process 700 can generate a first optimized design using a predetermined build orientation at 712 to determine an optimal build orientation b*, and can generate another optimized design using a second build orientation (e.g., a different predetermined build orientation, the optimal build orientation of the first optimized design, etc.). Accordingly, in some embodiments, process 700 can repeat 712 multiple times using the same constraints, with variable initial conditions.

At 714, process 700 can manufacture one or more instances of the part using the part model generated at 712. In some embodiments, process 700 can use any suitable system or combination of systems to manufacture the part, such as additive manufacturing system 500, and/or one or more other additive manufacturing systems (not shown). As described above in connection with additive manufacturing system 500, process 700 can manufacture the part by causing controller 504 to instruct print head 502 to additively deposit material in discrete layers (or other portions) starting at a surface of mounting surface 506 based on the geometry of the part specified by the part model generated at 712.

Figure 8:
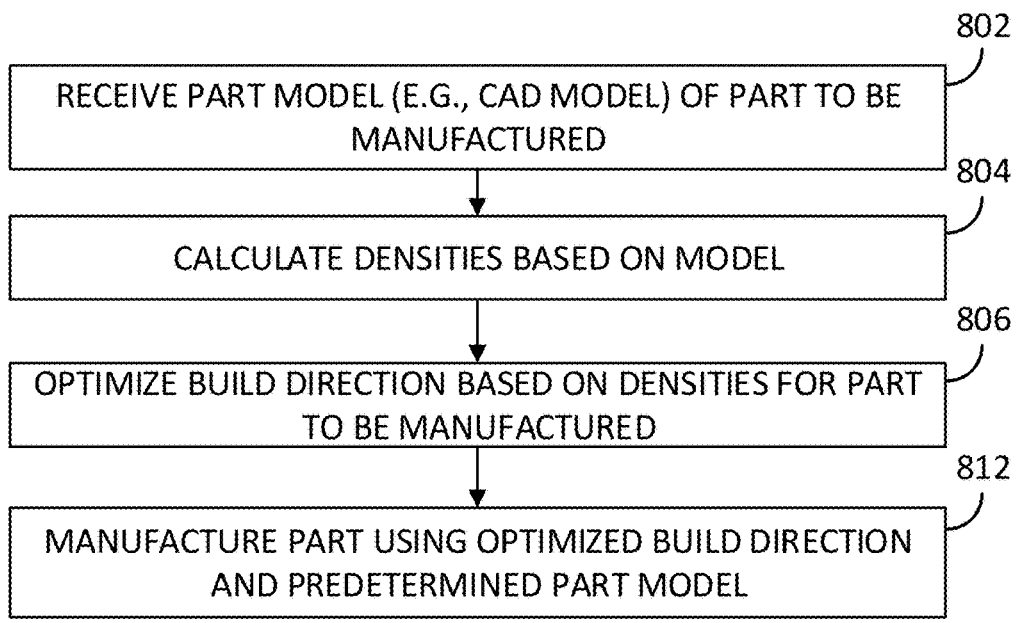
FIG. 8 shows an example of a process that can be used to optimize a build orientation and manufacture a pre-designed part in accordance with some embodiments of the disclosed subject matter.

FIG. 8 shows an example of a process that can be used to optimize a build orientation and manufacture a pre-designed part in accordance with some embodiments of the disclosed subject matter. At 802, process 800 can receive a part model of a part to be manufactured. In some embodiments, the part model can be received in any suitable format, such as a file that includes data specifying one or more 3D models in a particular format. Examples of file formats include .stl, .obj, .ply, and .x3db.

In some embodiments, the model at 802 can be specified using any suitable technique or combination of techniques.

For example, the model can be specified using a mesh (e.g., represented using a .stl file) specifying surfaces of the model.

At 804, process 800 can calculate a density field $\tilde{\bar{\gamma}}$ based on the model received at 802, which can be used in an optimization of the build orientation of the model. In some embodiments, any suitable technique or combination of techniques can be used to calculate a density field $\tilde{\bar{\gamma}}$ to represent the model. For example, a 3D model can be discretized into a set of voxels, with each voxel assigned a density value representing the corresponding material.

At 806, process 800 can optimize a build orientation for the part represented by the model received at 802. In some embodiments, process 800 can optimize the build orientation for the part represented by the model in order to minimize an undercut perimeter $P_{\bar{\alpha}}$, minimize an external support perimeter $Q_{\bar{\alpha}}$, and/or to satisfy an undercut perimeter constraint $P_{\bar{\alpha}}$ (and/or an external support area constraint $Q_{\bar{\alpha}}$.

In some embodiments, process 800 can optimize build orientation based on constraints received at 704 to 708 and/or predetermined values of constraints if one or more of 704 to 708 is omitted. In some embodiments, process 800 can optimize the build orientation of the part based on the constraints and one or more optimization variables (e.g., based on whether the part is a 2D part or a 3D part). For example, process 800 can optimize the build orientation using an optimization formulation similar to the formulation described above in connection with EQS. (19a) to (19e), but minimizing the values of $P_{\bar{\alpha}}$ and/or $Q_{\bar{\alpha}}$ for Θ while holding density constant as an additional constraint (e.g., rather than an optimization variable). For example, process 800 can use the optimization formulation described above in connection with EQS. (21a) and (21b) to optimize the build orientation.

At 812, process 800 can manufacture one or more instances of the part using the optimized build orientation determined at 806 and the part model received at 802. In some embodiments, process 800 can use any suitable system or combination of systems to manufacture the part, such as additive manufacturing system 500, and/or one or more other additive manufacturing systems (not shown). As described above in connection with additive manufacturing system 500, process 800 can manufacture the part by causing controller 504 to instruct print head 502 to additively deposit material in discrete layers (or other portions) starting at a surface of mounting surface 506 based on the geometry of the part specified by the model received at 802 and the build orientation determined at 806.

In some embodiments, process 800 can be used to reduce the amount of internal and external supports required to manufacture an existing design and/or to manufacture a revised design. For example, process 800 can be used to determine an optimal build orientation for a design that already exists, which can reduce the amount of material required to manufacture the part and/or reduce the amount of post-processing required to remove support structures. As another example, process 800 can be used to determine an optimal build orientation for a design that has been adjusted. In such an example, whether the design was originally generated manually or via process 700, if the design is adjusted (e.g., to improve the aesthetics of the design), process 800 can be used to determine an optimal build orientation without simultaneously optimizing the topology.

In the following description of FIGS. 9A to 14G, unless otherwise specified the Young's modulus of the solid material is $E_0=1$, and the Poisson's ratio is $v=0.3$. The magnitude of the load is $F=1$. For 2D examples, the plane stress problem was solved with unit thickness. Design domains of 2D and 3D problems were discretized by linear triangular and tetrahedral elements, respectively. All the density fields $\gamma$, $\bar{\gamma}$, and $\tilde{\bar{\gamma}}$ are defined on nodes. The filter radius $r_f r_f$ for the Helmholtz PDE filter is represented by the filter size r in the usual density filtering, and was represented as $r=2\sqrt{3}r_f$. The projection threshold for Heaviside filtering was set to 0.5, and the parameter controlling the sharpness of the Heaviside function was set to 0 for the first 50 iterations, and was then increased to 1 for the next 25 iterations, and increased by 1.25 times every 25 iterations thereafter until reaching a maximum value of 32.

Additionally, the norm of density gradient $\|\nabla \tilde{\bar{\gamma}}\|$ vanishes in the solid and void regions. If it appeared in the denominator of a function, a small number (e.g. $1 \times 10^{-15}$) was added to avoid singularity. The lower bound of surface slope was set to $\bar{\alpha}=45°$ for illustration. Unless otherwise stated, the character projection area $\bar{A}$ in the surface slope constraints of EQS. (6) and (8) is set to 1. An adaptive scheme (described in Wang et al., "Boundary slope control in topology optimization for additive manufacturing: for self-support and surface roughness," Journal of Manufacturing Science and Engineering, 141(9):091001, 2019, which is hereby incorporated by reference herein in its entirety) was used to select a threshold $\bar{P}_{\bar{\alpha}}$ of the surface slope constraint in EQ. (6). For each problem, if the mesh size and the filter size r remain the same, the adaptive scheme was only performed once to determine the threshold $\bar{P}_{\bar{\alpha}}$. Then the determined threshold $\bar{P}_{\bar{\alpha}}$ was used for the same problem with build orientation optimization techniques described herein. The projection threshold for Heaviside filtering was set to 0.5, and the parameter controlling the sharpness of the Heaviside function was set to 0 for the first 50 iterations, and was then increased to 1 for the next 25 iterations, and increased by 1.25 times every 25 iterations thereafter until reaching a maximum value of 32.

For all the examples described below in connection with FIGS. 9A to 14G, the optimization algorithm was terminated when the change of optimization variables in successive iterations was less than 0.01, or when the number of iterations reached a maximum value of 400. The optimization variables θ, φ, and ψ related to the build orientation were normalized to lie in the range [0, 1]. The move limit of optimization variables was 0.1. Other parameters of the MMA algorithm were chosen based on techniques described in Svanberg, "The method of moving asymptotes—a new method for structural optimization," which has been incorporated by reference.

FIG. 9A shows an example of a design specification for a two dimensional MBB beam. In the examples described below in connection with FIGS. 9B1 to 9H3, the following conditions were applied unless otherwise stated: the mesh of the design domain has 120,000 triangular elements and 60,401 nodes; the maximum element size is $h_{max}=0.01$; the filter size of the Helmholtz filtering is $r=0.35$; the prescribed volume fraction $V_f=0.5$; and the threshold $\bar{Q}_{\bar{\alpha}}$ was set to a large value so that the constraint on external supports was inactive.

FIG. 9B1 shows an example of an optimized design based on the specification shown in FIG. 9A without any surface slope constraints. As shown in FIG. 9B1, the optimized design has many areas that would have relatively shallow non-self-supporting slopes that would likely require support structures with a conventional build orientation b=(0,1) (i.e., θ=90°). The design in FIG. 9B1 has an estimated compliance of C=177.2.

FIG. 9B2 shows an example of an optimized design based on the specification shown in FIG. 9A with a surface slope constraint of 45° and a prescribed first build orientation. In the optimization shown in FIGS. 9B2 to 9B4 the threshold $\overline{P}_{\overline{\alpha}}$ of the surface slope constraint was set to 0.3. As shown in FIG. 9B2, the optimized design with a surface slope constraint $\overline{\alpha}=45°$ and a build orientation b=(0,1) (i.e., θ=90°) has interior voids with steeper slopes that are less likely to require support structures. However, the design in FIG. 9B2 has a somewhat higher estimated compliance of C=221.2.

FIG. 9B3 shows an example of an optimized design based on the specification shown in FIG. 9A with a surface slope constraint of 45° and a prescribed second build orientation. As shown in FIG. 9B3, the optimized design with a surface slope constraint $\overline{\alpha}=45°$ and a build orientation b=(1,0) (i.e., θ=0°) has interior voids that more closely match the optimized design without surface slope constraints, as the surfaces that were unsupported with a build orientation of b=(0,1) are steeper with respect to a build orientation of b=(1,0). The design in FIG. 9B3 has an estimated compliance of C=177.4, which is about the same as the optimized design without surface slope constraints.

FIG. 9B4 shows an example of an optimized design based on the specification shown in FIG. 9A with a surface slope constraint of 45°, and using build orientation as an optimization variable using mechanisms described herein for controlling support structures and build orientation in manufacturing in accordance with some embodiments of the disclosed subject matter. As shown in FIG. 9B4, the optimized design with a surface slope constraint $\overline{\alpha}=45°$ and using θ as an optimization variable with an initial build orientation $$b^0 = \left( \frac{\sqrt{2}}{2}, \frac{\sqrt{2}}{2} \right)$$

(i.e., θ⁰=45°) resulted in a design with a build orientation b*=(1,0) (i.e., θ=0°), coincidentally matching the prescribed build orientation in FIG. 9B3. The design in FIG. 9B4 also has an estimated compliance of C=177.4, which is about the same as the optimized design without surface slope constraints. The result shown in FIG. 9B4 demonstrates that mechanisms described herein can be used to find an optimal build orientation through gradient-based optimization.

FIGS. 9C1 to 9C4 show intermediate designs for the design shown in FIG. 9B4 at various iterations while using build orientation as an optimization variable using mechanisms described herein for controlling support structures and build orientation in manufacturing in accordance with some embodiments of the disclosed subject matter. In FIGS. 9C1 to 9C4, color represents density $\overline{\overline{\gamma}}$, with blue representing void, and orange representing solid material. Each design is rotated to illustrate the build orientation of the design with respect to the build plate, with red lines illustrating the surface slope constraint critical angle of 45° used for the optimization.

FIGS. 9D1 to 9D4 show Heaviside projections for the intermediate designs shown in FIGS. 9C1 to 9C4 indicating areas of non-self-supporting internal boundaries. As shown in FIGS. 9D1 to 9D4, when the build orientation changes from the initial build orientation (i.e., θ⁰=45°) to the optimal value (e.g., as the design domain is gradually rotated), the non-self-supporting materials indicated by the values of H $\overline{\alpha}(b, \nabla\overline{\overline{\gamma}})b\cdot\nabla\overline{\overline{\gamma}}$ shown in FIGS. 9D1 to 9D4 are gradually pushed away from the design.

Figure 9E:
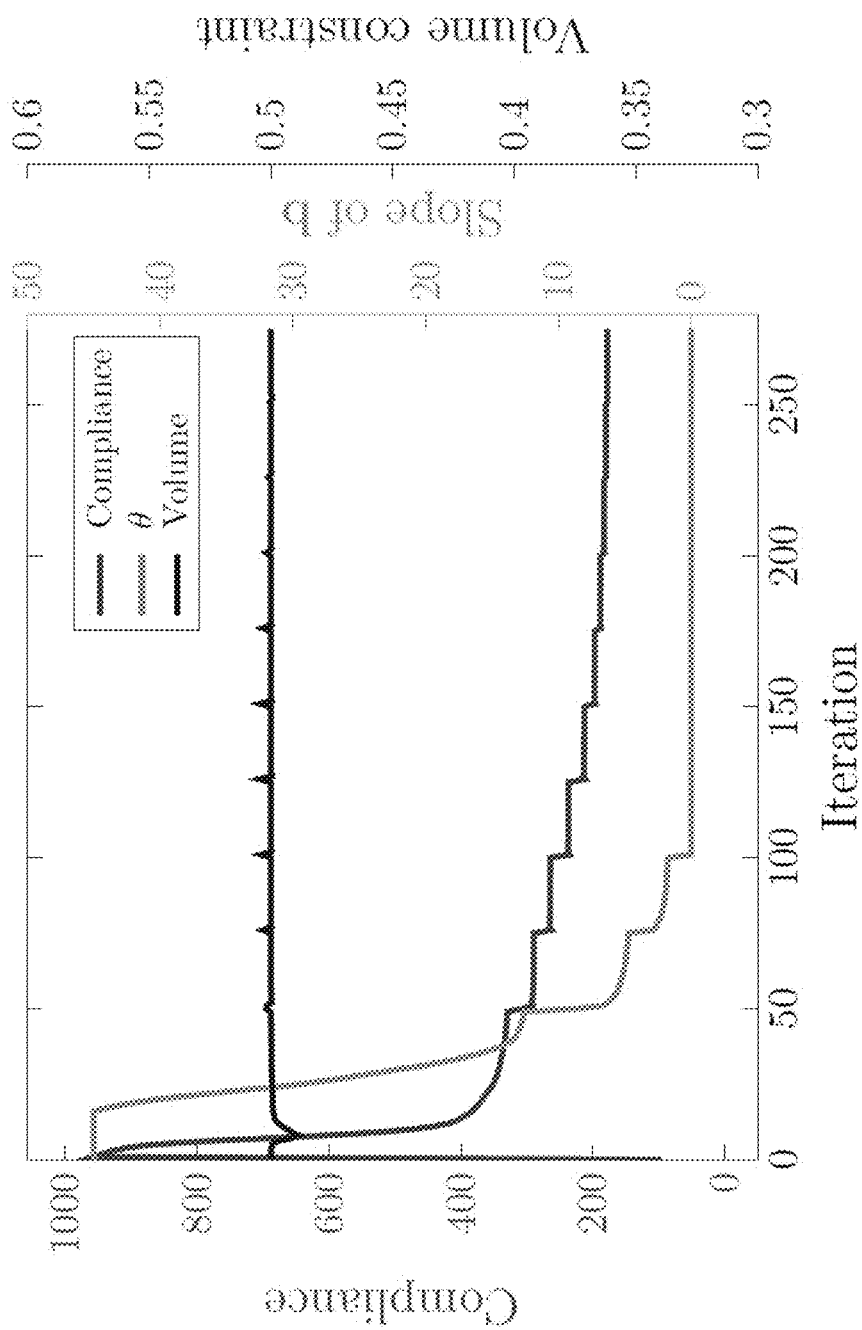
FIG. 9E shows a graph of convergence history of various variables for intermediate designs for the design shown in FIG. 9B4 at various iterations.

FIG. 9E shows a graph of convergence history of various variables for intermediate designs for the design shown in FIG. 9B4 at various iterations. As shown in the convergence history of FIG. 9E, the slope of the build orientation, θ, converged to the optimal value within the first 100 iterations.

FIGS. 9F1 and 9F2 show example of optimized designs based on the specification shown in FIG. 9A with a surface slope constraint of 45° and initial build orientations of 90° and 135°, respectively, using build orientation as an optimization variable using mechanisms described herein for controlling support structures and build orientation in manufacturing in accordance with some embodiments of the disclosed subject matter.

FIGS. 9G1 and 9G2 show graph of convergence history of various variables for intermediate designs for the designs shown in FIGS. 9F1 and 9F2, respectively, at various iterations. Oscillations in the convergence curves can be caused by the changes of the sharpness control parameter in the Heaviside filtering.

FIGS. 9F1 and 9F2 demonstrate how initial build orientation b⁰ can impact the final design and build orientation. The optimized design shown in FIG. 9F1 was generated with a surface slope constraint $\overline{\alpha}=45°$ and using θ as an optimization variable with an initial build orientation b⁰=(0,1) (i.e., θ⁰=90°). The optimization resulted in a design with a build orientation b*=(1,0) (i.e., θ=0°), again matching the prescribed build orientation in FIG. 9B3. The design in FIG. 9F1 had an estimated compliance of C=177.5, which is about the same as the optimized design without surface slope constraints.

The optimized design shown in FIG. 9F2 was generated with a surface slope constraint $\overline{\alpha}=45°$ and using θ as an optimization variable with an initial build orientation $$b^0 = \left( -\frac{\sqrt{2}}{2}, \frac{\sqrt{2}}{2} \right)$$

(i.e., θ⁰=135'). The optimization resulted in a design with a build orientation b*=(−0.998, 0.065) (i.e., θ=176.2°), which significantly diverged from the prescribed build orientation in FIG. 9B3, but did not result in a design that was markedly visually divergent from the optimized design in FIG. 9B1 or 9B3. The design in FIG. 9F2 had an estimated compliance of C=177.3, which is about the same as the optimized design without surface slope constraints and is very slightly better than the compliance for the designs in FIGS. 9B3 and 9B4. This example suggests that for the same design, there may exist multiple optimal build orientations. FIGS. 9G1 and 9G2 show that build orientation converged at around 100 iterations, although the convergence for the design in FIG. 9F2 exhibited some noise before converging.

FIG. 9H1 shows an example of an optimized design based on the specification shown in FIG. 9A with a relatively small volume fraction constraint $V_f$=0.3, and without any surface slope constraints. Small volume fractions generally make it more difficult to satisfy the surface slope constraint for self-support, as the surface slope constraint can severely impair the performance of the design. FIGS. 9H1 to 9H3 demonstrate the effects of that build orientation optimization can have on performance of an MBB beam with a relatively small volume fraction $V_f$=0.3. As shown in FIG. 9H1, without a surface slope constraint, the optimization results in many areas that require internal supports. The design in FIG. 9H1 had an estimated compliance of C=300. This demonstrates the tradeoffs between performance and volume fraction. By reducing the volume of material that can be used to design the MBB beam, the optimization results in a significantly compromised compliance (i.e., 300 vs the ~177 compliance with a volume fraction $V_f=0.5$ in FIG. 9B). While this may be an acceptable tradeoff in performance for the savings in material costs provided by the lower volume fraction, if the design requires many internal supports, the savings in material may not be realized, comprising performance with no correspondence savings in manufacturing costs.

FIG. 9H2 shows an example of an optimized design based on the specification shown in FIG. 9A with a relatively small volume fraction constraint $V_f=0.3$, with a surface slope constraint of 45°, and a prescribed first build orientation. Note that to achieve a black-and-white solution with the surface slope constraint considered, the design in FIG. 9H2 used a uniformly refined mesh (e.g., as described in Wang et al., "Boundary slope control in topology optimization for additive manufacturing: for self-support and surface roughness," which has been incorporated by reference herein above). As shown in FIG. 9H2, with a prescribed build orientation b=(0, 1) and the surface slope constraint applied, the resulting design has a much different appearance than the optimized design. The design in FIG. 9H2 had an estimated compliance of C=550, almost double the compliance of the optimized design without surface slope constraints in FIG. 9H1, which was caused by the requirement that the surface slope constraint for self-support be satisfied.

FIG. 9H3 shows an example of an optimized design based on the specification shown in FIG. 9A with a relatively small volume fraction constraint $V_f=0.3$, with a surface slope constraint of 45°, and using build orientation as an optimization variable using mechanisms described herein for controlling support structures and build orientation in manufacturing in accordance with some embodiments of the disclosed subject matter. The optimized design shown in FIG. 9H3 was generated with a surface slope constraint $\bar{\alpha}=45°$ and using θ as an optimization variable with an initial build orientation $$b^0 = \left(\frac{\sqrt{2}}{2}, \frac{\sqrt{2}}{2}\right)$$

(i.e., $\theta^0=45°$). The optimization resulted in a design with a build orientation b*=(1,0) (i.e., θ=0°). The design in FIG. 9H3 had an estimated compliance of C=300, demonstrating that build orientation optimization facilitated compliance with the surface slope constraint without a performance loss that was caused by the surface slope constraint in the prescribed build orientation example of FIG. 9H2. Additionally, refinement of the mesh was not necessary to obtain a black-and-white design, unlike the example of FIG. 9H2. FIGS. 9H1 to 9H3 demonstrate that optimization of the build orientation can be necessary when it is otherwise difficult for the design to satisfy the surface slope constraint for self-support.

FIG. 10A shows an example of a design specification for a two dimensional L-shaped beam. In the examples described below in connection with FIGS. 10B1 to 10C3 the following conditions were applied unless otherwise stated: a load with a magnitude of 750 Newton (N) is imposed at the right corner; the material properties of the solid material are $E_0=68.9$ gigapascals (GPa) and v=0.3; the design domain is meshed with 103,296 elements and 52,157 nodes; the mesh size is $h_{max}=1.6$; the filter size of the Helmholtz filtering is r=24; the allowed volume fraction is $V_f=0.5$; the character length A in surface slope constraints is set to 200; and the threshold $\bar{Q}_\alpha$ was set to a large value so that the constraint on external supports was inactive.

FIG. 10B1 shows an example of an optimized design based on the specification shown in FIG. 10A without any surface slope constraints. As shown in FIG. 10B1, the optimized design has some areas that would have relatively shallow non-self-supporting slopes that would likely require support structures with a conventional build orientation b=(0,1) (i.e., θ=90°). The design in FIG. 10B1 has an estimated compliance of C=1375. Compared to the optimized design for the MBB beam described above in connection with FIG. 9B1, the optimized design shown in FIG. 10B1 for the L-shaped beam has structural connections in multiple directions. Accordingly, it is not straightforward to prescribe a build orientation for which the surface slope constraint for self-support can be satisfied with the smallest performance loss.

FIG. 10B2 shows an example of an optimized design based on the specification shown in FIG. 10A with a surface slope constraint of 45° and a prescribed first build orientation. In the optimization shown in FIGS. 10B2 to 10C3 the threshold $\bar{P}_\alpha$ of the surface slope constraint was set to 0.1. The optimized design shown in FIG. 10B2 was generated with a surface slope constraint $\bar{\alpha}=45°$ and a build orientation b=(0,1) (i.e., θ=90°), and has interior voids with steeper slopes that are less likely to require support structures, and adds an additional external void at the top of the lower-right portion of the beam. However, the design in FIG. 10B2 has a somewhat higher estimated compliance of C=1601, a sacrifice of 16.4% of the compliance to satisfy the surface slope constraint.

FIG. 10C1 shows an example of an optimized design based on the specification shown in FIG. 10A with a surface slope constraint of 45° and an initial build orientation of 0°, using build orientation as an optimization variable using mechanisms described herein for controlling support structures and build orientation in manufacturing in accordance with some embodiments of the disclosed subject matter. The optimized design shown in FIG. 10C1 was generated with a surface slope constraint $\bar{\alpha}=45°$ and using θ as an optimization variable with an initial build orientation $b^0=(1,0)$ (i.e., $\theta^0=0°$), which resulted in a design with a build orientation b*=(0.575, 0.818) (i.e., θ≈54.9°). The design in FIG. 10C1 has an estimated compliance of C=1607.15, which is higher than the both the optimized design without surface slope constraints and for the prescribed build orientation in FIG. 10B2.

FIG. 10C2 shows an example of an optimized design based on the specification shown in FIG. 10A with a surface slope constraint of 45° and an initial build orientation of 45°, using build orientation as an optimization variable using mechanisms described herein for controlling support structures and build orientation in manufacturing in accordance with some embodiments of the disclosed subject matter. The optimized design shown in FIG. 10C2 was generated with a surface slope constraint $\bar{\alpha}=45°$ and using θ as an optimization variable with an initial build orientation $$b^0 = \left(\frac{\sqrt{2}}{2}, \frac{\sqrt{2}}{2}\right)$$

(i.e., $\theta^0=45°$), which resulted in a design with a build orientation b*=(0.565, 0.825) (i.e., θ≈55.6°). The design in FIG. 10C2 has an estimated compliance of C=1557, which outperforms both the optimized design with the prescribed build orientation in FIG. 10B2 and the optimized design with an initial build orientation of θ=0° shown in FIG. 10C1.

FIG. 10C3 shows an example of an optimized design based on the specification shown in FIG. 10A with a surface slope constraint of 45° and an initial build orientation of 90°, using build orientation as an optimization variable using mechanisms described herein for controlling support structures and build orientation in manufacturing in accordance with some embodiments of the disclosed subject matter. The optimized design shown in FIG. 10C3 was generated with a surface slope constraint $\overline{\alpha}=45°$ and using θ as an optimization variable with an initial build orientation $b^0=(0, 1)$ (i.e., $\theta^0=90°$), which resulted in a design with a build orientation $b*=(0.568, 0.823)$ (i.e., $\theta \approx 55.4°$). The design in FIG. 10C3 has an estimated compliance of C=1548.04, which outperforms the optimized design with the prescribed build orientation in FIG. 10B2 and the optimized designs with initial build orientations of θ=0° shown in FIG. 10C1, and θ=45° shown in FIG. 10C2. The examples of FIGS. 10C1 to 10C3 demonstrate that, especially with parts having complex specification, selecting an initial build orientation can have a fairly large impact on the final compliance of the optimized design. Thus, it may be advantageous to produce multiple designs with different initial build orientations and select a highest performing build orientation from among the final designs.

FIG. 11A shows an example of a design specification for a two dimensional hook. As shown in FIG. 11A, the examples described below in connection with FIGS. 11B1 to 11D9 are for a 2D hook for which the optimized design has structural connections spanning in a large range of directions. Accordingly, for any given build orientation, the optimized part needs to break or change structural connections to satisfy the surface slope constraint for self-support. Thus, the performance of the design could be significantly sacrificed for an improper build orientation, and optimization of the build orientation becomes more important for this type of problem. The dimensions, boundary conditions and loads of the problem are specified in FIG. 11A, and in the examples described below in connection with FIGS. 11B1 to 11D9 the following conditions were applied unless otherwise stated: the magnitude of the loads distributed on the arc is F=1; the mesh has 139,164 linear triangles and 10,172 nodes; the maximum element size is $h_{max}=0.05$; the filter radius is r=1.25; the allowed volume fraction is $V_f=0.5$; and the threshold $\overline{Q_\alpha}$ was set to a large value so that the constraint on external supports was inactive.

FIG. 11B1 shows an example of an optimized design based on the specification shown in FIG. 11A without any surface slope constraints. As shown in FIG. 10B1, the optimized design has some many areas that would have relatively shallow non-self-supporting slopes that would likely require support structures with a conventional build orientation b=(0, 1) (i.e., θ=) 90°. The design in FIG. 11B1 has an estimated compliance of C=19,511. Compared to the optimized design for the MBB beam described above in connection with FIG. 9B1, the optimized design shown in FIG. 11B1 for the hook has structural connections and loading surfaces in multiple directions. Accordingly, it is even more difficult to manually prescribe an optimal build orientation for which the surface slope constraint for self-support can be satisfied with the smallest performance loss than for the L-shaped beam described above in connection with FIGS. 10A to 10C3.

FIG. 11B2 shows an example of an optimized design based on the specification shown in FIG. 11A with a surface slope constraint of 45° and a prescribed first build orientation. In the optimization shown in FIGS. 11B2 and 11C the threshold $\overline{P_\alpha}$ of the surface slope constraint was set to 0.03. The optimized design shown in FIG. 10B2 was generated with a surface slope constraint $\overline{\alpha}=45°$ and a prescribed build orientation b=(0, 1) (i.e., θ=90°), and has interior voids with steeper slopes that are less likely to require support structures, and includes fewer internal voids. However, the design in FIG. 11B2 has a somewhat higher estimated compliance of C=24,563, a sacrifice of about 25% of the compliance to satisfy the surface slope constraint.

FIG. 11C shows an example of an optimized design based on the specification shown in FIG. 11A with a surface slope constraint of 45° and an initial build orientation of 45°, using build orientation as an optimization variable using mechanisms described herein for controlling support structures and build orientation in manufacturing in accordance with some embodiments of the disclosed subject matter. The optimized design shown in FIG. 11C was generated with a surface slope constraint $\overline{\alpha}=45°$ and using θ as an optimization variable with an initial build orientation $$b^0 = \left(\frac{\sqrt{2}}{2}, \frac{\sqrt{2}}{2}\right)$$

(i.e., $\theta^0=45°$), which resulted in a design with a build orientation $b*=(-0.286, 0.958)$ (i.e., θ=106.56°). The design in FIG. 11C has an estimated compliance of C=21,851, which is higher than the optimized design without surface slope constraints, but outperforms the design with prescribed build orientation in FIG. 11B2. Since the optimized build orientation is relatively close to the prescribed build orientation b=(0, 1), the performance improvement due to the build orientation optimization is only 11%. For a different loading direction not parallel to the prescribed build orientation, a higher performance enhancement can be expected using build orientation optimization techniques described herein.

FIGS. 11D1 to 11D9 show intermediate designs for the design shown in FIG. 11C at various iterations while using build orientation as an optimization variable using mechanisms described herein for controlling support structures and build orientation in manufacturing in accordance with some embodiments of the disclosed subject matter. Each design is rotated to illustrate the build orientation of the design with respect to the build plate, with red lines illustrating the surface slope constraint critical angle of 45° used for the optimization. As shown in FIGS. 11D1 to 11D9, build orientation (or the position of the design with respect to the build plate) converges during the optimization. Additionally, the surface slope constraint for self-support is gradually satisfied for the optimized build orientation.

FIG. 12A shows an example of a design specification for a two dimensional cantilever beam with an internal cutout. The dimensions, boundary conditions and loads of the problem are specified in FIG. 12A, and in the examples described below in connection with FIGS. 12B to 12C3 the following conditions were applied unless otherwise stated: the mesh of the design domain contains 66,736 linear triangles with 33,818 nodes; the maximum element size $h_{max}=0.02$; the filter radius is r=0.4; the allowed volume fraction is $V_f=0.5$; and the character length $\overline{A}$ in surface slope constraints is set to 1.

FIG. 12B shows an example of an optimized design based on the specification shown in FIG. 12A without any surface slope constraints. The design in FIG. 12B has an estimated compliance of C=86.71. As shown in FIG. 12B, with a conventional build orientation of 90°, the entire cutout would require a support structure. However, the internal surface slope constraint cannot be used to control for this difficulty, as the cutout is outside of the design domain, and thus the density gradient used in EQ. (6) vanishes at the boundary.

FIG. 12C1 shows an example of an optimized design based on the specification shown in FIG. 12A with a surface slope constraint of 45° applied only on internal boundaries and an initial build orientation of 45°, using build orientation as an optimization variable using mechanisms described herein for controlling support structures and build orientation in manufacturing in accordance with some embodiments of the disclosed subject matter. In the examples described below in connection with FIGS. 12C1 to 12C3, the values of the boundary integral $\overline{Q_\alpha}$ and the upper bound constraint $\overline{Q_\alpha}$ in EQ. (8) represent only the value on the boundary of the internal cutouts, as supports that are internal to the part are much more difficult to remove than supports that are external to both the part and the design domain, especially for 3D parts. The boundary integral $Q_{\overline{\alpha}}$ was calculated by integration only along the portion of the boundary corresponding to the internal boundary. In the optimization shown in FIGS. 12C1 to 12C3 the threshold $\overline{P}_{\overline{\alpha}}$ of the surface slope constraint was set to 0.15. The optimized design shown in FIG. 12C1 was generated with a surface slope constraint $\overline{\alpha}=45°$, using θ as an optimization variable with an initial build orientation $$b^0 = \left(\frac{\sqrt{2}}{2}, \frac{\sqrt{2}}{2}\right)$$

(i.e., θ⁰=45°), and the threshold $\overline{Q_{\overline{\alpha}}}$ was set to a large value so that the constraint on external supports was inactive, which resulted in a design with a build orientation b*= (0.941, 0.339) (i.e., θ=19.8°), and an external overhang Q $_{\overline{\alpha}}$=0.216. The design in FIG. 12C1 has an estimated compliance of C=99.46. As shown in FIG. 12C1, the surface slope inside the domain satisfies the constraint for self-support, but a part of boundary of the cutout (outlined by circle) is overhanging and requires support structures.

FIG. 12C2 shows an example of an optimized design based on the specification shown in FIG. 12A with a surface slope constraint of 45° applied to both internal boundaries and external boundaries with an upper bound of $\overline{Q}_\alpha$=0.1, and an initial build orientation of 45°, using build orientation as an optimization variable using mechanisms described herein for controlling support structures and build orientation in manufacturing in accordance with some embodiments of the disclosed subject matter. The optimized design shown in FIG. 12C2 was generated with a surface slope constraint $\overline{\alpha}$=45°, using θ as an optimization variable with an initial build orientation $$b^0 = \left(\frac{\sqrt{2}}{2}, \frac{\sqrt{2}}{2}\right)$$

(i.e., θ⁰=45°), and a threshold $\overline{Q}_\alpha$=0.1, which resulted in a design with a build orientation b*=(0.963, 0.269) (i.e., θ=15.6°). The design in FIG. 12C2 has an estimated compliance of C=103.11.

FIG. 12C3 shows an example of an optimized design based on the specification shown in FIG. 12A with a surface slope constraint of 45° applied to both internal boundaries and external boundaries with an upper bound of $\overline{Q}_\alpha$=0.025, and an initial build orientation of 45°, using build orientation as an optimization variable using mechanisms described herein for controlling support structures and build orientation in manufacturing in accordance with some embodiments of the disclosed subject matter. The optimized design shown in FIG. 12C3 was generated with a surface slope constraint $\overline{\alpha}$=45°, using θ as an optimization variable with an initial build orientation $$b^0 = \left(\frac{\sqrt{2}}{2}, \frac{\sqrt{2}}{2}\right)$$

(i.e., θ⁰=45°), and a threshold $\overline{Q}_\alpha$=0.025, which resulted in a design with a build orientation b*=(0.918, 0.396) (i.e., θ=23.3°). The design in FIG. 12C3 has an estimated compliance of C=129.35. As shown in FIGS. 12C2 and 12C3, as the boundary threshold $\overline{Q}_\alpha$ is reduced, the overhanging boundary of the cutouts (outlined by circles) is gradually reduced, which leads to a sacrifice in performance (as indicated by an increase in structural compliance) to satisfy the surface slope constraint for external supports control. Thus, when the external supports can be easily removed, a designer can balance the tradeoff between performance and the cost incurred by printing the external supports, while for "external" supports (i.e., supports external toe design domain, which may be internal to the finished part) that are more difficult to remove, the designer may be willing to tolerate a larger sacrifice in performance to avoid the cost of removing the supports.

Figure 13A:
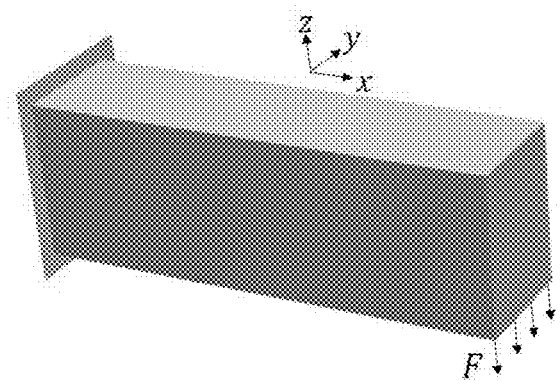
FIG. 13A shows an example of a design specification for a three dimensional cantilever beam.

FIG. 13A shows an example of a design specification for a three dimensional cantilever beam. The dimensions, boundary conditions and loads of the problem are specified in FIG. 13A (i.e., a beam having relative dimensions of 3×0.75×1), and in the examples described below in connection with FIGS. 13B to 13K the following conditions were applied unless otherwise stated: the allowed volume fraction is $V_f$=0.3; there are 3,538,944 tetrahedral elements and 614,705 nodes; the maximum element size $h_{max}$=0.016; the filter radius of the density filtering is r=0.24. For designs considering the surface slope constraints, the initial build orientation is b⁰=(1, 0, 0) (i.e., φ⁰=90°, ψ⁰=0°), the threshold $\overline{P}_a$ of the surface slope constraint is set to 0.005, and the character projection area $\overline{A}$ is set to 3.

Figure 13B:
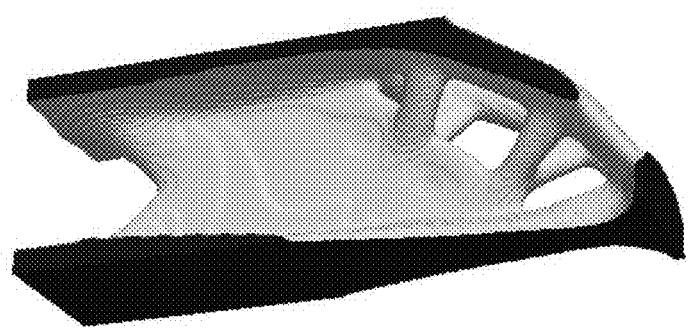
FIG. 13B shows an example of an optimized design based on the specification shown in FIG. 13A without any surface slope constraints.

FIG. 13B shows an example of an optimized design based on the specification shown in FIG. 13A without any surface slope constraints. The design in FIG. 13B has an estimated compliance of C=0.05.

Figure 13C:
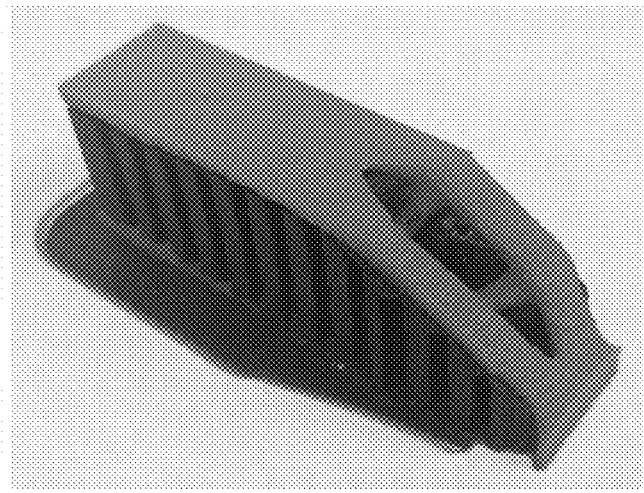
FIG. 13C shows an example of the optimized part of FIG. 13B printed with support structures.

FIG. 13C shows an example of the optimized part of FIG. 13B printed with support structures. As shown in FIG. 13C, with a conventional build orientation of 90°, the optimized design (manufactured using red material) needs significant amounts of internal supports and external supports in additive manufacturing (manufactured using black material).

FIG. 13D shows an example of an evolution of build orientation during an optimization of a design based on the specification shown in FIG. 13A with a surface slope constraint of 45° applied only on internal boundaries, and an initial build orientation of (0°, 90°), using build orientation as an optimization variable using mechanisms described herein for controlling support structures and build orientation in manufacturing in accordance with some embodiments of the disclosed subject matter. The color of the points indicates the value of compliance using a spectrum on which red indicates low compliance values and blue indicates higher compliance values.

FIGS. 13E1 and 13E2 show different views of a final optimized design based on the specification shown in FIG. 13A and the constraints described above in connection with FIG. 13D. The optimized design shown in FIGS. 13E1 and 13E2 was generated with a surface slope constraint $\overline{\alpha}=45°$, using $\phi$ and $\psi$ as optimization variables with an initial build orientation $b^0=(1, 0, 0)$ (i.e., $\phi^0=90°$, $\psi^0=0°$), and the threshold $\overline{Q_{\overline{\alpha}}}$ was set to a large value so that the constraint on external supports was inactive, which resulted in a design with a build orientation $b^*=(0.447, 0.872, 0.2)$. The design in FIGS. 13E1 and 13E2 has an estimated compliance of C=0.061.

FIG. 13F1 shows the final optimized design of FIGS. 13E1 and 13E2 rotated such that build orientation is aligned with the normal of the build plate, and FIGS. 13F2 to 13F4 show cutaways at z values of the part shown in FIG. 13F1 of $z_{cut}$=0.28; 0.55; and 0.8, respectively.

FIG. 13G shows an example of the optimized part of FIG. 13F1 printed with support structures. As shown in FIG. 13G, with the optimized part manufactured at the optimized build orientation, the design (manufactured using red material) needs significant amounts of external supports in additive manufacturing (manufactured using black material), but completely eliminated the need for internal supports.

FIG. 13H shows an example of an evolution of build orientation during an optimization of a design based on the specification shown in FIG. 13A with a surface slope constraint of 45° applied to both internal boundaries and external boundaries with an upper bound of $\overline{Q_{\overline{\alpha}}}=0.05$, and an initial build orientation of (0°, 90°), using build orientation as an optimization variable using mechanisms described herein for controlling support structures and build orientation in manufacturing in accordance with some embodiments of the disclosed subject matter. The color of the points indicates the value of compliance using a spectrum on which red indicates low compliance values and blue indicates higher compliance values.

FIGS. 13I1 and 13I2 show different views of a final optimized design based on the specification shown in FIG. 13A and the constraints described above in connection with FIG. 13H. The optimized design shown in FIGS. 13I1 and 13I2 was generated with a surface slope constraint $\overline{\alpha}=45°$, using $\phi$ and $\psi$ as optimization variables with an initial build orientation $b^0=(1, 0, 0)$ (i.e., $\phi^0=90°$, $\psi^0=0°$), and a threshold $\overline{Q_{\overline{\alpha}}}=0.05$, which resulted in a design with a build orientation $b^*=(0.999, 0, 0.052)$. The design in FIGS. 13I1 and 13I2 has an estimated compliance of C=0.068.

FIG. 13J1 shows the final optimized design of FIGS. 13I1 and 13I2 rotated such that build orientation is aligned with the normal of the build plate, and FIG. 13J2 shows a cutaway at a y value of the part shown in FIG. 13J1 of $y_{cut}$=0.28.

FIG. 13K shows an example of the optimized part of FIG. 13J1 printed with support structures. As shown in FIG. 13K, with the optimized part manufactured at the optimized build orientation determined with the external support threshold $\overline{Q_{\overline{\alpha}}}$ imposed, the design (manufactured using red material) eliminated nearly all external supports in additive manufacturing (manufactured using black material), and completely eliminated the need for any internal supports, as the part is only supported by a small area on the build plate.

FIG. 14A shows an example of a design specification for a three dimensional antenna bracket. The antenna bracket specified in FIG. 14A is an example of a bracket that was optimized, fabricated through additive manufacturing, and used on the Sentinel-1B Earth observation satellite by Altair and RUAG Space. In the production version of the optimized bracket, a large amount of supports are required in its fabrication, also requiring a large amount of post-manufacturing processing to remove the supports. The dimensions, boundary conditions and loads of the problem are specified in FIG. 14A, and in the examples described below in connection with FIGS. 14B to 14G, the simplified objection function (compliance) and a similar geometry was used to demonstrate the control of supports in the optimized design, and the following conditions were applied unless otherwise stated: the thickness of the model is 1.2; loads of magnitude F=1 are applied at four corner points of the top surface on the right end; the mesh has 6,061,512 tetrahedral elements and 1,049,040 nodes; the maximum element size $h_{max}$ 0.0125; the filter size is r=0.1875; the allowed volume fraction is $V_f$=0.3. For designs considering the surface slope constraints, the initial build orientation is $b^0=(\sqrt{2}/2, 0, \sqrt{2}/2)$ (i.e., $\phi^0=45°$, $\psi^0=0°$), the threshold $\overline{P_{\overline{\alpha}}}$ of the surface slope constraint is set to 0.01, and the threshold $\overline{Q_{\overline{\alpha}}}$ was set to a large value so that the constraint on external supports was inactive.

FIG. 14B shows an example of an optimized design based on the specification shown in FIG. 14A without any surface slope constraints. As shown in FIG. 14B, reference optimized design without surface slope constraints has structural connections in multiple directions, which makes it difficult to determine a build orientation that could produce a manufactured part with supports that can be easily eliminated or reduced. The design in FIG. 14B has an estimated compliance of $C=4.40\times10^5$.

FIG. 14C shows an example of the optimized part of FIG. 14B printed with support structures. As shown in FIG. 14C, a visualization of the reference optimized design as manufactured with supports was simulated with a conventional build orientation b=(0, 0, 1) was produced (using Ultimaker Cura version 4.2.1 available from Ultimaker with headquarters in Utrecht, Netherlands), As shown in FIG. 14C, a large amount of supports are required both inside and outside of the design domain defined in FIG. 14A.

FIG. 14D shows an example of an evolution of build orientation during an optimization of a design based on the specification shown in FIG. 14A with a surface slope constraint of 45° applied only on internal boundaries, and an initial build orientation of (45°, 0°), using build orientation as an optimization variable using mechanisms described herein for controlling support structures and build orientation in manufacturing in accordance with some embodiments of the disclosed subject matter. The color of the points indicates the value of compliance using a spectrum on which red indicates low compliance values and blue indicates higher compliance values.

FIGS. 14E1 and 14E2 show different views of a final optimized design based on the specification shown in FIG. 14A and the constraints described above in connection with FIG. 14D. The optimized design shown in FIGS. 14I1 and 14I2 was generated with a surface slope constraint $\overline{\alpha}=45°$, using $\phi$ and $\psi$ as optimization variables with an initial build orientation $b^0=(\sqrt{2}/2, 0, \sqrt{2}/2)$ (i.e., $\phi^0=45°$, $\psi0=0°$), and the threshold $\overline{Q_{\overline{\alpha}}}$ was set to a large value so that the constraint on external supports was inactive, which resulted in a design with a build orientation b*=(0.883, 0.002, 0.469) (i.e., φ*=62.04°, ψ*=0.12°). The design in FIGS. 14E1 and 14E2 has an estimated compliance of C=5.75×10⁵.

FIG. 14F1 shows the final optimized design of FIGS. 14E1 and 14E2 rotated such that build orientation is aligned with the normal of the build plate, and FIG. 14F2 shows a cutaway at a y value of the part shown in FIG. 1F1 of $y_{cut}=0.6$.

FIG. 14G shows an example of the optimized part of FIG. 14F1 visualized as a simulation of the printed part with support structures. As shown in FIG. 14G, a visualization of the optimized design of FIG. 14F1 as manufactured with supports was simulated with the optimized build orientation b*=(0.883, 0.002, 0.469) was produced (using Ultimaker Cura version 4.2.1 available from Ultimaker of Geldermalsen), As shown in FIG. 14G, for the part optimized using build orientation (and without applying a meaningful threshold $\overline{Q_\alpha}$) the internal supports were eliminated and only a small amount of external supports were required, which can be easily removed.

Figure 15:
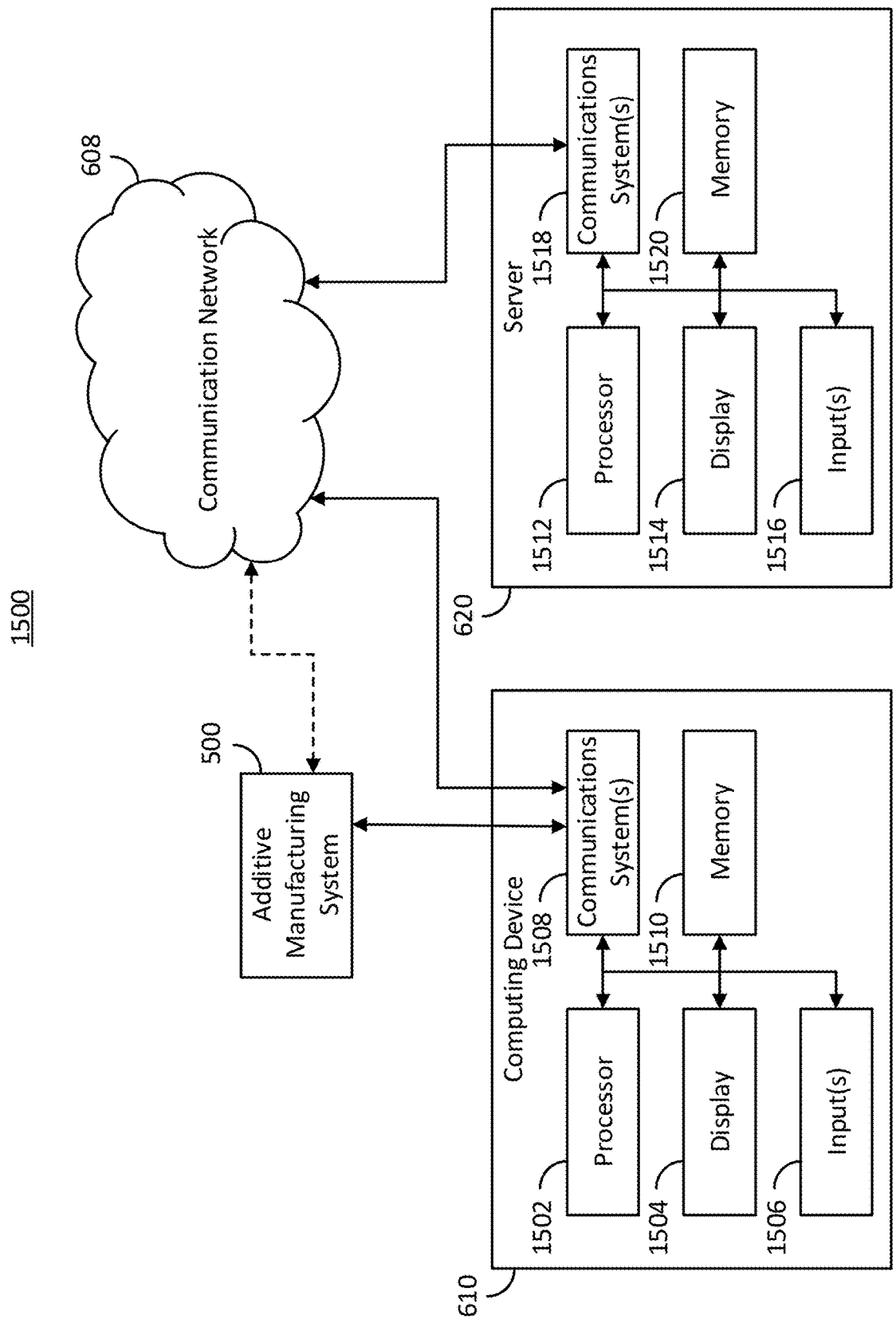
FIG. 15 shows an example of hardware that can be used to implement a computing device and/or a server in accordance with some embodiments of the disclosed subject matter.

FIG. 15 shows an example of hardware that can be used to implement a computing device and/or a server in accordance with some embodiments of the disclosed subject matter. As shown in FIG. 15, in some embodiments, computing device 610 can include a processor 1502, a display 1504, one or more inputs 1506, one or more communication systems 1508, and/or memory 1510. In some embodiments, processor 1502 can be any suitable hardware processor or combination of processors, such as a central processing unit (CPU), a graphics processing unit (GPU), a microcontroller (MCU), a field programmable gate array (FPGA), an application-specific integrated circuit (ASIC), etc. In some embodiments, display 1504 can include any suitable display devices, such as a computer monitor, a touchscreen, a television, etc.

In some embodiments, inputs 1506 can include any suitable input devices and/or sensors that can be used to receive user input, such as a keyboard, a mouse, a touchscreen, a microphone, etc. In some embodiments, communications systems 1508 can include any suitable hardware, firmware, and/or software for communicating information over communication network 608 and/or any other suitable communication networks. For example, communications systems 1508 can include one or more transceivers, one or more communication chips and/or chip sets, etc. In a more particular example, communications systems 1508 can include hardware, firmware and/or software that can be used to establish a Wi-Fi connection, a Bluetooth connection, a cellular connection, an Ethernet connection, etc.

In some embodiments, memory 1510 can include any suitable storage device or devices that can be used to store instructions, values, etc., that can be used, for example, by processor 1502 to present content using display 1504, to communicate with server 120 via communications system(s) 1508, etc. Memory 1510 can include any suitable volatile memory, non-volatile memory, storage, or any suitable combination thereof. For example, memory 1510 can include RAM, ROM, EEPROM, one or more flash drives, one or more hard disks, one or more solid state drives, one or more optical drives, etc. In some embodiments, memory 1510 can have encoded thereon a computer program for controlling operation of computing device 610. In some embodiments, processor 1502 can execute at least a portion of the computer program to present content (e.g., a rendering of specification of a part to be designed, a rendering of design or a part to be manufactured, a rendering of model of a part to be manufactured, user interfaces, graphics, etc.), receive content from server 620, transmit information to server 620, etc.

In some embodiments, server 620 can include a processor 1512, a display 1514, one or more inputs 1516, one or more communications systems 1518, and/or memory 1520. In some embodiments, processor 1512 can be any suitable hardware processor or combination of processors, such as a CPU, a GPU, an MCU, an FPGA, an ASIC, etc. In some embodiments, display 1514 can include any suitable display devices, such as a computer monitor, a touchscreen, a television, etc. In some embodiments, inputs 1516 can include any suitable input devices and/or sensors that can be used to receive user input, such as a keyboard, a mouse, a touchscreen, a microphone, etc.

In some embodiments, communications systems 1518 can include any suitable hardware, firmware, and/or software for communicating information over communication network 608 and/or any other suitable communication networks. For example, communications systems 1518 can include one or more transceivers, one or more communication chips and/or chip sets, etc. In a more particular example, communications systems 1518 can include hardware, firmware and/or software that can be used to establish a Wi-Fi connection, a Bluetooth connection, a cellular connection, an Ethernet connection, etc.

In some embodiments, memory 1520 can include any suitable storage device or devices that can be used to store instructions, values, etc., that can be used, for example, by processor 1512 to present content using display 1514, to communicate with one or more computing devices 610, etc. Memory 1520 can include any suitable volatile memory, non-volatile memory, storage, or any suitable combination thereof. For example, memory 1520 can include RAM, ROM, EEPROM, one or more flash drives, one or more hard disks, one or more solid state drives, one or more optical drives, etc. In some embodiments, memory 1520 can have encoded thereon a server program for controlling operation of server 620. In some embodiments, processor 1512 can execute at least a portion of the server program to transmit information and/or content (e.g., a specification of a part to be designed, a design or a part to be manufactured, a model of a part to be manufactured, user interfaces, graphics, etc.) to one or more computing devices 610, receive information and/or content from one or more computing devices 610, receive instructions from one or more devices (e.g., a personal computer, a laptop computer, a tablet computer, a smartphone, etc.), etc.

Figure 16A:
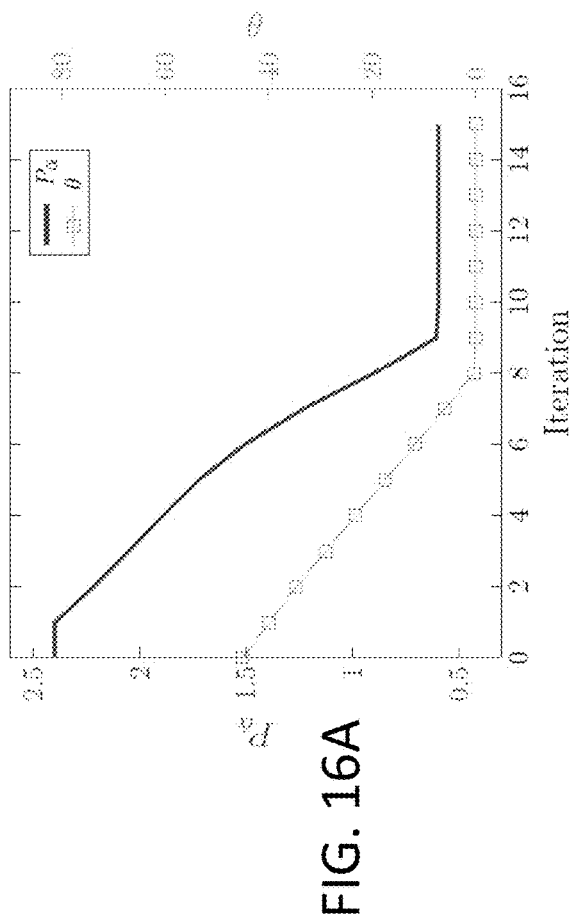
FIGS. 16A to 16C show graphs of convergence histories of build orientation and projected undercut perimeter for the design shown in FIG. 9B1 at various iterations of a build orientation optimization process.
Figure 16C:
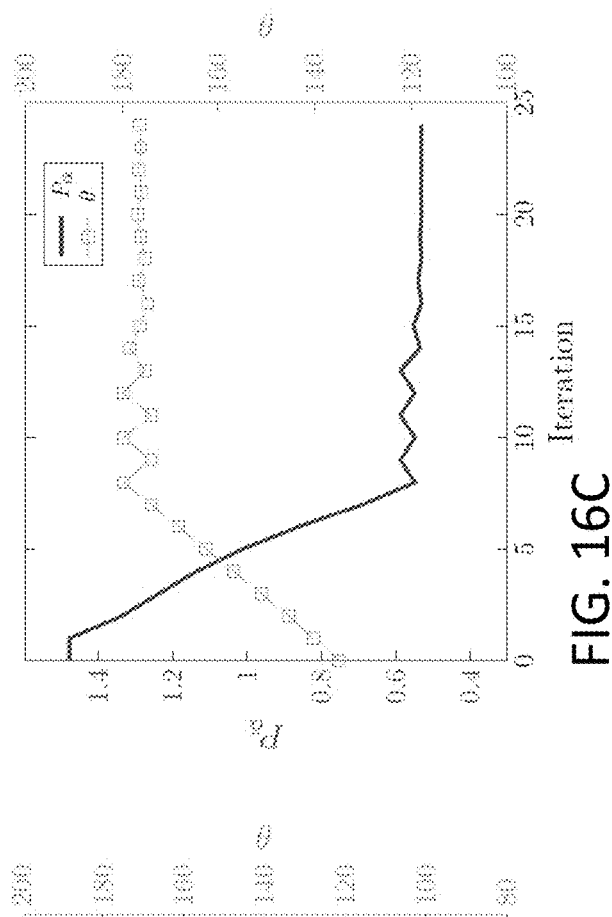
Figure 16B:
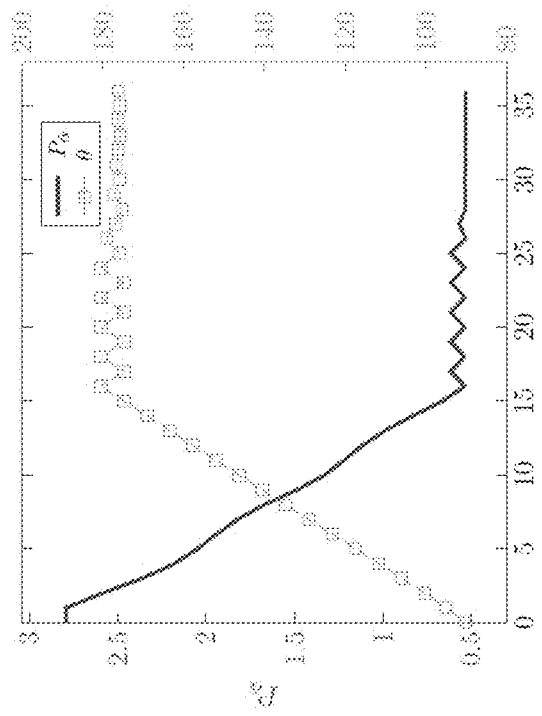

FIGS. 16A to 16C show graphs of convergence histories of build orientation and projected undercut perimeter for the design shown in FIG. 9B1 at various iterations of a build orientation optimization process. The convergence history shown in FIG. 16A illustrates results of a process implemented using the formulation for build orientation described above in connection with EQS. (21a) and (21b). For the design of FIG. 9B1, the build orientation was optimized to minimize the internal supports (i.e., $w_{ext}$ in EQ. (21a)). As shown in FIGS. 16A to 16C, the graphs of convergence history the build orientation and the projected perimeter of the internal supports, $\overline{P_\alpha}$. As shown in FIGS. 16A and 16C, for the initial build orientations θ=45° and θ=135°, the same optimal build orientation was selected when optimizing the unconstrained optimized design for build orientation alone and when optimizing the part simultaneously for both design and build orientation. By contrast, as shown in FIG. 16B, for the initial build orientation θ=90°, the build orientation selected when optimizing the unconstrained optimized design for build orientation alone was a different value than the value selected when optimizing the part simultaneously for both design and build orientation. However, the converged values ($\theta^*=0°$ and $\theta^*=176.2°$) are the optimal solutions for the reference design. FIGS. 16A to 16C demonstrates that if the optimized part itself satisfies the overhang angle constraint for a given build orientation b*, simultaneous optimization of the build orientation could find the optimal value b* without affecting the final part. As shown in the convergence histories of FIGS. 16A to 16C, the slope of the build orientation, $\theta$, converged to the optimal value within the first 15 iterations when part design was not being simultaneously optimized.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 7 and 8 can be executed or performed in any order or sequence not limited to the order and sequence shown and described in the figures. Also, some of the above steps of the processes of FIGS. 7 and 8 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for additive manufacturing a part using a three dimensional (3D) printing system, the 3D printing system including a print head and a build plate, the method comprising:
receiving a plurality of physical constraints associated with the part;
optimizing a build orientation of the part to identify an optimized build orientation b* for the part with respect to a design domain defined by the physical constraints based on the plurality of physical constraints, and a plurality of design constraints using at least one variable associated with build orientation as an optimization variable, wherein the at least one variable associated with build orientation comprises $\Theta$,
wherein for 2D parts $\Theta$ corresponds to an angle $\theta$ with respect to an axis of the design domain, and build orientation is defined as b=(cos $\theta$, sin $\theta$) $0 \leq \theta \leq 2\pi$; and
wherein for 3D parts $\Theta$ corresponds to angles $\phi$ with respect to a first axis of the design domain, and with respect to a second axis of the design domain, and build orientation is defined as b=(sin $\phi$ cos $\psi$, sin $\phi$ sin $\psi$, cos $\phi$) $0 \leq \phi \leq \pi$, $0 \leq \psi \leq 2\pi$, and the plurality of design constraints comprising:
an initial build orientation $b^0$; and
a critical surface slope angle $\overline{\alpha}$, and
generating a part model based on the optimized build orientation b*.

2. The method of claim 1, further comprising
causing the part to be manufactured at the optimized build orientation b* by instructing the print head to deposit material additively to manufacture the part, wherein the manufactured part is a physical representation of the part model.

3. The method of claim 1, wherein optimizing the build orientation controls an amount of support structure required to manufacture the generated part model.

4. The method of claim 1, wherein the plurality of design constraints further comprises an undercut perimeter constraint $\overline{P_\alpha}$ that constrains a projected undercut perimeter within the design domain of the part to be less than or equal to a non-zero allowable projected undercut perimeter, the projected undercut perimeter corresponding to a perimeter quantity of a surface of the part with undercut projected along a build orientation within the design domain.

5. The method of claim 4, wherein optimizing the build orientation comprises:
identifying locations along the surface of the part that are within the design domain having a slope $\alpha$ with respect to the build orientation that is less than the critical surface slope angle $\overline{\alpha}$; and
calculating the projected undercut perimeter based on the identified locations within the design domain.

6. The method of claim 5,
wherein identifying any locations along the surface of the part having a slope a with respect to the build orientation that is less than the critical surface slope angle $\overline{\alpha}$ comprises
generating a Heaviside projection of a density gradient representing a current iteration of the part with respect to a build orientation of the current iteration; and
wherein calculating the projected undercut perimeter based on the identified locations comprises
integrating the Heaviside projection of the density gradient over the design domain.

7. The method of claim 1, wherein the plurality of design constraints further comprises an external support area constraint $\overline{Q_\alpha}$ that constrains a projected boundary undercut perimeter at the boundary of a design domain to be less than or equal to a non-zero allowable projected undercut perimeter, the projected boundary undercut perimeter corresponding to a perimeter quantity of a surface of the part with undercut projected along a build orientation at the boundary of the design domain.

8. The method of claim 7, wherein optimizing the build orientation comprises:
identifying locations along the surface of the part that are at the boundary of the design domain having a slope $\alpha$ with respect to the build orientation that is less than the critical surface slope angle $\overline{\alpha}$; and calculating the projected boundary undercut perimeter based on the identified locations at the boundary.

9. The method of claim 8,
wherein identifying locations along the surface of the part that are at the boundary of the design domain having a slope $\alpha$ with respect to the build orientation that is less than the critical surface slope angle $\bar{\alpha}$ comprises
generating a Heaviside projection of a density field representing a current iteration of the part with respect to a build orientation of the current iteration; and
wherein calculating the projected boundary undercut perimeter based on the identified locations comprises integrating the Heaviside projection of the density field over a portion of the boundary of the design domain facing the build plate.

10. The method of claim 1, further comprising:
optimizing a topology of the part to identify a density field $\bar{\tilde{\gamma}}$ representing an optimized topology for the part based on the plurality of physical constraints, and at least a subset of the plurality of design constraints using at least one variable associated with density as an optimization variable to optimize compliance of the part, the subset of the plurality of design constraints comprising:
an allowed volume fraction is $V_f$;
the critical surface slope angle $\bar{\alpha}$;
an undercut perimeter constraint $\bar{P}_{\bar{\alpha}}$; and
wherein generating the part model is based on the optimized build orientation $b^*$, and the density field representing the optimized topology.

11. A non-transitory computer readable medium containing computer executable instructions that, when executed by a processor, cause the processor to perform a method for additive manufacturing a part using a three dimensional (3D) printing system, the 3D printing system including a print head and a build plate, the method comprising:
receiving a plurality of physical constraints associated with the part;
optimizing a build orientation of the part to identify an optimized build orientation $b^*$ for the part with respect to a design domain defined by the physical constraints based on the plurality of physical constraints, and a plurality of design constraints using at least one variable associated with build orientation as an optimization variable, wherein the at least one variable associated with build orientation comprises $\Theta$,
wherein for 2D parts $\Theta$ corresponds to an angle $\theta$ with respect to an axis of the design domain, and build orientation is defined as $b=(\cos\theta, \sin\theta)$ $0\leq\theta\leq2\pi$; and
wherein for 3D parts $\Theta$ corresponds to angles $\phi$ with respect to a first axis of the design domain, and with respect to a second axis of the design domain, and build orientation is defined as $b=(\sin\phi\cos\psi, \sin\phi\sin\psi, \cos\phi)$ $0\leq\phi\leq\pi$, $0\leq\psi\leq2\pi$, and the plurality of design constraints comprising:
an initial build orientation $b^0$; and
a critical surface slope angle $\bar{\alpha}$; and
generating a part model based on the optimized build orientation $b^*$.

12. The non-transitory computer readable medium of claim 11, wherein the method further comprises
causing the part to be manufactured at the optimized build orientation $b^*$ by instructing the print head to deposit material additively, starting at the build plate, to manufacture the part, wherein the manufactured part is a physical representation of the part model.

13. The non-transitory computer readable medium of claim 11, wherein optimizing the build orientation controls an amount of support structure required to manufacture the generated part model.

14. The non-transitory computer readable medium of claim 11, wherein the plurality of design constraints further comprises an undercut perimeter constraint $\bar{P}_{\bar{\alpha}}$ that constrains a projected undercut perimeter within the design domain of the part to be less than or equal to a non-zero allowable projected undercut perimeter, the projected undercut perimeter corresponding to a perimeter quantity of a surface of the part with undercut projected along a build orientation within the design domain.

15. The non-transitory computer readable medium of claim 11, wherein the plurality of design constraints further comprises an external support area constraint $\bar{Q}_{\bar{\alpha}}$, that constrains a projected boundary undercut perimeter at the boundary of a design domain to be less than or equal to a non-zero allowable projected undercut perimeter, the projected boundary undercut perimeter corresponding to a perimeter quantity of a surface of the part with undercut projected along a build orientation at the boundary of the design domain.

16. The non-transitory computer readable medium of claim 11, wherein the method further comprises:
optimizing a topology of the part to identify a density field $\bar{\tilde{\gamma}}$ representing an optimized topology for the part based on the plurality of physical constraints, and at least a subset of the plurality of design constraints using at least one variable associated with density as an optimization variable to optimize compliance of the part, the subset of the plurality of design constraints comprising:
an allowed volume fraction is $V_f$;
the critical surface slope angle $\bar{\alpha}$;
an undercut perimeter constraint $\bar{P}_{\bar{\alpha}}$; and
wherein generating the part model is based on the optimized build orientation $b^*$, and the density field representing the optimized topology.

17. A system for additive manufacturing a part, the system comprising:
a print head;
a build plate,
a memory; and
at least one hardware processor that is programmed to:
receive a plurality of physical constraints associated with the part;
optimize a build orientation of the part to identify an optimized build orientation $b^*$ for the part with respect to a design domain defined by the physical constraints based on the plurality of physical constraints, and a plurality of design constraints using at least one variable associated with build orientation as an optimization variable, wherein the at least one variable associated with build orientation comprises $\Theta$,
wherein for 2D parts $\Theta$ corresponds to an angle $\theta$ with respect to an axis of the design domain, and build orientation is defined as $b=(\cos\theta, \sin\theta)$ $0\leq\theta\leq2\pi$; and
wherein for 3D parts $\Theta$ corresponds to angles $\theta$ with respect to a first axis of the design domain, and $\psi$ with respect to a second axis of the design domain, and build orientation is defined as $b=(\sin\phi\cos\psi, \sin\phi\sin\psi, \cos\phi)$ $0\leq\phi\leq\pi$, $0\leq\psi\leq2\pi$, and the plurality of design constraints comprising:
an initial build orientation $b^0$;

a critical surface slope angle $\bar{\alpha}$; and generate a part model based on the optimized build orientation b*; and cause the part model to be stored in the memory.

18. The system of claim 17, wherein the at least one hardware processor is further programmed to:

retrieve the part model from the memory; and cause the part to be manufactured at the optimized build orientation b* by instructing the print head to deposit material additively to manufacture the part based on the part model, wherein the manufactured part is a physical representation of the part model.

19. The system of claim 17, wherein the plurality of design constraints further comprises an external support area constraint $\bar{Q}_\alpha$ that constrains a projected boundary undercut perimeter at the boundary of a design domain to be less than or equal to a non-zero allowable projected undercut perimeter, the projected boundary undercut perimeter corresponding to a perimeter quantity of a surface of the part with undercut projected along a build orientation at the boundary of the design domain.

20. The system of claim 17, wherein the at least one hardware processor is further programmed to:

optimize a topology of the part to identify a density field $\underline{\tilde{\gamma}}$ representing an optimized topology for the part based on the plurality of physical constraints, and at least a subset of the plurality of design constraints using at least one variable associated with density as an optimization variable to optimize compliance of the part, the subset of the plurality of design constraints comprising:

an allowed volume fraction is $V_f$;

the critical surface slope angle $\bar{\alpha}$;

an undercut perimeter constraint $\bar{P}_\alpha$; and wherein generating the part model is based on the optimized build orientation b*, and the density field representing the optimized topology.

* * * * *

UNITED STATES PATENT AND TRADEMARK OFFICE
CERTIFICATE OF CORRECTION

PATENT NO. : 11,465,361 B2
APPLICATION NO. : 16/832244
DATED : October 11, 2022
INVENTOR(S) : Xiaoping Qian et al.

It is certified that error appears in the above-identified patent and that said Letters Patent is hereby corrected as shown below:

In the Specification

Column 5, Line 28, "angles $\psi$ $\phi$ and in" should be --angles $\psi$ and $\phi$ in--.

Signed and Sealed this
Twentieth Day of December, 2022

*Katherine Kelly Vidal*
Katherine Kelly Vidal
*Director of the United States Patent and Trademark Office*